(12) United States Patent
Park et al.

(10) Patent No.: US 10,965,356 B2
(45) Date of Patent: Mar. 30, 2021

(54) METHOD FOR REPORTING CHANNEL STATE INFORMATION IN WIRELESS COMMUNICATION SYSTEM AND APPARATUS THEREFOR

(71) Applicants: LG Electronics Inc., Seoul (KR); Sogang University Research Foundation, Seoul (KR)

(72) Inventors: Haewook Park, Seoul (KR); Changhyeon Kim, Seoul (KR); Sungin Shin, Gyeonggi-do (KR); Wonjin Sung, Seoul (KR); Hyukjun Lee, Gyeonggi-do (KR); Jonghyun Park, Seoul (KR)

(73) Assignees: LG Electronics Inc., Seoul (KR); Sogang University Research Foundation, Seoul (KR)

( * ) Notice: Subject to any disclaimer, the term of this patent is extended or adjusted under 35 U.S.C. 154(b) by 0 days.

(21) Appl. No.: 16/482,618

(22) PCT Filed: Jan. 31, 2018

(86) PCT No.: PCT/KR2018/001322
§ 371 (c)(1),
(2) Date: Jul. 31, 2019

(87) PCT Pub. No.: WO2018/143662
PCT Pub. Date: Aug. 9, 2018

(65) Prior Publication Data
US 2020/0007205 A1 Jan. 2, 2020

Related U.S. Application Data

(60) Provisional application No. 62/540,567, filed on Aug. 3, 2017, provisional application No. 62/475,169, filed
(Continued)

(51) Int. Cl.
*H04B 7/0456* (2017.01)
*H04B 7/06* (2006.01)
*H04B 7/08* (2006.01)

(52) U.S. Cl.
CPC ......... *H04B 7/0486* (2013.01); *H04B 7/0469* (2013.01); *H04B 7/0617* (2013.01);
(Continued)

(58) Field of Classification Search
CPC .. H04B 7/0469; H04B 7/0626; H04B 7/0478; H04B 7/06; H04B 7/08; H04L 5/0048
See application file for complete search history.

(56) References Cited

U.S. PATENT DOCUMENTS

2014/0254701 A1 9/2014 Geirhofer et al.
2015/0289155 A1 10/2015 Gao
(Continued)

FOREIGN PATENT DOCUMENTS

CN 106160934 11/2016
EP 2819313 12/2014
(Continued)

OTHER PUBLICATIONS

Sharp, "Comparison between inter-CSI-RS co-phase and aggregated CQI," R1-121349, 3GPP TSG RAN WG1 #68b, Jeju, Korea, dated Mar. 20, 2012, 15 pages.
(Continued)

*Primary Examiner* — Anez C Ebrahim
(74) *Attorney, Agent, or Firm* — Fish & Richardson P.C.

(57) ABSTRACT

A method for reporting channel state information of a terminal comprises: a step of measuring CSI-RS transmitted from a base station; and a step of reporting CSI generated on the basis of the CSI-RS measurement to the base station, wherein the CSI comprises: a PMI for indicating a precoding matrix from a codebook and an RI for indicating a rank,
(Continued)

wherein the PMI comprises a first PMI for a beam group selected by the terminal and a second PMI which comprises a beam sub-group selection information for beams included in the beam group and phase-matching information for each antenna port polarization for the selected beam sub-group, and wherein as the rank increases, the phase-matching information may be indicated with different granularity from each other depending on whether the beam sub-groups selected from the beam group are the same or different.

17 Claims, 33 Drawing Sheets

Related U.S. Application Data on Mar. 22, 2017, provisional application No. 62/452,967, filed on Jan. 31, 2017.

(52) U.S. Cl.
CPC ......... *H04B 7/0626* (2013.01); *H04B 7/0639* (2013.01); *H04B 7/0891* (2013.01)

(56) References Cited

U.S. PATENT DOCUMENTS

| | | | |
|---|---|---|---|
| 2016/0323022 | A1 | 11/2016 | Rahman et al. |
| 2018/0138950 | A1* | 5/2018 | Rahman ................. H04L 5/0057 |
| 2019/0173593 | A1* | 6/2019 | Chapman ............. H04B 17/102 |

FOREIGN PATENT DOCUMENTS

| | | |
|---|---|---|
| KR | 1020150128844 | 11/2015 |
| KR | 1020160058716 | 5/2016 |
| WO | WO2016175623 | 11/2016 |

OTHER PUBLICATIONS

Extended European Search Report in European Appln. No. 18748183.3, dated May 19, 2020, 12 pages.
Huawei, HiSilicon, Remaining details of codebook subsampling, R1-133510, 3GPP TSG RAN WG1 Meeting #74, Barcelona, Spain, Aug. 19 23, 2013, 8 pages.

* cited by examiner (a)

(b)

(a)

(b)

(a) Correlation upon single rank transmission $\mu$ (b) Correlation upon dual rank transmission $\mu$ (a) Channel capacity upon single rank transmission (b) Channel capacity upon dual rank transmission (a)

(b)

(a)

(b)

METHOD FOR REPORTING CHANNEL STATE INFORMATION IN WIRELESS COMMUNICATION SYSTEM AND APPARATUS THEREFOR

CROSS-REFERENCE TO RELATED APPLICATIONS

This application is a National Stage application under 35 U.S.C. § 371 of International Application No. PCT/KR2018/001322, filed on Jan. 31, 2018, which claims the benefit of U.S. Provisional Application No. 62/540,567, filed on Aug. 3, 2017, U.S. Provisional Application No. 62/475,169, filed on Mar. 22, 2017, and U.S. Provisional Application No. 62/452,967, filed on Jan. 31, 2017. The disclosures of the prior applications are incorporated by reference in their entirety.

TECHNICAL FIELD

The present invention relates to a wireless communication system, and more particularly, to a method for reporting channel state information and a device that performs/supports this method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present invention proposes a method for transmitting or receiving channel state information (CSI).

Furthermore, the present invention newly proposes various codebooks for CSI report/feedback.

Technical objects to be achieved in the present invention are not limited to the aforementioned objects, and those skilled in the art to which the present invention pertains may evidently understand other technological objects from the following description.

Technical Solution

In an aspect of the present invention, a method of reporting, by a user equipment (UE), channel state information (CSI) in a wireless communication system includes measuring a CSI-reference signal (RS) transmitted from a base station and reporting, to the base station, CSI generated based on the CSI-RS measurement. The CSI may include a precoding matrix index (PMI) for indicating a precoding matrix and a rank indicator (RI) for indicating a rank from a codebook. The PMI may include a first PMI for a beam group selected by the UE and a second PMI including beam subgroup selection information for beams included in the beam group and co-phase information for each antenna port polarization for the selected beam subgroup. The co-phase information may be indicated with different granularities for a case where beam subgroups selected within the beam group are same and a case where beam subgroups selected within the beam group are different as the rank increases.

Furthermore, co-phase information having a first granularity may be indicated if the beam subgroups are the same, and co-phase information having a second granularity may be indicated if the beam subgroups are different.

Furthermore, the first granularity may be lower than the second granularity.

Furthermore, the co-phase information may indicate a co-phase value selected among x co-phase candidates if the beam subgroups are the same, and may indicate a co-phase value selected among y co-phase candidates greater than the x if the beam subgroups are different.

Furthermore, orthogonality may be satisfied between beams within the beam groups.

Furthermore, the co-phase information may be reported based on quadrature phase-shift keying (QPSK) if the beam subgroups are different.

Furthermore, the x is set to 1 or and the y is set to 4.

Furthermore, the spacing between beams included in the beam group may be set non-uniformly.

Furthermore, the spacing may be determined based on a parameter configurable by the base station.

Furthermore, the spacing may be pre-defined or indicated by higher layer signaling by the base station.

Furthermore, the first PMI may indicate a precoding matrix set selected from the codebook, and the second PMI may indicate at least one precoding matrix selected by the UE within the precoding matrix set.

Advantageous Effects

In accordance with an embodiment of the present invention, a UE can derive CSI smoothly and feed the CSI back to a base station.

Furthermore, in accordance with an embodiment of the present invention, there is an effect in that a more efficient codebook design is possible because the range of a long-term codebook is variably configured by taking into consideration the characteristics of an actual channel.

Furthermore, in accordance with an embodiment of the present invention, there are effects in that a bit resource allocated for an unnecessary co-phase information/value can be removed because the granularity of a co-phase (or cross phase difference) information/value is different depending on a selected beam subgroup (or precoding matrix sub group) and a performance gain can be obtain by substituting a corresponding bit resource with a different codeword.

Effects which may be obtained in the present invention are not limited to the aforementioned effects, and various other effects may be evidently understood by those skilled in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

BEST MODEL

Figure 1:
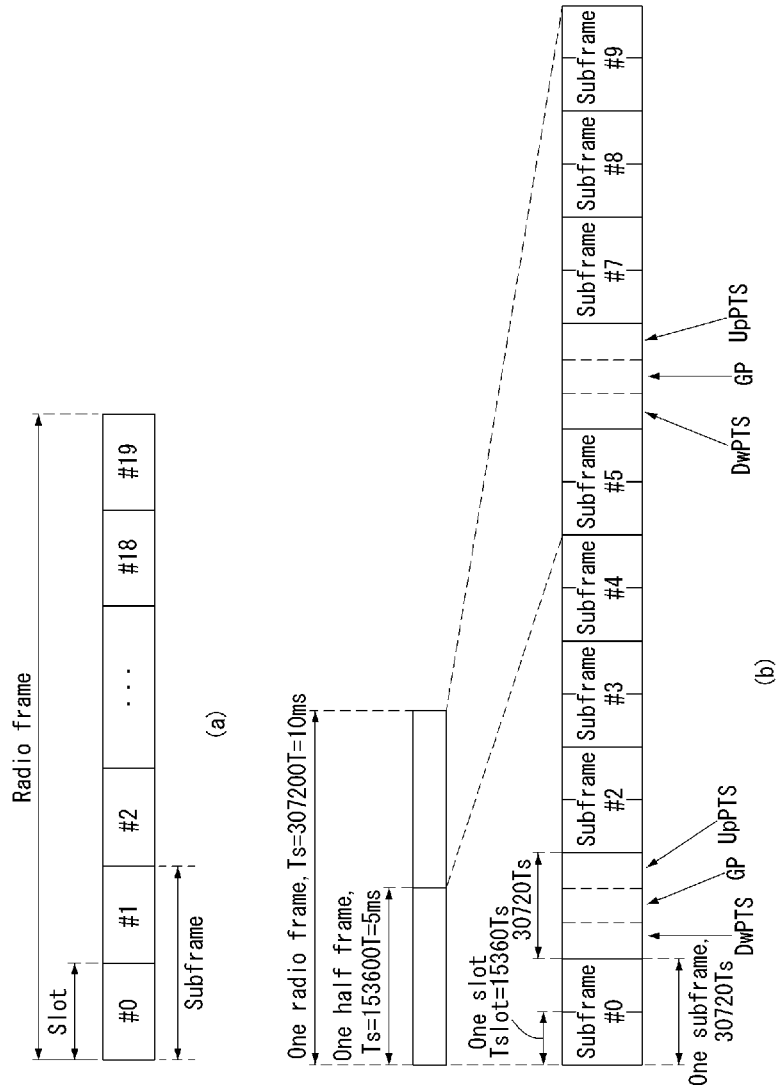
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·Ts | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
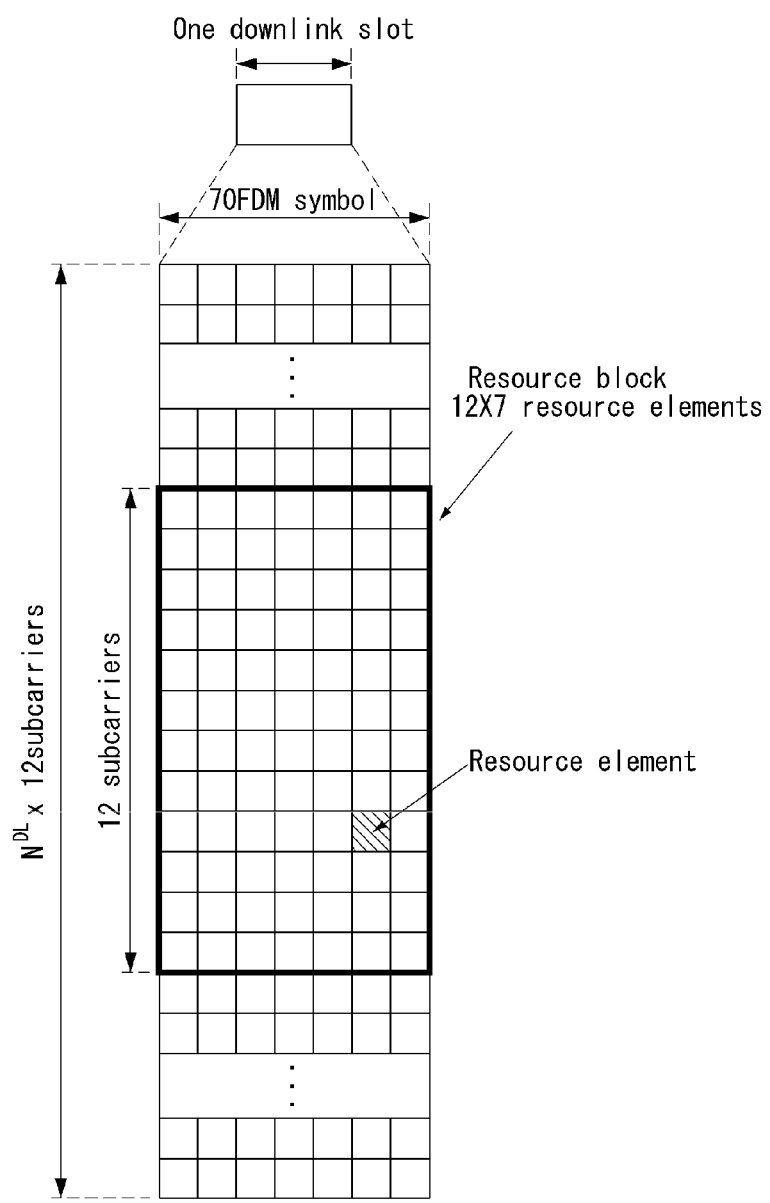
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
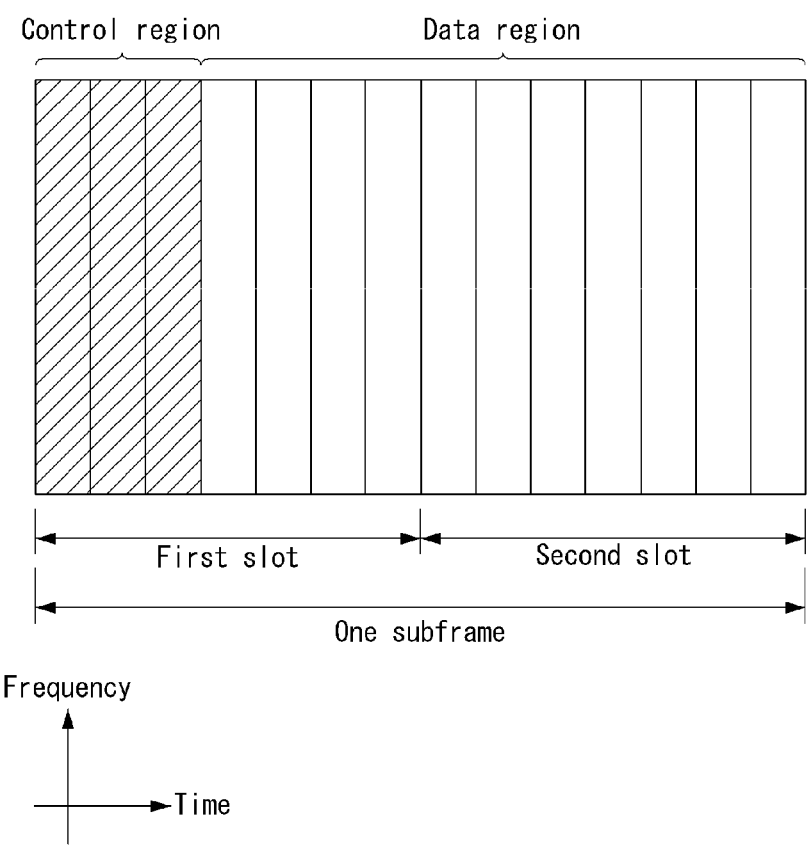
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

Figure 4:
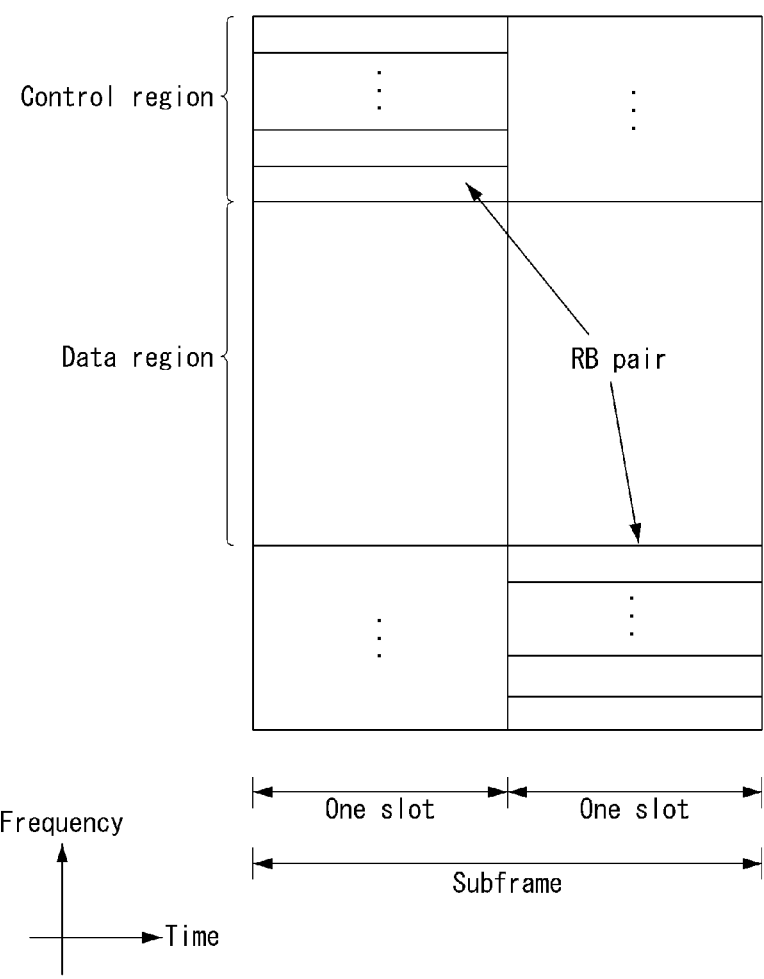
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
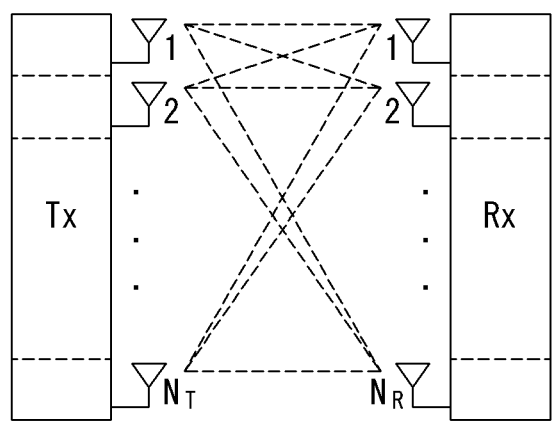
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
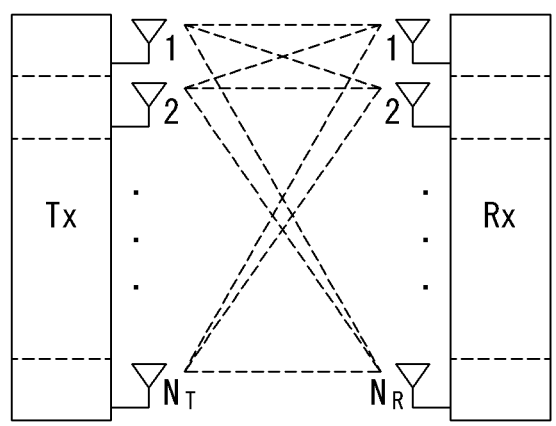
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

CSI-RS Configuration

In the current LTE standard, CSI-RS configuration parameters include antennaPortsCount, subframeConfig, resourceConfig, etc. These parameters indicate the number of antenna ports used to transmit CSI-RS, the period and offset of a subframe for transmitting CSI-RS, and a transmitted RE location (frequency and OFDM symbol index) in the corresponding subframe. Particularly, when a base station delivers specific CSI-RS configuration to a UE, it delivers the following parameters/information.

antennaPortsCount: A parameter representing the number of antenna ports used for transmission of CSI reference signals (e.g., 1 CSI-RS port, 2 CSI-RS ports, 4 CSI-RS ports, 8 CSI-RS ports, etc.).
  resourceConfig: A parameter associated with the location of resources allocated for CSI-RS.
  subframeConfig: A parameter associated with the period and offset of a subframe for transmitting CSI-RS.
  p-C: Regarding UE assumption on reference PDSCH transmitted power for CSI feedback CSI-RS, Pc is the assumed ratio of PDSCH EPRE to CSI-RS EPRE when UE derives CSI feedback and takes values in the range of [−8, 15] dB with 1 dB step size.
  zeroTxPowerResourceConfigList: A parameter associated with zero-power CSI-RS configuration.
  zeroTxPowerSubframeConfig: A parameter associated with the period and offset of a subframe for transmitting zero-power CSI-RS.

Massive MIMO

A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 7:
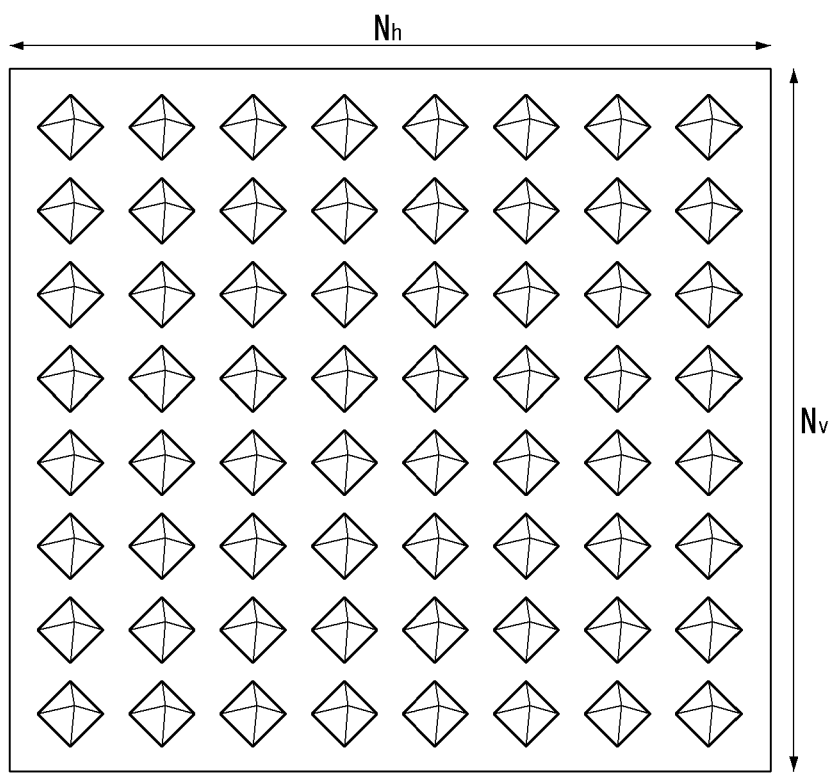
FIG. 7 illustrates a two-dimensional (2D) active antenna system having 64 antenna elements in a wireless communication system to which the present invention is applicable.

FIG. 7 illustrates a 2D AAS having 64 antenna elements in a wireless communication system to which the present invention is applicable.

FIG. 7 illustrates a normal 2D antenna array. A case in which Nt=Nv·Nh antennas are arranged in a square form, as shown in FIG. 7, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 8:
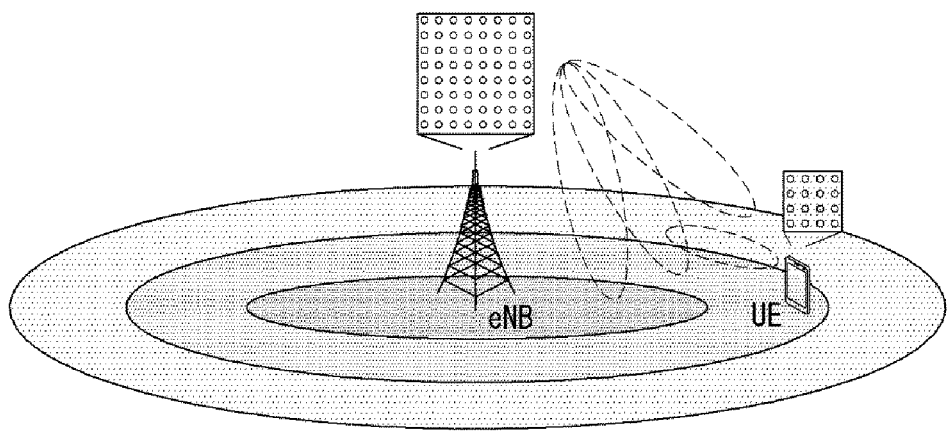
FIG. 8 illustrates a system in which a base station or a UE has a plurality of transmission/reception antennas capable of forming AAS based three-dimensional (3D) beams in a wireless communication system to which the present invention is applicable.

FIG. 8 illustrates a system in which an eNB or a UE has a plurality of transmission/reception antennas capable of forming AAS based 3D beams in a wireless communication system to which the present invention is applicable.

FIG. 8 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 9:
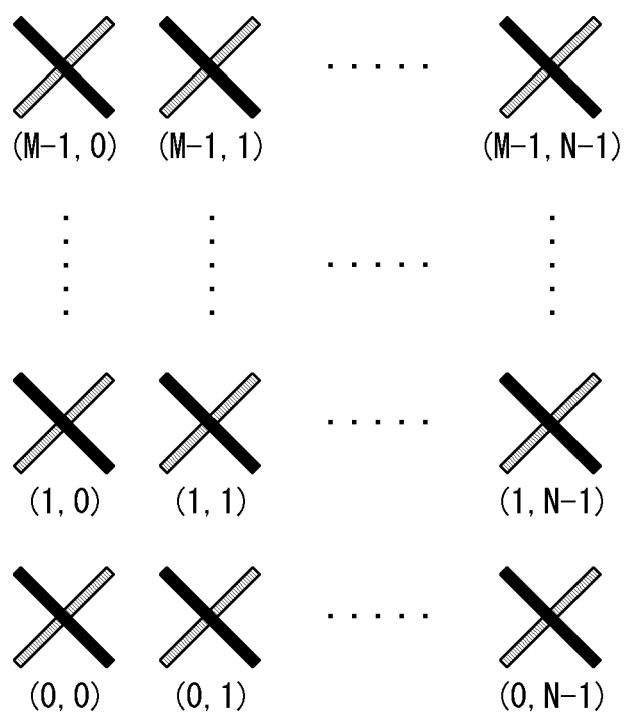
FIG. 9 illustrates a 2D antenna system having cross polarization in a wireless communication system to which the present invention is applicable.

FIG. 9 illustrates a 2D antenna system having cross polarization in a wireless communication system to which the present invention is applicable.

2D planar antenna array model considering polarization may be schematized as shown in FIG. 9.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 9 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 8, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 10:
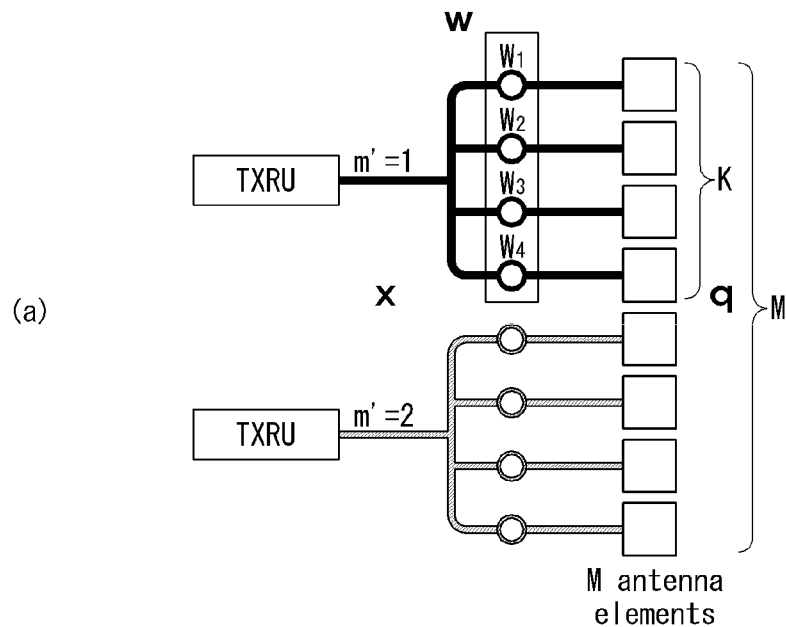
FIG. 10 illustrates transceiver unit models in a wireless communication system to which the present invention is applicable.
Figure 10:
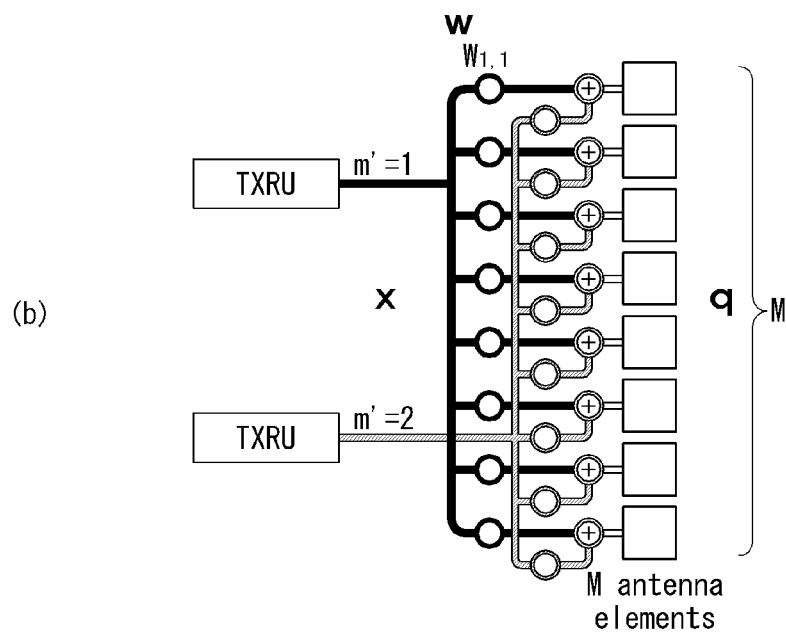

FIG. 10 illustrates transceiver unit models in a wireless communication system to which the present invention is applicable.

In 1D TXRU virtualization, M_TXRU TXRUs are associated with M antenna elements in a single-column antenna arrangement having the same polarization.

Figure 12:
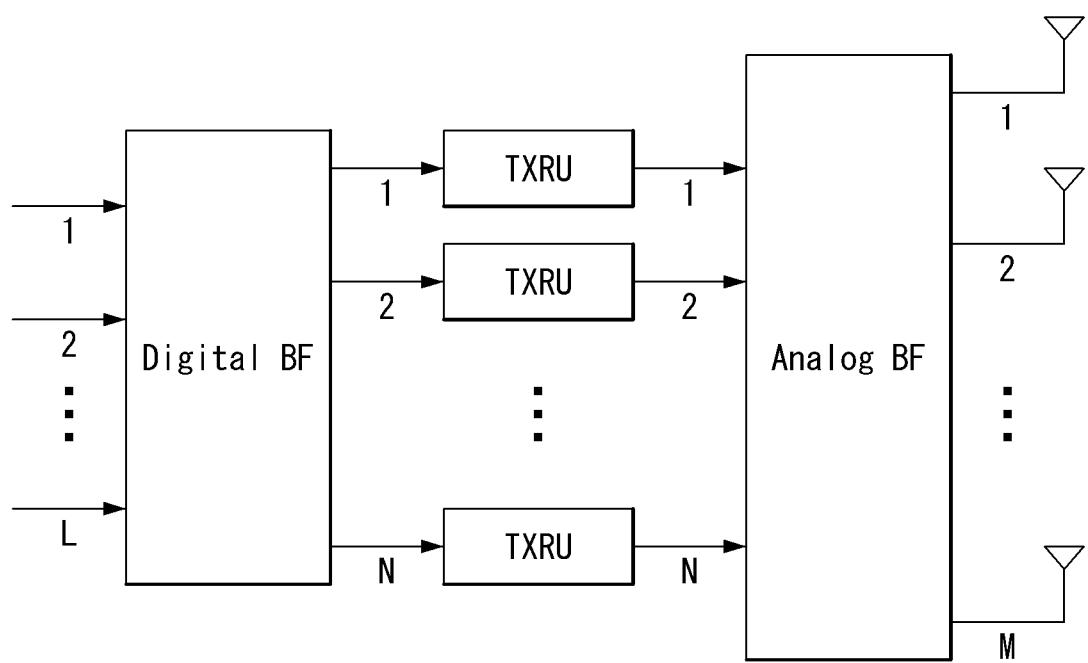
FIG. 12 is a schematic diagram of a hybrid beamforming structure from the perspective of TXRUs and physical antennas.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 10(*a*) and TXRU virtualization model option-2: full-connection model as shown in FIG. 10(*b*) according to correlation between antenna elements and TXRU.

Referring to FIG. 10(*a*), antenna elements are partitioned into multiple antenna element groups and each TXRU is connected to one of the groups in the case of the sub-array partition model.

Referring to FIG. 10(*b*), multiple TXRU signals are combined and delivered to a single antenna element (or antenna element array) in the case of the full-connection model.

In FIG. 10, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 10 shows an example of TXRU-to-antenna element mapping and the present invention is not limited thereto. The present invention may be equally applied to mapping between TXRUs and antenna elements realized in various manners in terms of hardware.

Definition of Channel-State Information (CSI)-Reference Signal (CSI-RS)

For a serving cell and UE configured in transmission mode 9, the UE can be configured with one CSI-RS resource configuration. For a serving cell and UE configured in transmission mode 10, the UE can be configured with one or more CSI-RS resource configuration(s). The following parameters for which the UE shall assume non-zero transmission power for CSI-RS are configured via higher layer signaling for each CSI-RS resource configuration:

CSI-RS resource configuration identifier (if the UE is configured in transmission mode 10)

Number of CSI-RS ports.

CSI RS Configuration

CSI RS subframe configuration I_(CSI-RS).

UE assumption on reference PDSCH transmitted power for CSI feedback (P_c) (if the UE is configured in transmission mode 9).

UE assumption on reference PDSCH transmitted power for CSI feedback (P_c) for each CSI process, if the UE is configured in transmission mode 10. If CSI subframe sets C_(CSI,0) and C_(CSI,1) are configured by higher layers for a CSI process, P_c is configured for each CSI subframe set of the CSI process.

Pseudo-random sequence generator parameter (n_ID)

CDM type parameter, if the UE is configured with higher layer parameter CSI-Reporting-Type, and CSI-reporting-Type is set to 'CLASS A' for a CSI process.

Higher layer parameter gel-CRS-Info-r11 for QCL type B UE assumption of CRS antenna ports and CSI-RS antenna ports with the following parameters, if the UE is configured in transmission mode 10:

qcl-ScramblingIdentity-r11.

crs-PortsCount-r11.

mbsfn-SubframeConfigList-r11.

P_c is the assumed ratio of PDSCH EPRE to CSI-RS EPRE (Energy Per Resource Element) when UE derives CSI feedback and takes values in the range of [−8, 15] dB with 1 dB step size, where the PDSCH EPRE corresponds to the number of symbols for which the ratio of the PDSCH EPRE to the cell-specific RS EPRE.

A UE should not expect the configuration of CSI-RS and PMCH in the same subframe of a serving cell.

For frame structure type 2 serving cell and 4 CRS ports, the UE is not expected to receive a CSI RS Configuration index belonging to the set [20-31] for the normal CP case or the set [16-27] for the extended CP case.

A UE may assume the CSI-RS antenna ports of a CSI-RS resource configuration are quasi co-located (QCL) with respect to delay spread, Doppler spread, Doppler shift, average gain, and average delay.

A UE configured in transmission mode 10 and with QCL type B may assume the antenna ports 0-3 associated with gel-CRS-Info-r11 corresponding to a CSI-RS resource configuration and antenna ports 15-22 corresponding to the CSI-RS resource configuration are quasi co-located (QCL) with respect to Doppler shift, and Doppler spread.

If a UE is configured in transmission mode 10 with higher layer parameter CSI-Reporting-Type, CSI-Reporting-Type is set to 'CLASS B', and the number of CSI-RS resources configured for a CSI process is 1 or more, and QCL type B is configured, the UE is not expected to receive CSI-RS resource configurations for the CSI process that have different values from the higher layer parameter qcl-CRS-Info-r11.

In subframes configured for CSI-RS transmission, the reference signal sequence $r_{l,n_s}(m)$ shall be mapped to complex-valued modulation symbols $a_{k,l}^{(p)}$ used as reference symbols on antenna port p. The mapping depends on the higher layer parameter CDMType.

If CDMType does not correspond to CDM4, mapping may be done according to the following Equation 12:

[Equation 12]

$$a_{k,l}^{(p')} = w_{l''} \cdot r_{l,n_s}(m')$$

$$k = k' + 12m + \begin{cases} -0 & \text{for } p' \in \{15, 16\}, \text{ normal cyclic prefix} \\ -6 & \text{for } p' \in \{17, 18\}, \text{ normal cyclic prefix} \\ -1 & \text{for } p' \in \{19, 20\}, \text{ normal cyclic prefix} \\ -7 & \text{for } p' \in \{21, 22\}, \text{ normal cyclic prefix} \\ -0 & \text{for } p' \in \{15, 16\}, \text{ extended cyclic prefix} \\ -3 & \text{for } p' \in \{17, 18\}, \text{ extended cyclic prefix} \\ -6 & \text{for } p' \in \{19, 20\}, \text{ extended cyclic prefix} \\ -9 & \text{for } p' \in \{21, 22\}, \text{ extended cyclic prefix} \end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p' \in \{15, 17, 19, 21\} \\ (-1)^{l''} & p' \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

If CDMType corresponds to CDM4, mapping may be done according to the following Equation 13.

[Equation 13]

$$a_{k,l}^{(p')} = w_{p'}(i) \cdot r_{l,n_s}(m')$$

$$k = k' + 12m - \begin{cases} k'' & \text{for } p' \in \{15, 16, 19, 20\}, \\ & \text{normal cyclic prefix, } N_{ports}^{CSI} = 8 \\ k'' + 6 & \text{for } p' \in \{17, 18, 21, 22\}, \\ & \text{normal cyclic prefix, } N_{ports}^{CSI} = 8 \\ 6k'' & \text{for } p' \in \{15, 16, 17, 18\}, \\ & \text{normal cyclic prefix, } N_{ports}^{CSI} = 4 \end{cases}$$

$$l = l'' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \end{cases}$$

$$l'' = 0, 1$$

$$k'' = 0, 1$$

$$i = 2k'' + l''$$

-continued $$m = 0, 1, \ldots, N_{RB}^{DL} - 1$$

$$m' = m + \left\lfloor \frac{N_{RB}^{max,DL} - N_{RB}^{DL}}{2} \right\rfloor$$

where $w_{p'}(i)$ is determined by the following Table 3. Table 3 represents the sequence $w_{p'}(i)$ for CDM4.

TABLE 3

| $N_{ports}^{CSI} = 4$ | $N_{ports}^{CSI} = 8$ | $[w_{p'}(0)\ w_{p'}(1)\ w_{p'}(2)\ w_{p'}(3)]$ |
|---|---|---|
| 15 | 15, 17 | [1 1 1 1] |
| 16 | 16, 18 | [1 −1 1 −1] |
| 17 | 19, 21 | [1 1 −1 −1] |
| 18 | 20, 22 | [1 −1 −1 1] |

OFDM Numerology

As more and more communication devices demand larger communication capacity, there is a need for improved mobile broadband communication compared to existing RAT (Radio Access Technology). Also, massive MTC (Machine Type Communications), which provides various services by connecting many devices and objects, is one of the major issues to be considered in the next generation communication. In addition, a communication system design considering a service/UE sensitive to reliability and latency in the next-generation communication is being discussed. The introduction of next-generation RAT, which takes enhanced mobile broadband communication, massive MTC, and URLLC (Ultra-Reliable and Low Latency Communication) into account, is being discussed. In the present invention, this technology is referred to as new RAT for simplicity.

The new RAT system uses an OFDM transmission scheme or a similar transmission scheme. Typically, it has the OFDM numerology of the following Table 4.

TABLE 4

| Parameter | Value |
|---|---|
| Subcarrier-spacing (Δf) | 60 kHz |
| OFDM symbol length | 16.33 μs |
| Cyclic Prefix(CP) length | 1.30 μs/1.17 μs s |
| System bandwidth | 80 MHz |
| (No. of available subcarriers) | 1200 |
| Subframe length | 0.25 ms |
| Number of OFDM symbols per subframe | 14 symbols |

Self-Contained Subframe Structure

In order to minimize the latency of data transmission in the TDD system in the new fifth-generation RAT, a self-contained subframe structure is considered, in which a control channel and a data channel are time-division-multiplexed (TDM).

Figure 11:
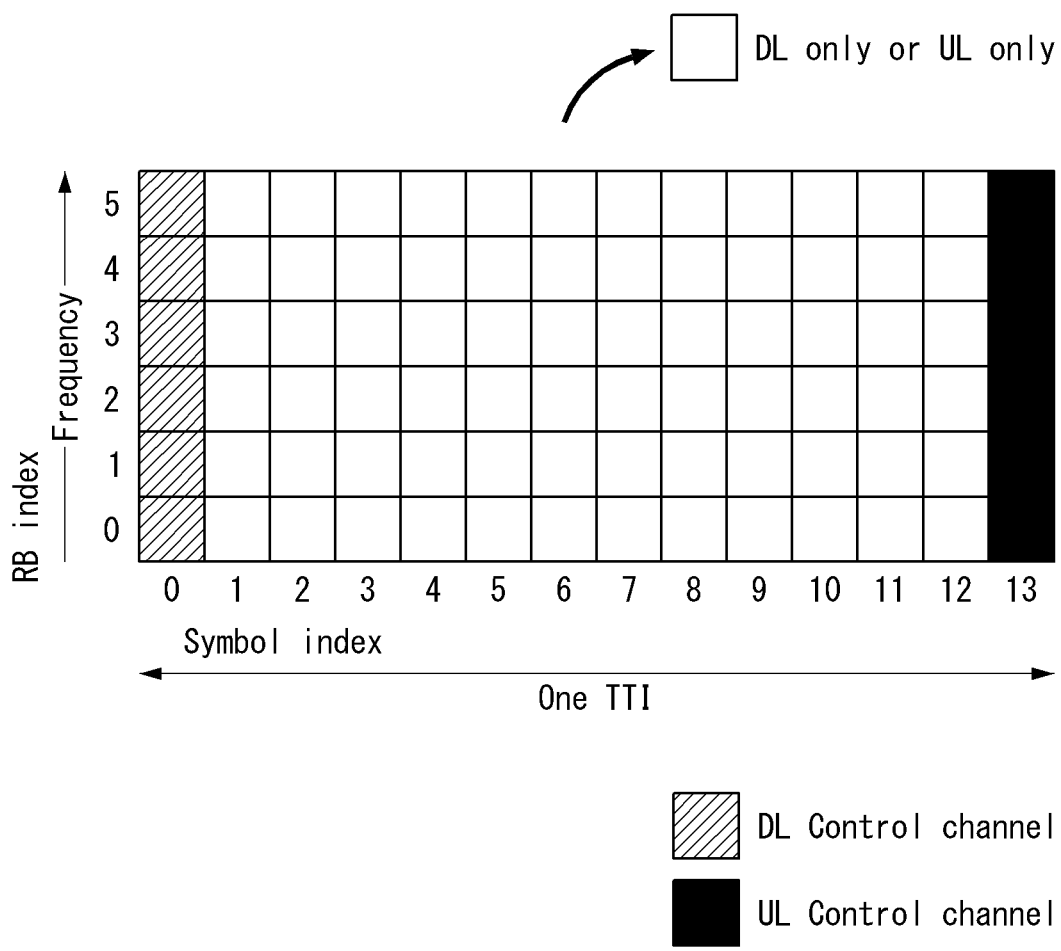
FIG. 11 illustrates a self-contained subframe structure to which the present invention is applicable.

FIG. 11 illustrates a self-contained subframe structure to which the present invention is applicable.

In FIG. 11, the hatched area represents the transmission region of a physical channel PDCCH carrying DCI, and the black area represents the transmission region of a physical channel PUCCH for carrying uplink control information (UCI).

Here, the DCI is control information that the eNB transmits to the UE. The DCI may include information on cell configuration that the UE should know, DL specific information such as DL scheduling, and UL specific information such as UL grant. The UCI is control information that the UE transmits to the eNB. The UCI may include a HARQ ACK/NACK report on the DL data, a CSI report on the DL channel status, and/or a scheduling request (SR).

In FIG. 11, the area that is not hatched or black may be used for transmission of a physical channel PDSCH carrying downlink data, or may be used for transmission of a physical channel PUSCH carrying uplink data. According to the self-contained subframe structure, DL transmission and UL transmission may be sequentially performed in one subframe, whereby DL data may be transmitted and UP ACK/NACK may be received within the subframe. As a result, the time taken to retransmit data when a data transmission error occurs may be reduced, thereby minimizing the latency of final data transfer.

In the self-contained subframe structure, a time gap for switching from a transmission mode to a reception mode or vice versa is required for the eNB and the UE. To this end, some OFDM symbols at the time of switching from DL to UL in the subframe structure are set as a guard period (GP). This subframe type may be referred to as a 'self-contained SF'.

Analog Beamforming

In millimeter wave (mmW), the wavelength is shortened, and thus a plurality of antenna elements may be installed in the same area. For example, a total of 64 (8×8) antenna elements may be installed in a 5-by-5 cm panel in a 30 GHz band with a wavelength of about 1 cm in a 2-dimensional array at intervals of 0.5λ (wavelength). Therefore, in mmW, increasing the coverage or the throughput by increasing the beamforming (BF) gain using multiple antenna elements is taken into consideration.

If a transceiver unit (TXRU) is provided for each antenna element to enable adjustment of transmit power and phase, independent beamforming is possible for each frequency resource. However, installing TXRU in all of the about 100 antenna elements is less feasible in terms of cost. Therefore, a method of mapping a plurality of antenna elements to one TXRU and adjusting the direction of a beam using an analog phase shifter is considered. This analog beamforming method may only make one beam direction in the whole band, and thus may not perform frequency selective beamforming (BF), which is disadvantageous.

Hybrid BF with B TXRUs that are fewer than Q antenna elements as an intermediate form of digital BF and analog BF may be considered. In the case of hybrid BF, the number of directions in which beams may be transmitted at the same time is limited to B or less, which depends on the method of connecting B TXRUs and Q antenna elements.

Moreover, hybrid beamforming, a combination of digital beamforming and analog beamforming, is suggested where multiple antennas are used in the new RAT system. Here, the analog beamforming (or RF beamforming) refers to performing precoding (or combining) at the RF end. In the hybrid beamforming, the baseband end and the RF end each perform precoding (or combining), which has the benefit of achieving performance close to digital beamforming while reducing the number of RF chains and the number of D(digital)/A(analog) (or A/D) converters. For convenience, the hybrid beamforming structure may be represented by N transceiver units (TXRUs) and M physical antennas. Then, digital beamforming for L data layers to be transmitted by the transmitting end may be represented by N by L matrices, and thereafter N converted digital signals are converted into analog signals through the TXRUs and then analog beamforming is applied to represent them by M by N matrices.

FIG. 12 is a schematic diagram of a hybrid beamforming structure from the perspective of TXRUs and physical antennas. In FIG. 12, the number of digital beams is L, and the number of analog beams is N.

The New RAT system is designed in such a way that the base station changes analog beamforming for each symbol, thereby supporting more efficient beamforming for a UE located in a particular area. Furthermore, in FIG. 12, when N particular TXRUs and M RF antennas are defined by a single antenna panel, the New RAT system may deploy a plurality of antenna panels to which hybrid beamforming may be applied individually.

When the base station uses multiple analog beams, each UE may require different analog beams for their signal reception. Thus, for synchronization signals, system information, and paging, beam sweeping may be taken into consideration so that the multiple analog beams to be used by the base station in a particular subframe (SF) are changed for each symbol to allow every UE to have an opportunity to receive.

Figure 13:
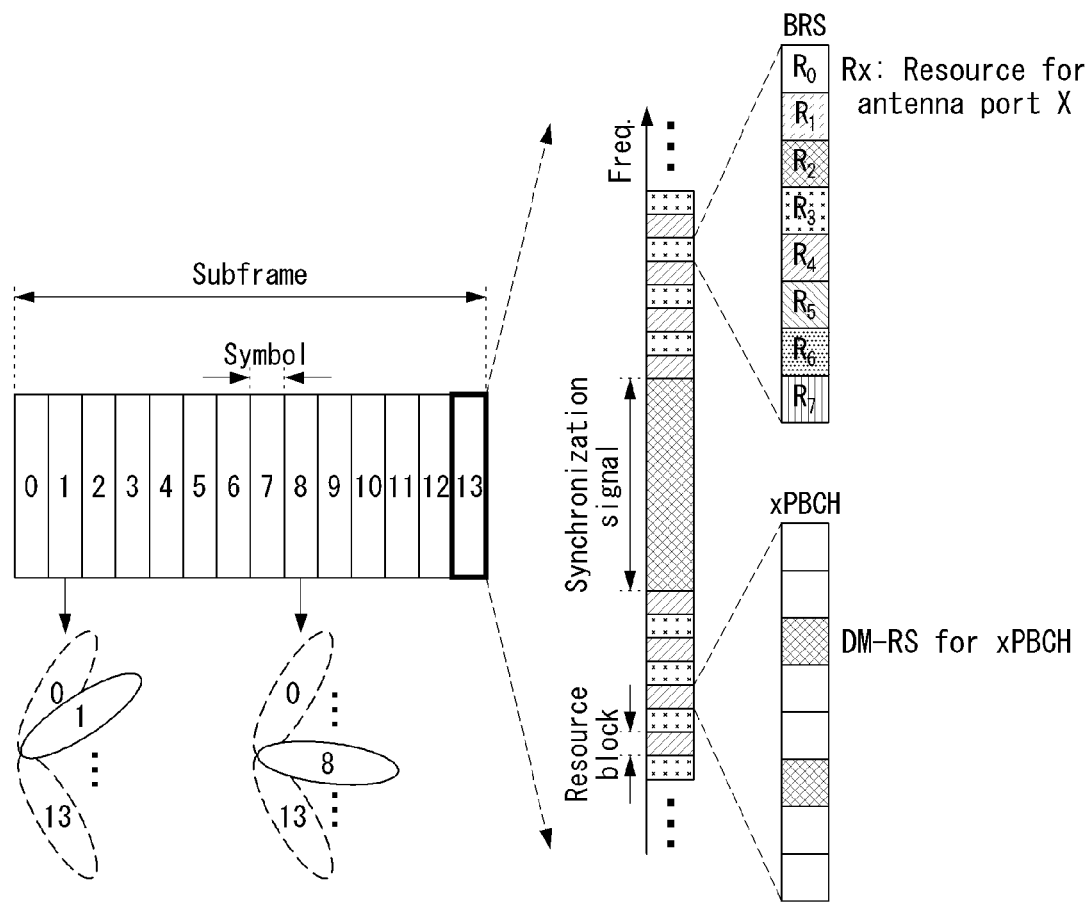
FIG. 13 is a schematic diagram of a beam sweeping operation for synchronization signals and system information in a DL transmission process.

FIG. 13 is a schematic diagram of a beam sweeping operation for synchronization signals and system information in a DL transmission process.

In FIG. 13, physical resources (or physical channels) on which the system information in the New RAT system is transmitted by broadcasting are termed physical broadcast channels (xPHCHs).

Referring to FIG. 13, analog beams that belong to different antenna panels within one symbol may be simultaneously transmitted. To measure a channel for each analog beam, as shown in FIG. 13, an approach for introducing a beam RS (BRS), which is an RS that is transmitted using a single analog beam (corresponding to a specific antenna panel), is being discussed. The BRS may be defined for a plurality of antenna ports, and each antenna port of the BRS may correspond to a single analog beam. In this case, unlike the BRS, a synchronization signal or xPBCH may be transmitted using all analog beams in an analog beam group so that a certain UE may receive it properly.

RRM Measurement in LTE

LTE systems support RRM operations for power control, scheduling, cell search, cell re-selection, handover, radio link or connection monitoring, connection establish/re-establish, etc. In this case, the serving cell may request the UE for the RRM measurement information for the RRM operations. For example, the UE may measure cell search information for each cell, reference signal received power (RSRP), reference signal received quality (RSRQ), etc., and may report the measurement result. Specifically, in an LTE system, the UE may receive "measConfig" as a higher-layer signal for RRM measurement from the serving cell. In this case, the UE may measure RSRP or RSRQ according to the "measConfig" information. In this case, RSRP, RSRQ, and RSSI according to the TS 36.214 document for LTE systems can be defined as follows:

[RSRP]

Reference signal received power (RSRP) is defined as the linear average over the power contributions (in [W]) of the resource elements that carry cell-specific RSs (CRs) within the considered measurement frequency bandwidth. For RSRP determination, CRS R0 shall be used according to TS 36.211 [3]. If the UE can reliably detect that R1 is available, it may use R1 in addition to R0 to determine RSRP.

The reference point for the RSRP shall be the antenna connector of the UE.

If receiver diversity is in use by the UE, the reported value shall not be lower than the corresponding RSRP of any of the individual diversity branches.

[RSRQ]

Reference Signal Received Quality (RSRQ) is defined as the ratio NXRSRP/(E-UTRA carrier RSSI), where N is the number of RBs of the E-UTRA carrier RSSI measurement bandwidth. The measurements in the numerator and denominator shall be made over the same set of resource blocks.

E-UTRA Carrier Received Signal Strength Indicator (RSSI) comprises the linear average of the total received power (in [W]) observed/measured by the UE, only in OFDM symbols containing reference symbols for antenna port 0, in the measurement bandwidth, over N number of resource blocks from all sources (including co-channel serving and non-serving cells), channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

[RSSI]

The received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

In accordance with the above-mentioned definitions, the UE configured to operate in the LTE system may measure the RSRP through IE (information element)-associated with Allowed Measurement Bandwidth (AMB) transmitted in SIB3 (System Information Block Type 3) in the case of Intra-Frequency measurement, or may measure the RSRP at one bandwidth selected from among 6RB (Resource Block), 15RB, 25RB, SORB, 75RB, and 100RB through allowed measurement bandwidth (AMB) transmitted in SIBS (System Information Block Type 5) in the case of Inter-frequency measurement. Alternatively, if the information element (IE) is not present, the UE configured to operate in the LTE system may measure the RSRP in a frequency bandwidth of the entire DL system as a default. In this case, if the UE receives the allowed measurement bandwidth, the UE may assume that the corresponding value is a maximum measurement bandwidth, such that the UE can freely measure the RSRP value within the corresponding value. However, if the serving cell transmits the IE defined as WB(wideband)-RSRQ and sets the allowed measurement bandwidth to SORB or higher, the UE must calculate the RSRP value regarding the entire allowed measurement bandwidth. Meanwhile, RSSI may be measured in the frequency bandwidth allocated to the receiver of the UE according to the RSSI bandwidth definition.

Figure 14:
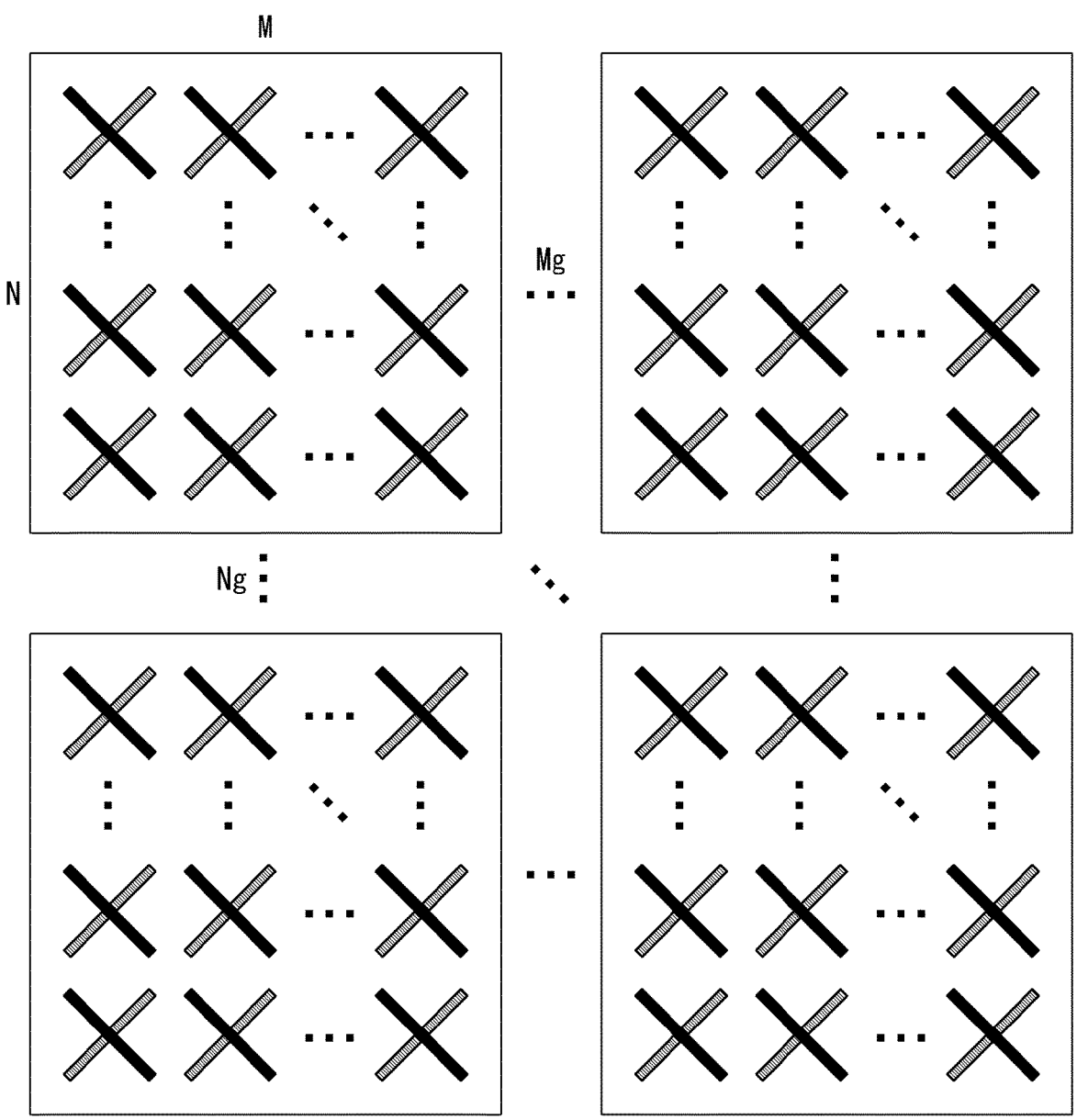
FIG. 14 illustrates a panel antenna array to which the present invention is applicable.

FIG. 14 illustrates a panel antenna array to which the present invention is applicable.

Referring to FIG. 14, the panel antenna array consists of Mg panels in the horizontal domain and Ng panels in the vertical domain, and each panel may consist of M columns and N rows. Particularly, the panels as used herein are illustrated with respect to X-pol (cross polarization) antennas. Accordingly, the total number of antenna elements in FIG. 17 may be 2*M*N*Mg*Ng.

Propose New Codebook

In an environment, such as New RAT, for more precise CSI feedback, a linear combination or feedback having high resolution, such as covariance feedback, are taken into consideration. However, a normal resolution codebook, such as the Class A codebook of the existing LTE system, may also be necessary because a feedback payload size necessary for such high resolution feedback is also increased.

Accordingly, the present invention proposes a new codebook design capable of improving performance of the existing LTE codebook based on such normal resolution.

As in FIG. 14, in the New RAT, a multi-panel function is supported, but this specification proposes a codebook design by first taking a single panel into consideration, for convenience of description.

2D discrete Fourier transform (DFT) beam to be applied to a 2D antenna array within one panel may be defined like Equation 14.

$$W_{m_1,m_2} = \frac{v_{m_1} \otimes u_{m_2}}{\sqrt{N_1 N_2}}$$ [Equation 14]

$$v_{m_1} = \left[1 \exp\left(j\frac{2\pi m_1}{o_1 N_1}\right) \ldots \exp\left(j\frac{2\pi m_1(N_1-1)}{o_1 N_1}\right)\right]^T$$

$$u_{m_2} = \left[1 \exp\left(j\frac{2\pi m_2}{o_2 N_2}\right) \ldots \exp\left(j\frac{2\pi m_2(N_2-1)}{o_2 N_2}\right)\right]^T$$

In this case, m1 and m2 correspond to the 1D-DFT codebook indices of the first and the second domains, respectively. Furthermore, N1 and N2 correspond to the number of antenna ports for each polarization of each of the $1^{st}$ dimension and the $2^{nd}$ dimension, respectively, in a panel. o1 and o2 correspond to oversampling factors of the $1^{st}$ dimension and the $2^{nd}$ dimension, respectively, in the panel.

A codebook proposed as in Equation 14 follows a dual stage structure, such as Equation 15.

$$W=W_1 W_2$$ [Equation 15]

In this case, W1 (first PMI) indicates a long-term/wideband characteristic and chiefly performs the role of wideband power control for each beam grouping and/or beam. W2 (second PMI) indicates a short-term/subband characteristic, and performs a beam selection role within a beam group selected by W1 and a co-phase role for each polarization of an antenna port having a cross polarization.

Figure 15:
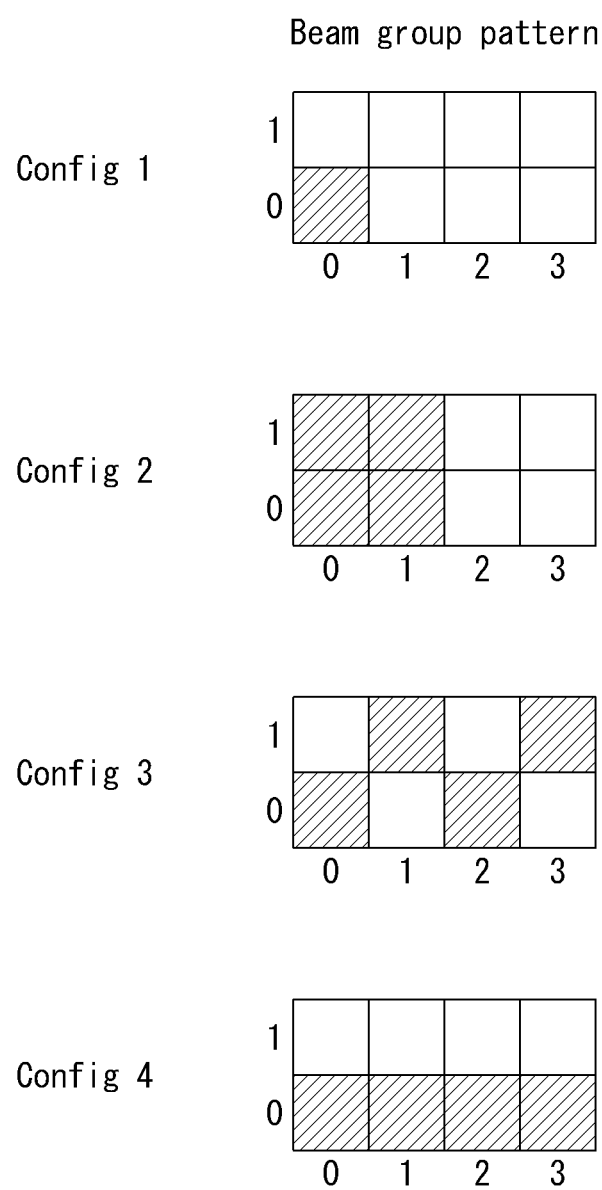
FIG. 15 illustrates a beam group pattern for each config in the Rel-13 Class A codebook, which may be applied to the present invention.

FIG. 15 illustrates a beam group pattern for each Config in the Rel-13 Class A codebook, which may be applied to the present invention.

The existing LTE-A codebook is characterized in that W1 is configured so that the spacing between a plurality of beams within a beam group is uniform. In the Rel-13 Class A codebook, a 2D beam group is supported in order to support a 2D antenna array. Even in this case, the spacing between beans is uniformly formed as in FIG. 15.

In such a uniform pattern, a closed spaced beam group is advantageous if angular spread (first and/or second domain) is small. A widely spaced beam group as in Rel-12 is advantageous if angular spread is large. However, there is a problem in that a codebook suitable for each environment must be configured because the beam spacing is determined for each codebook Config or for each rank. In order to solve this problem, the present invention proposes a method of configuring a W1 group non-uniformly.

Figure 16:
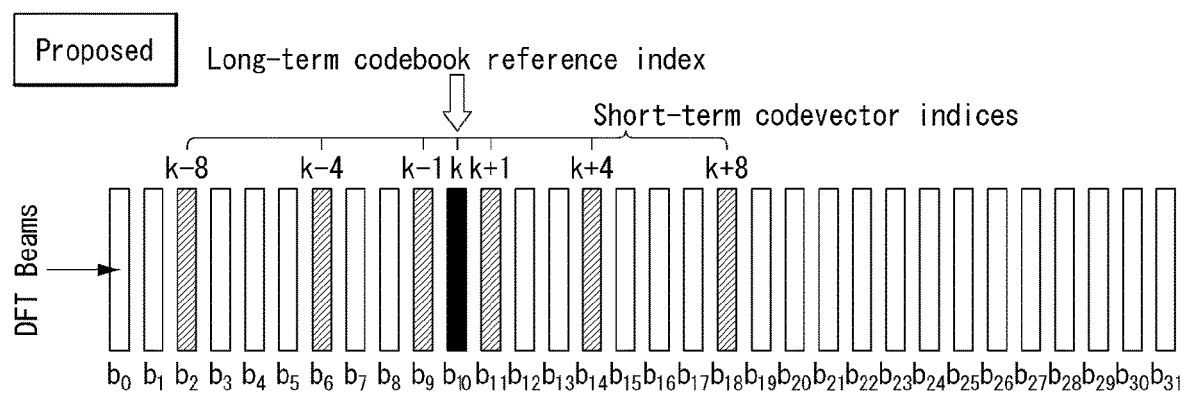
FIG. 16 is a diagram illustrating W1 grouping if N1=4, N2=1, and O1=8 according to an embodiment of the present invention.

FIG. 16 is a diagram illustrating W1 grouping if N1=4, N2=1, and O1=8 according to an embodiment of the present invention. Particularly, FIG. 16 is a diagram illustrating a method of configuring a W1 beam group non-uniformly (e.g., samples of a Gaussian distribution).

As shown in FIG. 16, a beam group may be configured with [k−8, k−4, k−1, k, k+1, k+4, k+8] on the basis of a long-term codebook index k. The codebook indices may be grouped like $$\left[k_1 - O_1 \quad k_1 - \frac{O_1}{2} \quad k_1 - 1 \quad k_1 \quad k_1 + 1 \quad k_1 + \frac{O_1}{2} \quad k_1 + O_1\right]$$

or $[k_1-2O_1\ k_1-O_1\ k_1-O_1\ k_1-1\ k_1\ k_1+1\ k_1+O_1\ k_1+2O_1]$ by matching the codebook indices with more configurable parameters O1, O2. In this case, k1 indicates the $1^{st}$ domain W1 index of k, and k2 indicates the $2^{nd}$ domain W1 index of k.

The above-described grouping method may be represented like $[k_1-q_1 O_1\ k_1-q_2 O_1\ k_1-q_3 O_1\ k_1\ k_1+q_3 O_1\ k_1+q_2 O_1\ k_1+q_1 O_1]$ if it is represented as a function of O1, O2. In this case, q1, q2 and q3 are real number values, and may be pre-defined/set or may be set in a UE by a base station. The above-described beam grouping method is characterized in that it can improve granularity when a non-orthogonal beam and an orthogonal beam are mixed to configure a Rank 2 codebook.

The W1 beam group design is a method proposed if N1>=N2. A W1 beam group design if N2>N1 may be configured by substituting a k1 index with a k2 index and an O1 index with an O2 index in the W1 beam group design if N1>=N2. And/or one beam group may be used for all port layouts.

And/or a beam group is generalized like $[k_1-p_3\ k_1-p_2\ k_1-p_1\ k_1\ k_1+p_1\ k_1+p_2\ k_1+p_3]$, but beam spacing parameters p1, p2 and p3 may be defined so that they are configurable by a base station or may be previously agreed between a base station and a UE. And/or to set specific elements (e.g., p1 and p2) of elements configuring a beam group as specific values by mixing the above-described methods, but to set a different element (e.g., p3) as a real number multiple of O1 may also be taken into consideration. For example, a beam group may be configured like $[k_1-q_1 O_1\ k_1-p_2\ k_1-p_1\ k_1\ k_1+p_1\ k_1+p_2\ k_1+q_1 O_1]$ In this case, q1, p1 and p2 may be previously agreed or may be configured in a UE by a base station through higher layer signaling.

k1 and k2 indices may be determined by beam group spacing parameters s1 and s2. For example, if s1=2, s2=2, the k1 index may be determined like 0, 2, 4, . . . , N1O1/s1−1, and the k2 index may be determined like 0, 2, 4, . . . , N2O2/s2−1 In an operation aspect, the k1 and k2 indices may be calculated by applying "modulo N1O1" or "modulo N2O2" operation to a beam index that exceeds a value of N1O1 and/or N2O2.

If the above-described W1 is combined with a W2 design to be described later, unlike in LTE, Rank 1 and Rank 2 may have a characteristic in that they have different beam groups. That is, Rank 1 and/or 2 codebook may be configured as a universal set or subset of the above-described beam group.

For example, a beam group of Rank 1 may be configured like $$\left[k_1 - \frac{O_1}{2} \quad k_1 - 1 \quad k_1 + 1 \quad k_1 + \frac{O_1}{2}\right],$$

and a beam group of Rank 2 may be configured like $$\left[ k_1 - O_1 \quad k_1 - \frac{O_1}{2} \quad k_1 - 1 \quad k_1 \quad k_1 + 1 \quad k_1 + \frac{O_1}{2} \quad k_1 + O - 1 \right].$$

As another embodiment, in the case of Rank 1, $$\left[ k_1, k_1 + 1, k_1 + \frac{O_1}{2}, k_1 + O_1 \right]$$

may be used for a non-uniform beam group. A form of a W1 matrix using such a beam group is the same as Equation 16. Equation 16 is characterized in that codewords are identical for each polarization.

$$W_1 = \begin{bmatrix} \tilde{W}_1 & 0 \\ 0 & \tilde{W}_1 \end{bmatrix}$$ [Equation 16]

$$\tilde{W}_1 = [\, b_{k_1-8} \quad b_{k_1-4} \quad b_{k_1-1} \quad b_{k_1} \quad b_{k_1+1} \quad b_{k_1+4} \quad b_{k_1+8} \,]$$

In this case, b indicates a 1D-DFT beam in FIG. 16, and may be defined like $$\frac{v_i}{\sqrt{N_1}} = b_i$$

of Equation 14.

The codebook design may be expanded and applied to a 2D, and a design principle thereof is similar to the 1D design. If the beam pattern of W1 is expanded to the 2D, it may be advantageous if both angular spreads of the $1^{st}$ and $2^{nd}$ domains are incorporated into a codebook because they are great. As an example of such 2D expansion, patterns shown in FIG. 17 may be taken into consideration.

Figure 17:
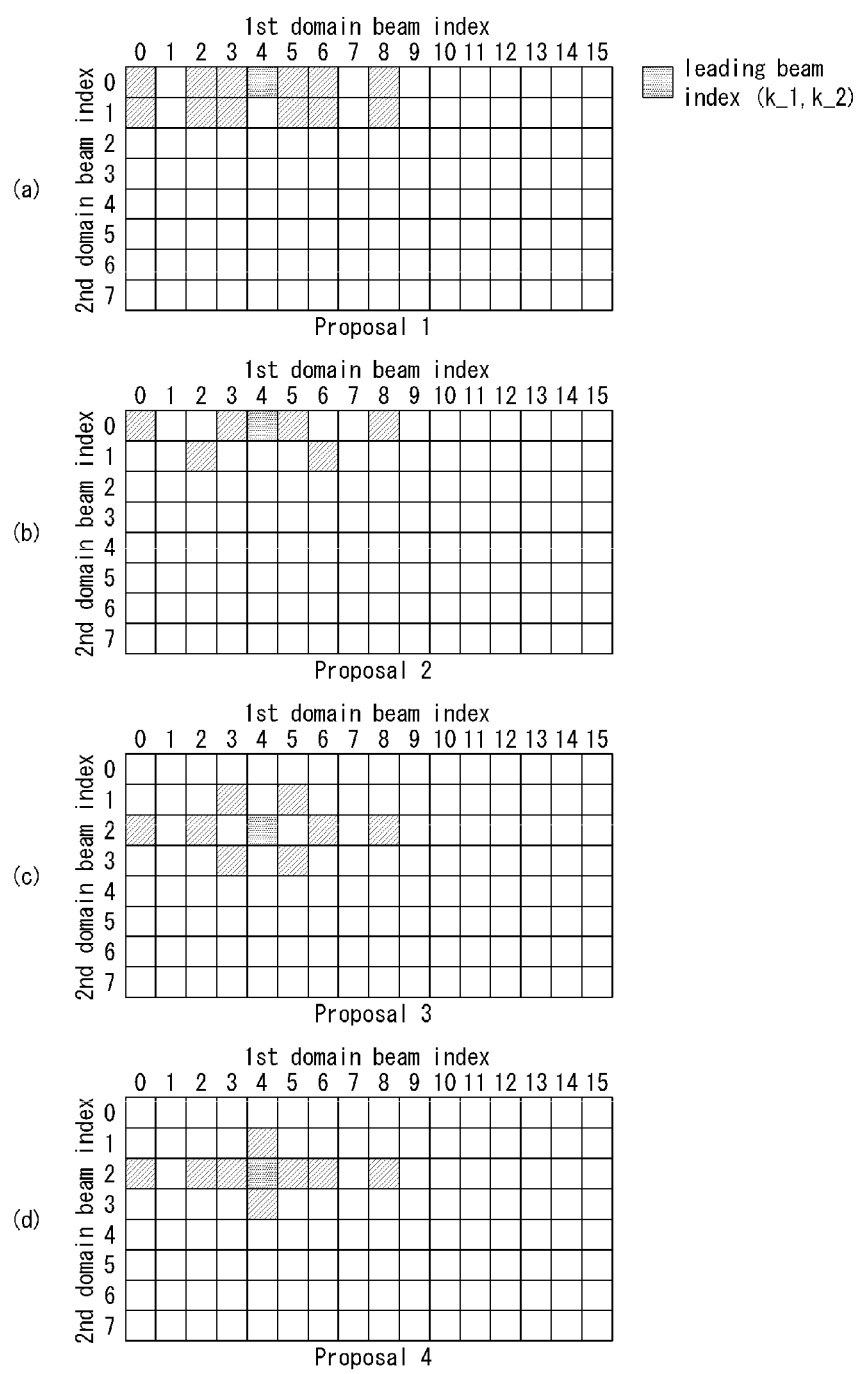
FIG. 17 is a diagram illustrating W1 grouping if N1=4, N2=2, O1=4, and O2=4 according to an embodiment of the present invention.

FIG. 17 is a diagram illustrating W1 grouping if N1=4, N2=2, O1=4, and O2=4 according to an embodiment of the present invention.

The pattern of FIG. 17(*a*) is an embodiment in which a 1D W1 pattern is duplicated to cover a 2D. If the pattern is used, there is a disadvantage in that payload of W2 is doubled.

The pattern of FIG. 17(*b*) shows a case where beams corresponding to a non-uniform pattern have different second beam indices and span the 2D domain as in Equation 17.

[Equation 17]

$$\left[ (k_1 - O_1, k_2) \quad \left(k_1 - \frac{O_1}{2}, k_2 + 1\right) \quad (k_1 - 1, k_2) \quad (k_1, k_2) \quad (k_1 + 1, k_2) \quad \left(k_1 + \frac{O_1}{2}, k_2 + 1\right) \quad (k_1 + O_1, k_2) \right]$$

In this case, in the case of Rank 1, a beam group of $$\left[ \left(k_1 - \frac{O_1}{2}, k_2 + 1\right) \quad \left(k_1 - \frac{O_1}{2}, k_2 + 1\right) \quad (k_1, k_2 + 1) \quad \left(k_1 + \frac{O_1}{2}, k_2 + 1\right) \right]$$

may be used. In the case of Rank 2, as will be described later, a beam group (i.e., a beam group of Rank 1) may be used as a beam candidate for producing Rank 2 using a combination of the same beams. For example, if a b=(x, y) beam is selected in the beam group of Rank 1, a Rank 2 codebook may be configured like [b b; $\phi_n$*b–$\phi_n$*b].

Furthermore, in the case of Rank 2 configured with a combination of different beams among combinations of the beams (such as Equation 17), three candidate combinations, such as $$((k_1 - O_1, k_2), (k_1, k_2)), ((k_1 + O_1, k_2), (k_1, k_2)),$$

$$\left( \left(k_1 - \frac{O_1}{2}, k_2\right), \left(k_1 + \frac{O_1}{2}, k_2\right) \right),$$

may be used.

As another embodiment, a beam group, such as FIG. 17(*c*), may be used. In this case, in the case of Rank 1, a beam group of [($k_1$–1, $k_2$–1) ($k_1$–1, $k_2$+1) ($k_1$+1, $k_2$–1) ($k_1$+1, $k_2$+1)] may be used. In the case of Rank 2, as will be described later, a beam group (i.e., a beam group of Rank 1) may be used as a beam candidate for producing Rank 2 using a combination of the same beams.

Furthermore, in the case of Rank 2 configured with a combination of different beams among combinations of beams (such as Equation 17), three candidate combinations, such as $$((k_1 - O_1, k_2), (k_1, k_2)), ((k_1 + O_1, k_2), (k_1, k_2)),$$

$$\left( \left(k_1 - \frac{O_1}{2}, k_2 + 1\right), \left(k_1 + \frac{O_1}{2}, k_2 + 1\right) \right),$$

may be used.

As another embodiment, a beam group, such as FIG. 17(*d*), may be used. In this case, in the case of Rank 1, a beam group of [($k_1$, $k_2$–1) ($k_1$, $k_2$+1) ($k_1$–1, $k_2$) ($k_1$+1, $k_2$)] may be used. In the case of Rank 2, as will be described later, a beam group (i.e., a beam group of Rank 1) may be used as a beam candidate for producing Rank 2 using a combination of the same beams.

Furthermore, in the case of Rank 2 configured with a combination of different beams among combinations of beams (such as Equation 17), three candidate combinations, such as $$((k_1 - O_1, k_2), (k_1, k_2)), ((k_1 + O_1, k_2), (k_1, k_2)),$$

-continued $$\left( \left(k_1 - \frac{O_1}{2}, k_2 + 1\right), \left(k_1 + \frac{O_1}{2}, k_2 + 1\right) \right),$$

may be used.

FIGS. 17(*c*) and 17(*d*) may be applied more advantageously if angular spread of the $2^{nd}$ domain is large because a $2^{nd}$ domain region covered by W1 is wide compared to FIG. 17(*b*). Which pattern of the proposed W1 patterns will be applied or used may be signaled by a higher layer (e.g., RRC or MAC CE) or may be previously agreed/defined as a single specific codebook.

And/or whether to use a 1D non-uniform W1 codebook or a 2D non-uniform W1 codebook may be determined based on an antenna port layout. That is, a UE may be configured/applied to use a codebook (e.g., Class A Config 1 or 4) suitable for the proposed 1D codebook or 1D if N2=1 (or N1=1) and to use a 2D non-uniform codebook or a (e.g., Class A Config 2 or 3 suitable for 2D) codebook having a 2D W1 pattern if N2>1.

W2 is configured with a beam selector and co-phase for given W1.

In the case of Rank 1, as in LTE, W2 may be defined like $$\frac{1}{\sqrt{2}}\begin{bmatrix} e_i \\ \phi_n e_i \end{bmatrix}.$$

In this case, $e_k$ has a value of "1" only in a k-th element, the remainder is a selection vector having a value of "0", and $\phi_n$ performs a co-phase role between polarization antenna port groups, and a value thereof may be $\{1,j,-1,-j\}$.

In the case of Rank 2, W2 has a structure, such as $$\frac{1}{2}\begin{bmatrix} e_i & e_j \\ \phi_n e_i & -\phi_n e_j \end{bmatrix},$$

and values of i and j may be the same or different (i.e., means that 2 orthogonal beams configuring Rank 2 may be the same or different).

First, a case where i=j is described. In this case, orthogonality between two layers is guaranteed by Walsh code. Equation 18 is obtained by substituting the codebook into a capacity equation from a single user (SU)-MIMO.

$$\log_2|I+P^H H^H HP|=\log_2|I+HPP^H H^H| \quad (\because \det(I_m+AB)=\det(I_m+BA)) \quad \text{[Equation 18]}$$

In this case, A and B correspond to an m×n size matrix and an n×m size matrix. Ia corresponds to a unit matrix having an a order, and a superscript H indicates a conjugate transpose.

In this case, Equation 19 is obtained by indicating a precoder P(W=W1W2) as a given matrix.

$$P=\begin{bmatrix} w_i & w_i \\ \phi_n w_i & -\phi_n w_i \end{bmatrix} \quad \text{[Equation 19]}$$

$$PP^H = \left(\begin{bmatrix} 1 & 1 \\ \phi_n & -\phi_n \end{bmatrix} \otimes w_i\right)\left(\begin{bmatrix} 1 & 1 \\ \phi_n & -\phi_n \end{bmatrix} \otimes w_i\right)^H$$

$$= \left(\begin{bmatrix} 1 & 1 \\ \phi_n & -\phi_n \end{bmatrix} \otimes w_i\right)\left(\begin{bmatrix} 1 & 1 \\ \phi_n & -\phi_n \end{bmatrix}^H \otimes w_i^H\right)$$

$$= \begin{bmatrix} 2 & 0 \\ 0 & 1+\phi_n^2 \end{bmatrix} \otimes (w_i \otimes w_i^H) \because (A \otimes B)(C \otimes D) = (AC) \otimes (BD).$$

Referring to Equation 19, if an absolute value of $\phi_n$ is identical, SU MIMO performance is never influenced although Rank 2 (or Rank 2 codebook/W2) is configured by selecting the same beams. Accordingly, the present invention proposes that a co-phase value is fixed to a specific value (e.g., $\phi_n=1$) if a Rank 2 codebook is configured by selecting the same beam.

If i≠j, there is proposed to configure a Rank 2 codebook by selecting or combining orthogonal beams of beams that configure W1 in order to guarantee the orthogonality of the Rank 2 codebook. That is, for example, the remaining codewords of Rank 2 may be configured through a combination/selection, such as {k+4, k-4}, {k+8, k}, {k, k-8}, in the examples of the method of configuring W1, described above with reference to FIG. 16. In this case, QPSK (e.g., $\{1,j,-1,-j\}$) may be fully used as a co-phase value.

That is, the proposed Rank 2 codebook is characterized in that an applied co-phase value is differently set depending on a case where the codebook is configured by combining the same beams and a case where the codebook is configured by combining different beams. This means that the granularity of an applied co-phase value is differently configured/defined if the Rank 2 codebook is configured by combining the same beams and if the Rank 2 codebook is configured by combining different beams. That is, the granularity of a co-phase value for a Rank 2 codebook configured by combining the same beams may be configured or defined to be lower than that of a co-phase value for a Rank 2 codebook configured by combining different beams. For example, in the former case, only one co-phase representative value of (e.g., $\phi_n=1$) may be set/used (in this case, a bit size necessary for co-phase feedback is 1 bit). In the case of the latter, a total of 4 (e.g., $\phi_n=\{1,j,-1,-j\}$) co-phase values may be used based on QPSK (in this case, a bit size necessary for co-phase feedback 2 bits). This may be interpreted that feedback-bit/granularity or a candidate group (the number of candidates) of an applicable co-phase value is differently determined depending on whether beams configuring the Rank 2 codebook are the same or different. This may be expanded to a case where the granularity of a co-phase is differently configured depending on whether corresponds beam subgroups are the same or different because the number of ranks is expanded to 3 or more if a plurality of beam subgroups is selected by a UE. This is described later with reference to FIGS. 30 and 31.

A comparison between $$W^{(2)}_{2i_{11}-\frac{O_1}{2},2i_{12},2i_{11}+\frac{O_1}{2},2i_{12},2}, W^{(2)}_{2i_{11}+\frac{O_1}{2},2i_{12},2i_{11}-\frac{O_1}{2},2i_{12},0}$$

is described below. It may be seen that they have a permutation form in which the values of columns configuring a codebook matrix are the same and only sequences have been changed. The present invention proposes a co-phase value based on QPSK regardless of permutation because permutation does not affect codebook performance.

The proposed codebooks are shown in Table 5 and Table 6.

TABLE 5

| $i_2$ | 0 | 1 | 2 |
|---|---|---|---|
| $i_{11}, i_{12}$ | $W^{(1)}_{2i_{11}-\frac{O_1}{2},2i_{12},0}$ | $W^{(1)}_{2i_{11}-\frac{O_1}{2},2i_{12},1}$ | $W^{(1)}_{2i_{11}-\frac{O_1}{2},2i_{12},2}$ |
| $i_2$ | 3 | 4 | 5 |
| $i_{11}, i_{12}$ | $W^{(1)}_{2i_{11}-\frac{O_1}{2},2i_{12},3}$ | $W^{(1)}_{2i_{11}-1,2i_{12},0}$ | $W^{(1)}_{2i_{11}-1,2i_{12},1}$ |
| $i_2$ | 6 | 7 | 8 |

TABLE 5-continued

| $i_{11}, i_{12}$ | $W^{(1)}_{2i_{11}-1,2i_{12},2}$ | $W^{(1)}_{2i_{11}-1,2i_{12},3}$ | $W^{(1)}_{2i_{11}+1,2i_{12},0}$ |
|---|---|---|---|
| $i_2$ | 9 | 10 | 11 |
| $i_{11}, i_{12}$ | $W^{(1)}_{2i_{11}+1,2i_{12},1}$ | $W^{(1)}_{2i_{11}+1,2i_{12},2}$ | $W^{(1)}_{2i_{11}+1,2i_{12},3}$ |
| $i_2$ | 12 | 13 | 14 |
| $i_{11}, i_{12}$ | $W^{(1)}_{2i_{11}+\frac{O_1}{2},2i_{12},0}$ | $W^{(1)}_{2i_{11}+\frac{O_1}{2},2i_{12},1}$ | $W^{(1)}_{2i_{11}+\frac{O_1}{2},2i_{12},2}$ |
| $i_2$ | 15 | | |
| $i_{11}, i_{12}$ | $W^{(1)}_{2i_{11}+\frac{O_1}{2},2i_{12},3}$ | | | where $W^{(1)}_{m_1,m_2,n} = \frac{1}{\sqrt{2N_1N_2}} \begin{bmatrix} v_{m_1} \otimes u_{m_2} \\ \varphi_n v_{m_1} \otimes u_{m_2} \end{bmatrix}$, $\varphi_n = \exp\left(\frac{j2\pi n}{4}\right)$

TABLE 61

| $i_2$ | 0 | 1 | 2 | 3 |
|---|---|---|---|---|
| $i_{11}, i_{12}$ | $W^{(2)}_{2i_{11}-\frac{O_1}{2},2i_{12},2i_{11}-\frac{O_1}{2},2i_{12},0}$ | $W^{(2)}_{2i_{11}-1,2i_{12},2i_{11}-1,2i_{12},0}$ | $W^{(2)}_{2i_{11}+1,2i_{12},2i_{11}+1,2i_{12},0}$ | $W^{(2)}_{2i_{11}+\frac{O_1}{2},2i_{12},2i_{11}+\frac{O_1}{2},2i_{12},0}$ |
| $i_2$ | 4 | 5 | 6 | 7 |
| $i_{11}, i_{12}$ | $W^{(2)}_{2i_{11}-\frac{O_1}{2},2i_{12},2i_{11}+\frac{O_1}{2},2i_{12},0}$ | $W^{(2)}_{2i_{11}-\frac{O_1}{2},2i_{12},2i_{11}+\frac{O_1}{2},2i_{12},1}$ | $W^{(2)}_{2i_{11}-\frac{O_1}{2},2i_{12},2i_{11}+\frac{O_1}{2},2i_{12},2}$ | $W^{(2)}_{2i_{11}-\frac{O_1}{2},2i_{12},2i_{11}+\frac{O_1}{2},2i_{12},3}$ |
| $i_2$ | 8 | 9 | 10 | 11 |
| $i_{11}, i_{12}$ | $W^{(2)}_{2i_{11}-O_1,2i_{12},2i_{11},2i_{12},0}$ | $W^{(2)}_{2i_{11}-O_1,2i_{12},2i_{11},2i_{12},1}$ | $W^{(2)}_{2i_{11}-O_1,2i_{12},2i_{11},2i_{12},2}$ | $W^{(2)}_{2i_{11}-O_1,2i_{12},2i_{11},2i_{12},3}$ |
| $i_2$ | 12 | 13 | 14 | 15 |
| $i_{11}, i_{12}$ | $W^{(2)}_{2i_{11},2i_{12},2i_{11}+O_1,2i_{12},0}$ | $W^{(2)}_{2i_{11},2i_{12},2i_{11}+O_1,2i_{12},1}$ | $W^{(2)}_{2i_{11},2i_{12},2i_{11}+O_1,2i_{12},2}$ | $W^{(2)}_{2i_{11},2i_{12},2i_{11}+O_1,2i_{12},3}$ | where $W_{m_1,m_2,m'_1,m'_2,n} = \frac{1}{\sqrt{2N_1N_2}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix}$, $\varphi_n = \exp\left(\frac{j2\pi n}{4}\right)$, In the above table, $i_{11}$ is identical with k1, and i12 is identical with k2.

Table 5 is a codebook example written based on a beam group of $$\left[ k_1 - O_1 \quad k_1 - \frac{O_1}{2} \quad k_1 - 1 \quad k_1 \quad k_1 + 1 \quad k_1 + \frac{O_1}{2} \quad k_1 + O_1 \right].$$

The codebook example may be expanded and applied like $[k_1-p_3 \; k_1-p_2 \; k_1-p_1 \; k_1 \; k_1+p_1 \; k_1+p_2 \; k_1+p_3]$.

In the codebooks of Table 5 and Table 6, s1=2, s=2 configuration has been assumed/applied, but s1=1, s2=2 configuration has been assumed/applied for higher performance. Furthermore, the codebooks of Table 5 and Table 6 have been configured, assuming that payload of W2 is 4 bits, but may be expanded and applied to a larger or smaller W2 payload size using the principle proposed in this specification.

More specifically, a beam group of W1 is configured with a beam group having 4 beams like $$\left[ k_1 - \frac{O_1}{2} \quad k_1 - 1 \quad k_1 + 1 \quad k_1 + \frac{O_1}{2} \right].$$

In the case of Rank 2, the beam group may be configured with a beam group having 7 beams like $$\left[ k_1 - O_1 \quad k_1 - \frac{O_1}{2} \quad k_1 - 1 \quad k_1 \quad k_1 + 1 \quad k_1 + \frac{O_1}{2} \quad k_1 + O_1 \right].$$

A codebook has a characteristic in that Ranks 1 and 2 use different beam groups unlike in LTE.

In the above table, if an index, such as $2i_{11}-O_1$, exceeds grid of beams (GoB) (m1=0, . . . O1N1−1, m2=0, . . . , O2N2−1), such as that the index has a negative value, modulo N1O1 or modulo N2O2 operation may be applied to a corresponding index value, and is omitted in the above tables, for convenience of description.

As described above, the present invention has been focused on SU-MIMO and proposed. In the case of multi-user (MU)-MIMO, it may be effective to use a codebook in which channel information can be represented more variously (i.e., granularity is high). Furthermore, in the case of a UE having sufficiently good geometry, the influence of inter-stream interference attributable to a channel estimation error may be smaller than a UE having low geometry although the UE having sufficiently good geometry is supported as a UE MU. Accordingly, the UE may notify a base station whether it will be supported as an MU or an SU. Accordingly, the UE may report CSI using a codebook of different resolution (e.g., the cardinality/granularity of a co-phase is different). Alternatively, a base station may configure a codebook having a different W2 size in a UE depending on whether the UE is supported by SU or MU-MIMO.

The above-described codebook design principle may be applied to a case where a beam group of W1 is configured with 2 beams (L=2). That is, a beam pattern example if L=2 is shown in FIG. 18.

Figure 18:
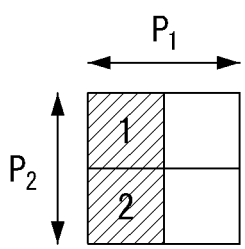
FIG. 18 illustrates W1 beam grouping if L=2 according to an embodiment of the present invention.
Figure 18:
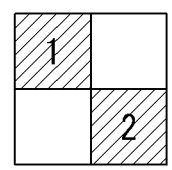
Figure 18:
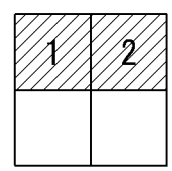
Figure 18:
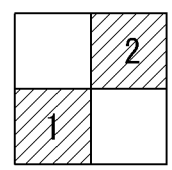

FIG. 18 illustrates W1 beam grouping if L=2 according to an embodiment of the present invention.

In this example, in the case of Rank 1, $$W_2^{(1)} = \frac{1}{\sqrt{2}} \begin{bmatrix} e_i \\ \phi_n e_i \end{bmatrix}.$$

In this case, $\phi_n = \{1, j, -1, -j\}$. In the case of Rank 2, $$W_2^{(2)} = \frac{1}{2} \begin{bmatrix} e_i & e_j \\ \phi_n e_i & -\phi_n e_j \end{bmatrix}, i, j \in \{1, 2\}.$$

As described above, the granularity of a co-phase value may be differently configured if beams selected for a codebook (or W2) configuration are the same beams and if beams selected for a codebook (or W2) configuration are different beams. For example, a codebook may be configured based on co-phase values, such as $e_i=e_j$, $\phi_n=\{1, j\}$ (if the same beams are selected/used) and $e_i \neq e_j$, $\phi_n=\{1,j,-1,-j\}$ (if different beams are selected/used). In this example, the W2 payload size of Rank 1 and Rank 2 is 3 bits.

In FIG. 18, p1 and p2 means the spacing between beams in the 1$^{st}$ domain and the 2$^{nd}$ domain in a beam group configuring W1. The spacing between beams is very small if the final beam is very sharp as in 32-port, for example, and thus does not provide many performance gains if a codebook is configured through beam selection, a different beam combination. Accordingly, p1 and p2 may be determined based on values of N1O1 and N2O2 (e.g., pi=1 is set if NiOi<16, and pi=2 is set if 16<=NiOi<32, and pi=4 is set if NiOi>=32). And/or a UE may be configured to report specific p1 and p2 values to a base station or a base station may configure them in a UE through higher layer signaling. In the method, the L value may also be expanded and applied to various cases (e.g., L=4, 6, 7, 8, . . . )

Hereinafter, there is proposed a codebook for multi-rank transmission using multiple antennas. In the codebook design, after a necessary variable is generalized and defined, an example to which this codebook may be applied is introduced. A codebook proposed hereinafter is configured as a dual codebook structure, and is designed using a DFT matrix.

First, a channel model for a design method of the present invention and a detailed application example thereof is described. The 3-dimensional spatial channel model (3D SCM) of TR 36.873 document announced in 3GPP was applied to the channel model. 3D SCM is a channel model that represents a cluster and a location distribution of UEs as a 3 dimension similar to the reality, and enables multiple path transmission using an environment generated as described above, and is suitable for representing a channel of a MIMO transmission environment. A channel model of 3D SCM may be represented like FIG. 19.

Figure 19:
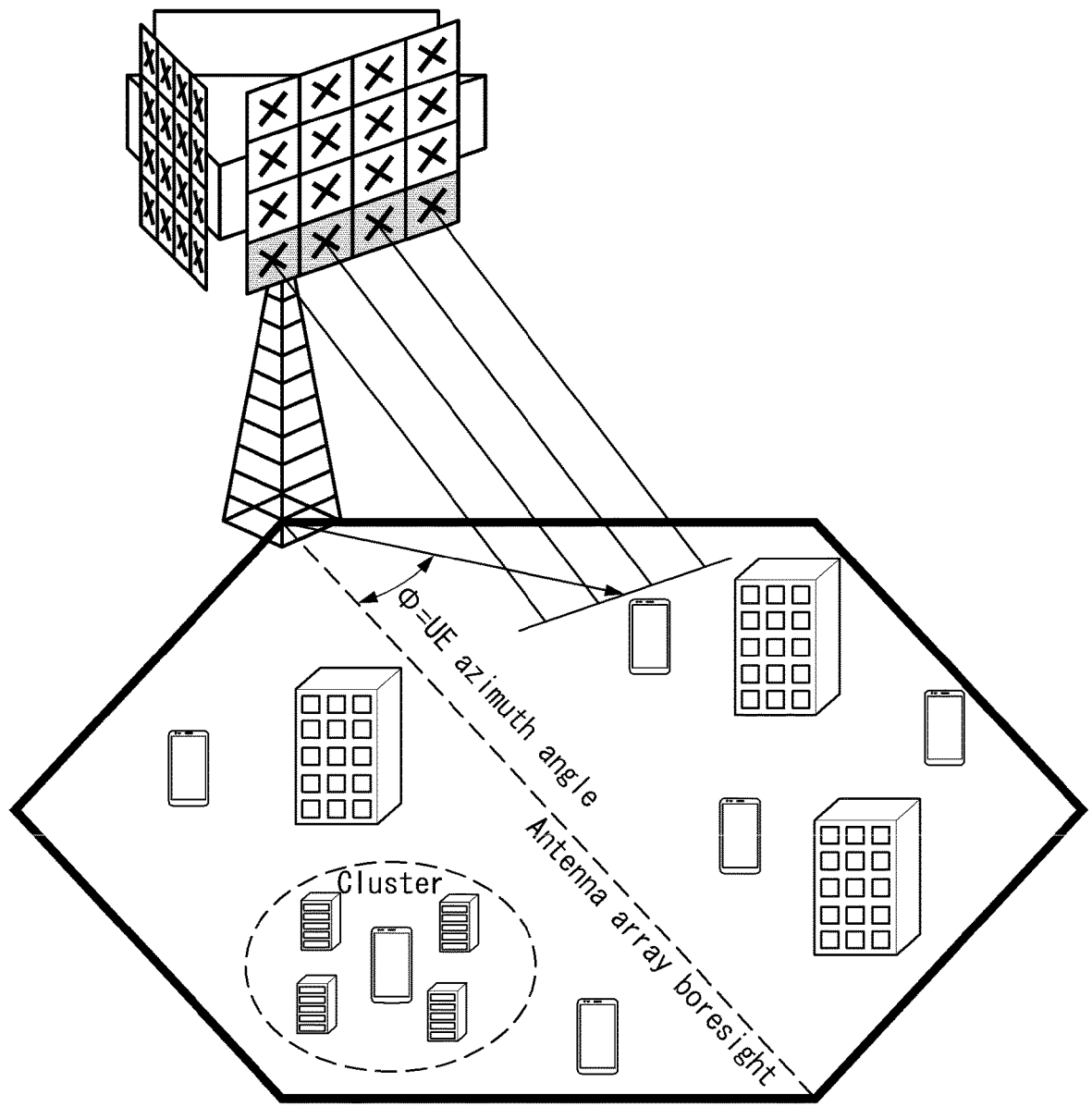
FIG. 19 illustrates a MIMO transmission model to which 3D SCM has been applied according to an embodiment of the present invention.

FIG. 19 illustrates a MIMO transmission model to which 3D SCM has been applied according to an embodiment of the present invention. In FIG. 19n $\Phi$ indicates an azimuth angle between a base station and a UE.

First, it is assumed that a downlink channel matrix of a k-th UE on which N_Rx antennas are mounted is $H_k=[h_1^T h_2^T \ldots h_N^T]^T$. In this case, $h_n=[h_{n,1} h_{n,2} \ldots h_{n,M}]$ means a channel vector received by an n-th Rx antenna from M Tx antennas. Assuming that a transmission rank, that is, the number of transmitted independent data layers, is R, it is assumed that the beamforming matrix of the k-th UE is $V_k=[v_1^T v_2^T \ldots v_R^T]^T$. In this case, $v_r$ means the beamforming vector of an r-th transmission layer. In this case, in multi-user MIMO in which K UEs are present, that is, in a multi-user MIMO (MU-MIMO) transmission environment, a signal received by the k-th UE may be represented like Equation 20

$$y_k = H_k V_k x_k + \sum_{j \neq k}^{K} H_j V_j x_j + n_k \qquad \text{[Equation 20]}$$

In this case, $x_k=[x_1 x_2 \ldots x_R]^T$ means a transmission data vector, and $n_k$ means the Gaussian noise vector of the k-th UE.

In order to evaluate performance of a codebook $W=\{W_1, W_2, \ldots, W_Q\}$ including Q codewords, that is, the candidates of a beamforming matrix $V_k$, an average correlation $\mu$ may be defined like Equation 21.

$$\mu = E[\det(V_k^H \overline{H}_k^H \overline{H}_k V_k)]$$

$$V_k = W_{n_k}, n_k = \text{argmax}_l \det(W_l^H \overline{H}_k^H \overline{H}_k W_l) \qquad \text{[Equation 21]}$$

In this case, $\overline{H}_k = H_k / \|H_k\|$ is a power-normalized channel matrix, and $V_k$ means a codeword that maximizes a code average correlation.

With respect to a signal-to-interference and noise ratio (SINR) $\gamma$, performance of a codebook may be evaluated using a coded channel capacity equation. The coded channel capacity may be defined like Equation 22.

$$C = E[\log_2(I + \gamma V_k^H \overline{H}_k^H \overline{H}_k V_k)]$$

$$V_k = W_{n_k}, n_k = \text{argmax}_l \det(I + \gamma V_k^H \overline{H}_k^H \overline{H}_k V_k) \qquad \text{[Equation 22]}$$

In this case, I is a unit matrix.

Prior to the description of the present invention, the existing codebooks having a dual codebook structure are first described based on a DFT matrix in addition to the present invention.

1) LTE Release 10 8-Tx Codebook

The LTE Release 10 8-Tx codebook W has a dual codebook structure configured with the product (i.e., $W=W_1 W_2$) of a long-term codebook $W_1$ and a short-term codebook $W_2$, and was designed using the 4×32 DFT matrix B. In this case, it is configured like the DFT matrix $B=[b_0 b_1 b_2 \ldots b_{31}]$, and each column vector satisfies Equation 23.

$$b_n = \frac{1}{2} \begin{bmatrix} 1 & e^{j 2 \frac{\pi}{32} n} & e^{j 2 \frac{2\pi}{32} n} & e^{j 2 \frac{3\pi}{32} n} \end{bmatrix}^T, n = 0, 1, \ldots, 31 \qquad \text{[Equation 23]}$$

A beam pattern $X^k$ configured with contiguous four $b_n$ satisfies Equation 24.

$$X^k = [b_{2k} b_{2k+1} b_{(2k+2) \bmod 32} b_{(2k+3) \bmod 32}], k=0,1,\ldots,15 \qquad \text{[Equation 24]}$$

A long-term codebook is defined like Equation 25.

$$W_1^k = [X^k 0; 0 X^k], k=0,1,\ldots,15 \qquad \text{[Equation 25]}$$

A base station selects one $W_1$ suitable for a long-term channel characteristic between the base station and a user among 16 $W_1$. $W_2$ is PMI, and designates a codevector corresponding to each layer in the selected $W_1$, and determines a cross phase difference (may also be called a "co-phase") between cross polarization antennas. This is defined like Equation 26 when a dual rank is transmitted.

$$W_2 \in \frac{1}{\sqrt{2}} \left\{ \begin{bmatrix} e_m & e_n \\ e_m & -e_n \end{bmatrix}, \begin{bmatrix} e_m & e_n \\ je_m & -je_n \end{bmatrix} \right\}, \quad \text{[Equation 26]}$$

$(m, n) \in$ $\{(1, 1), (2, 2), (3, 3), (4, 4), (1, 2)(2, 3), (1, 4), (2, 4)\}$

In this case, $e_n$ is a 4×1 vector whose n-th element is 1 and the remaining element is 0 (n=1, 2, 3, 4), and functions to select one of the 4 codevector of the selected $W_1$. 1,j is used as the cross phase difference value. In general, the codeword W satisfies Equation 27.

$$w = \frac{1}{2} \begin{bmatrix} b_m & b_n \\ \Phi b_m & -\Phi b_n \end{bmatrix}, w \in W \quad \text{[Equation 27]}$$

In Equation 27, $b_m$ and $b_n$ are determined/defined as one of vectors defined in Equation 23, and $\Phi$ means a cross phase difference.

Assuming that a reference index k is the index of a DFT matrix B, that is, the first column vector of $W_1$, Table 7 shows the structure (or the codevector index of the LTE Release 10 8-Tx codebook) of the LTE Release 10 8-Tx codebook according to the reference index k.

TABLE 7

| Index | m | n | $\Phi$ | Index | m | n | $\Phi$ |
|---|---|---|---|---|---|---|---|
| 0 | k | k | 1 | 0 | k | k | j |
| 1 | k + 1 | k + 1 | 1 | 1 | k + 1 | k + 1 | j |
| 2 | k + 2 | k + 2 | 1 | 2 | k + 2 | k + 2 | j |
| 3 | k + 3 | k + 3 | 1 | 3 | k + 3 | k + 3 | j |
| 4 | k | k + 1 | 1 | 4 | k | k + 1 | j |
| 5 | k + 1 | k + 2 | 1 | 5 | k + 1 | k + 2 | j |
| 6 | k | k + 3 | 1 | 6 | k | k + 3 | j |
| 7 | k + 1 | k + 3 | 1 | 7 | k + 1 | k + 3 | j |

2) Full $W_2$ Search

Full $W_2$ search is a method having performance improved by changing the PMI structure of the LTE Release 10 8-Tx codebook. A long-term codebook $W_1$ is the same as that of the method of the LTE Release 10 8-Tx codebook, but a change, such as Equation 28, was applied to the $W_2$ structure.

$$W_2 = \frac{1}{2} \begin{bmatrix} e_{m_1} & e_{n_1} \\ \Phi e_{m_2} & -\Phi e_{n_2} \end{bmatrix}, \quad \text{[Equation 28]}$$

$m_1, m_2, n_1, n_2 \in \{1, 2, 3, 4\}, \Phi \in \{1, -1, j, -j\}$

Equation 28 means all case of combinations capable of producing given $W_1$, and shows the best performance within selected $W_1$.

3) $W_1 + W_2$ Search $W_1 + W_2$ search is an expanded set of the LTE Release 10 8-Tx codebook and has a codebook structure, such as Equation 29.

$$W = \frac{1}{2} \begin{bmatrix} b_m & b_n \\ \Phi b_m & -\Phi b_n \end{bmatrix}, \quad \text{[Equation 29]}$$

$m, n = 0, 1, \ldots, 31, \Phi \in \{\pm 1, \pm j\}$

This has the structure of Equation 29. In this case, $b_m$ and $b_n$ may be determined/defined as one of vectors defined in Equation 23. That is, $W_1 + W_2$ search means an optimal codebook that may be produced using the elements of the LTE Release 10 8-Tx codebook. However, feedback overhead of the $W_1 + W_2$ search is 12 bits and has relatively high complexity.

4) Schober Codebook

In the case of the Schober codebook, the structure of $W_1$ and $W_2$ is the same as that of the Full $W_2$ search method, a condition "$|m_1-m_2|=|n_1-n_2|$, co-phasing $|\Phi|=1$" is added thereto. A total number of 127 cases satisfying the condition are present. The Schober codebook may be configured using 16 values having the best performance among the total number of 127 cases.

In the existing codebooks, such as the LTE Release 10 8-Tx codebook, the indices of codevectors are limited to the long-term codebook $W_1$ and are very dependent on $W_1$, but there is an advantage in that search complexity is low. In contrast, codevectors selected in the case of the $W_1+W_2$ search are not limited to $W_1$, but there is a disadvantage in that complexity is very high. Accordingly, hereinafter, there is proposed a codebook to which the advantages of the two codebooks have been applied.

Figure 20:
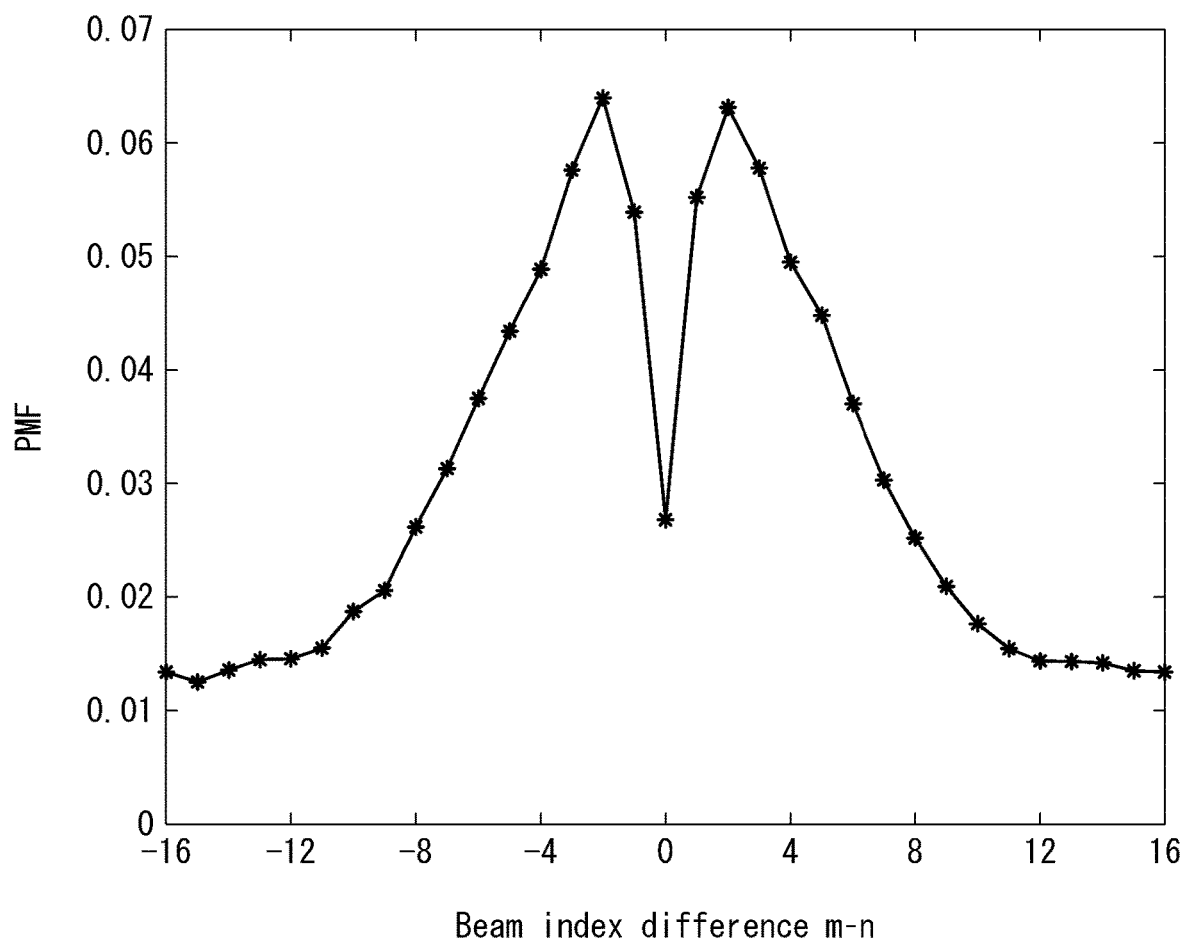
FIG. 20 illustrates the PDF of the distance between codevector indices, which is selected when $W\_1+W\_2$ search is executed.

FIG. 20 illustrates the PDF of the distance between codevector indices, which is selected when $W_1+W_2$ search is executed.

Particularly, FIG. 20 shows a difference between the codevector index m of the first transmission layer and the codevector index n of the second transmission layer of each UE when $W_1+W_2$ search is executed on UEs distributed in the entire cell. Although the azimuth angle of a UE is designated as a specific value, the difference has a tendency similar to that of FIG. 20.

Referring to the results of FIG. 20, it may be seen that a codevector index difference value between the first transmission layer and the second transmission layer has a quite different tendency compared to the LTE Release 10 8-Tx codebook having a minimum of 0 to a maximum of 3. Accordingly, in the case of this proposed codebook, the range of selected codevectors needs to be expanded unlike in the LTE Release 10 8-Tx codebook.

Furthermore, assuming that the first layer codevector index m and the second layer codevector index n are the same, a bit unnecessarily allocated to a cross phase difference $\Phi$ can be reduced.

In Equation 27, with respect to a given codebook W, the correlation $\mu$ may be represented as $\mu(m, n, \Phi)$, that is, a function of m, n, $\Phi$, and Equation 30 is established if m=n.

$$\mu(m,m,1)=\mu(m,m,-1)=\mu(m,m,j)=m,-j) \quad \text{[Equation 30]}$$

This means that in the case of m=n, it is sufficient if only a cross phase difference 1 is used. As a result, the number of bits allocated for cross phase difference indication can be reduced. This may be incorporated into the proposed codebook design, thereby being capable of improving efficiency.

Figure 21:
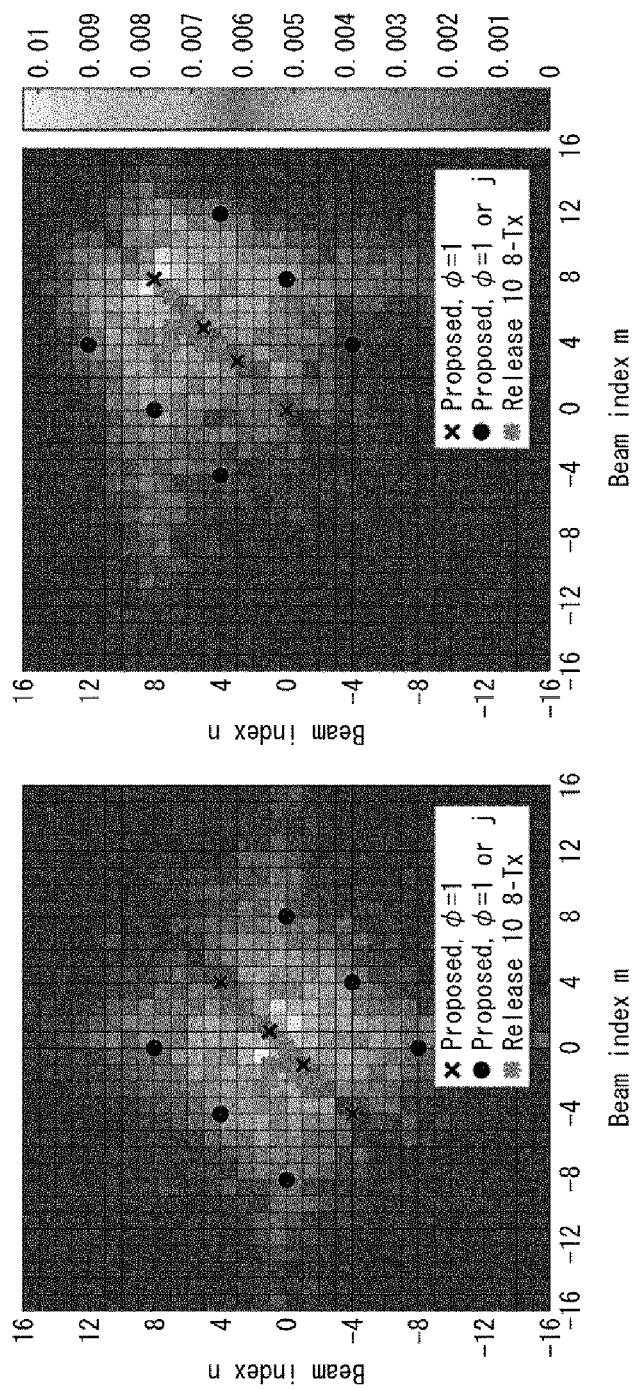
FIG. 21 is a diagram illustrating codevector locations in a two-dimensional index plane based on the azimuth of a UE.

FIG. 21 is a diagram illustrating codevector locations in a two-dimensional index plane based on the azimuth angle of a UE. Particularly, FIG. 21(a) illustrates a case where the azimuth angle of a UE is 0°, and FIG. 21(b) illustrates a case where the azimuth angle of a UE is 30°.

FIG. 21 represents the probability of codevector indices selected by Equation 21 when $W_1+W_2$ search is executed based on the azimuth angle of a UE. The UE has been randomly generated with respect to a given azimuth angle, and a corresponding channel constant is calculated through SCM. The axis labels of FIGS. 21 to 23 indicate codevector indices, and mean the column indices 0, 1, . . . , 31 of a 4×32 DFT matrix (indicated in the range of −15, −14, . . . , 16 by considering that the circulation period of the matrix is 32 in order to indicate the indices based on the index 0).

From the monitoring of the codevector selection probability of FIG. 21, it may be seen that the indices are widely distributed based on the reference index, unlike in the selection method of the LTE Release 10 8-Tx codebook. This means that the characteristics of a channel regarding codevector selection have not been incorporated into the LTE Release 10 8-Tx codebook.

Figure 22:
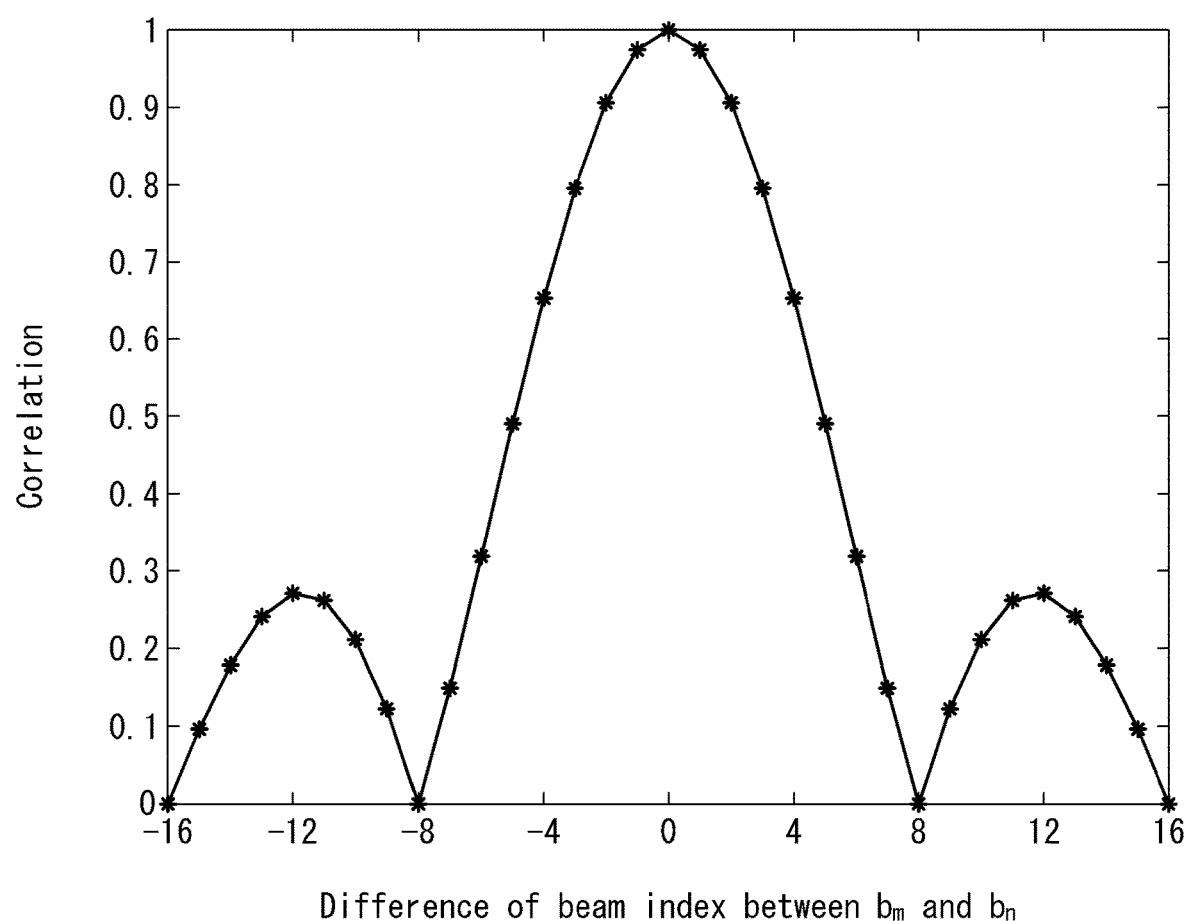
FIG. 22 shows a correlation based on a beam index difference.

FIG. 22 shows a correlation based on a beam index difference.

FIG. 22 shows a correlation between beams based on a difference between m and n. From FIG. 22, it may be seen that the correlation between beams is low as the difference between beam indices becomes closer to 8 or 16. Upon multi-rank transmission, interference between layers can be reduced if a beam having a low correlation is selected for each layer. It may be seen that in the Rel-10 8Tx codebook, that is, the current standard, a correlation between beams is very high because a difference between beam indices is small. Accordingly, the proposed codebook may be designed by incorporating such a characteristic into the proposed codebook.

The present invention proposes a common parameterized codebook suitable for multi-rank transmission in the MIMO system. Parameters are introduced and used in order to generate a codevector, but some of the parameters may be omitted according to the situation. A proposed codebook is configured with a group A, that is, m=n, and a group B, that is, m≠n. The definition of the proposed codebook is described with reference to FIG. 23.

Figure 23:
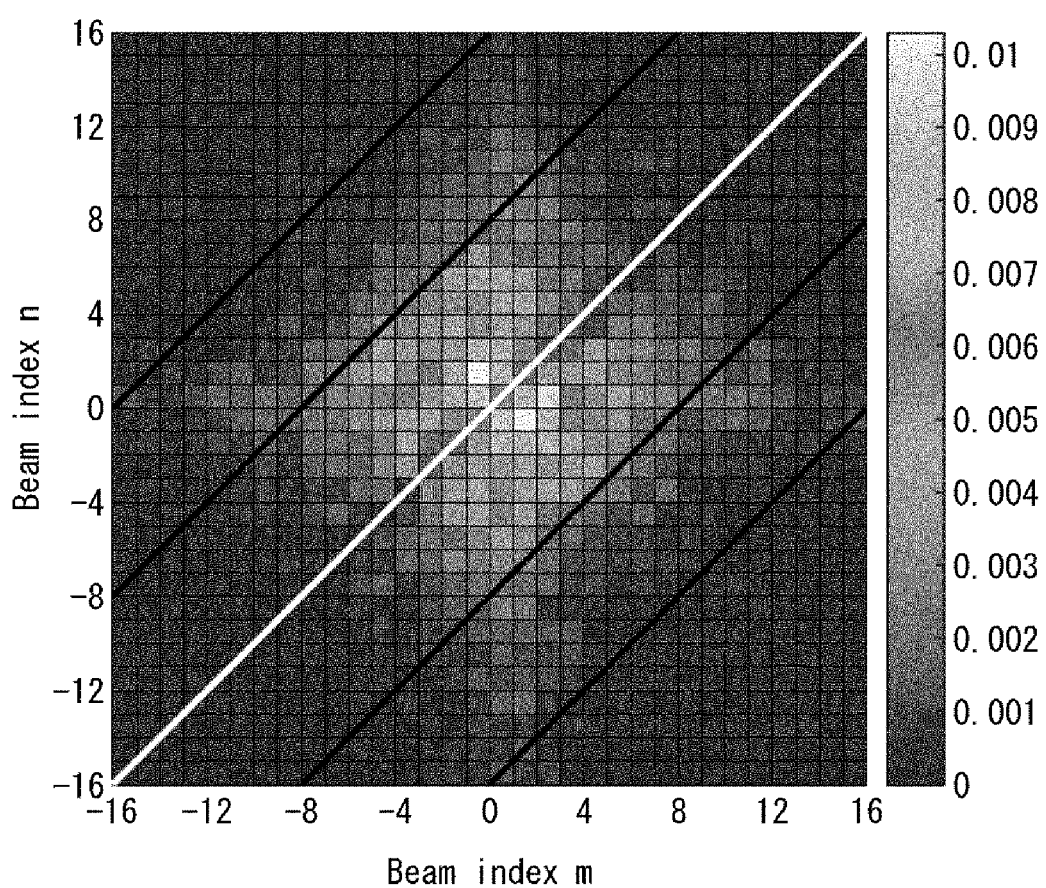
FIG. 23 illustrates the presence range of proposed codebooks.

FIG. 23 illustrates the presence range of proposed codebooks. In FIG. 23, an X axis indicates a codevector index m for the first transmission layer, and an Y axis indicates a codevector index n for the second transmission layer.

The group A is configure with 2p codewords present on an m=n line, that is, codevector pairs. Ø=1 is fixed and used for the codevectors. Accordingly, a bit is not allocated to a cross phase difference.

The codevector indices (m, n) of the group A use m=n=k±$\alpha_i$, i=1, 2, . . . , p. In this case, k is a reference index determined based on the location of a UE and a channel environment.

The group B is configured with 2q codevector pairs present on the m=n±β line. Ø=1, j may be used for the codevectors. Accordingly, an additional 1 bit may be used for a cross phase difference. The number of codevector pairs is q on each of the m=n+β line and the m=n−β line. A detailed location of the codevector pair may vary depending on a channel environment.

Codewords 2×2q of the group B in which the codewords 2p of the group A and a change in the cross phase difference are taken into consideration may configure a codebook. Accordingly, assuming that the number of feedback bits of the codebook is B, $2p+4q=2^B$ is satisfied.

Accordingly, a codeword w(∈ W) may be defined like Equation 31.

$$w = \frac{1}{2}\begin{bmatrix} b_m & b_n \\ \Phi b_m & -\Phi b_n \end{bmatrix} \begin{cases} \Phi = 1, & \text{for } m = n \\ \Phi = 1, \text{ or } j, & \text{for } m \neq n \end{cases} \quad \text{[Equation 31]}$$

In this case, $b_m$ and $b_n$ may be determined/defined as one of vectors defined in Equation 23.

In FIG. 23, a white line indicates a m=n straight line in which a group A codeword may be located, and a black line illustrates an m=n±β straight line in which a group B codeword may be located. p, q, $\alpha_i$, and β, that is, parameters of the proposed codebook, may be changed based on the environment or characteristic of a channel. Particularly, if β is a multiple of 8, $b_m$ and $b_n$ have orthogonality.

As a specific example to which the present invention may be applied, a codebook variable setting and operation in a 3D SCM UMa (3D-urban macro) environment are introduced. Variable setting for the specific example is given as in Table 8.

TABLE 8

| Variable | Value | Variable | Value |
|---|---|---|---|
| Number of Tx antennas M | 8 (cross polarization structure) | p | 2 |
| Number of Rx antennas N | 2 (single polarization structure) | q | 3 |
| Center frequency $f_c$ | 2 GHz | $\alpha_1$ | 1 |
| B | 4 | $\alpha_2$ | 4 |
| Reference index k | 0 | β | 8 |

Figure 24:
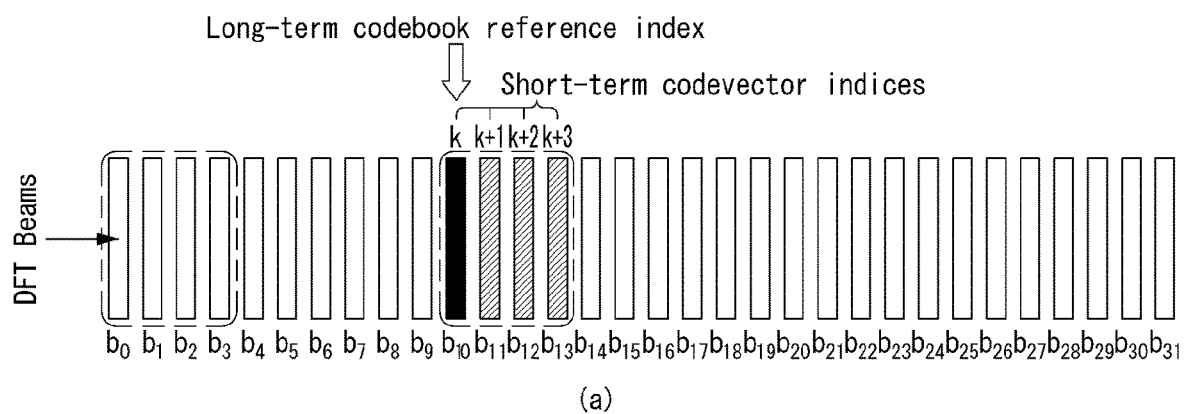
FIG. 24 is a diagram showing the configuration of the LTE Release 10 8-Tx codebook and the configuration of a proposed codebook when variables of Table 8 are applied.
Figure 24:
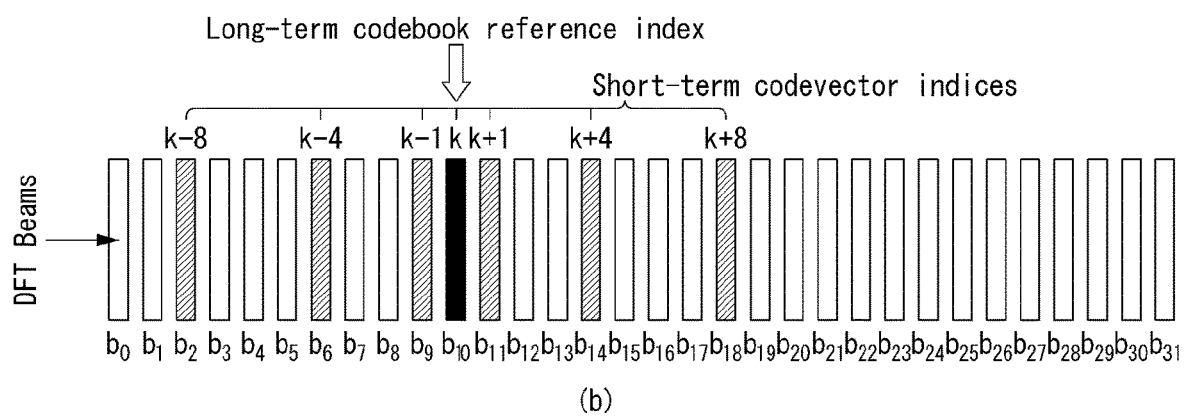

FIG. 24 is a diagram showing the configuration of the LTE Release 10 8-Tx codebook and the configuration of a proposed codebook when variables of Table 8 are applied.

Referring to FIG. 24, it may be seen that the LTE Release 10 8-Tx codebook is configured with 4 contiguous column vectors from a reference index k (FIG. 24(a)), whereas a proposed codebook is configured in a form in which vectors are distributed in a relatively wide range from a reference index k (FIG. 24(b)).

Table 9 shows the configuration of the proposed codebook based on the reference index k when the variables of Table 8 are applied, and is shown in FIG. 21. In FIG. 21, an X mark means a group A codevector pair, and a circle mark means a group B codevector pair. A star mark means the codevectors of the LTE Release 10 8-Tx codebook.

TABLE 9

| Index | m | n | Φ | Index | m | n | Φ |
|---|---|---|---|---|---|---|---|
| 0 | k + 1 | k + 1 | 1 | 0 | k + 8 | k | 1 |
| 1 | k − 1 | k − 1 | 1 | 1 | k + 8 | k | j |
| 2 | k + 4 | k + 4 | 1 | 2 | k − 8 | k | 1 |
| 3 | k − 4 | k − 4 | 1 | 3 | k − 8 | k | j |
| 4 | k | k + 8 | 1 | 4 | k + 4 | k − 4 | 1 |
| 5 | k | k − 8 | j | 5 | k + 4 | k − 4 | j |
| 6 | k | k + 8 | 1 | 6 | k − 4 | k + 4 | 1 |
| 7 | k | k − 8 | j | 7 | k − 4 | k + 4 | j |

In order to evaluate performance of the present invention, performance of codebooks selected based on Equations 21 and 22 for $V_k$ was compared.

Figure 25:
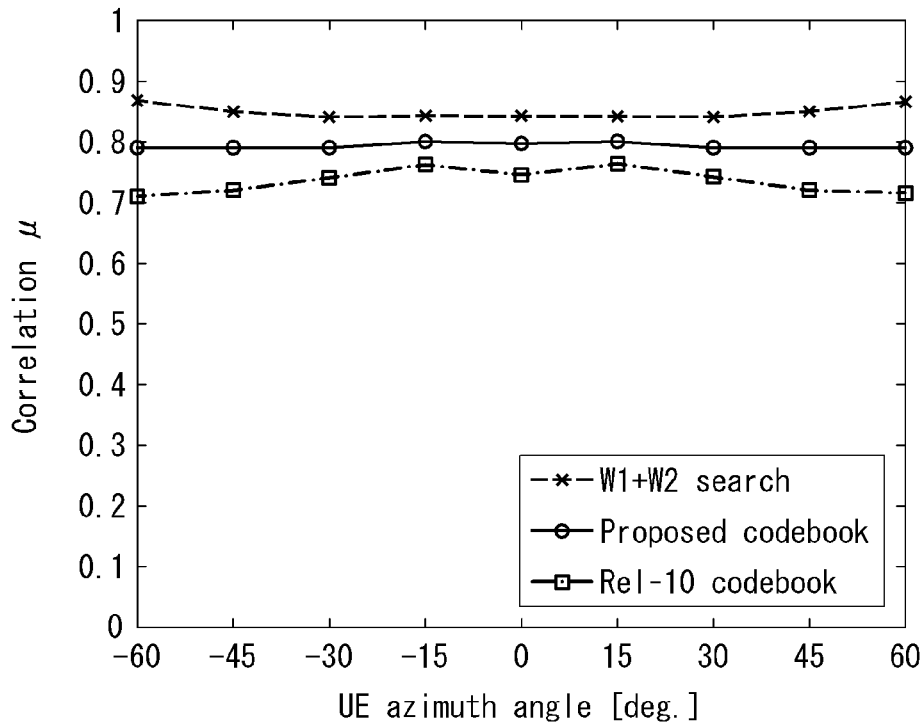
FIG. 25 shows graphs showing correlation $\mu$ performance according to several azimuths.
Figure 25:
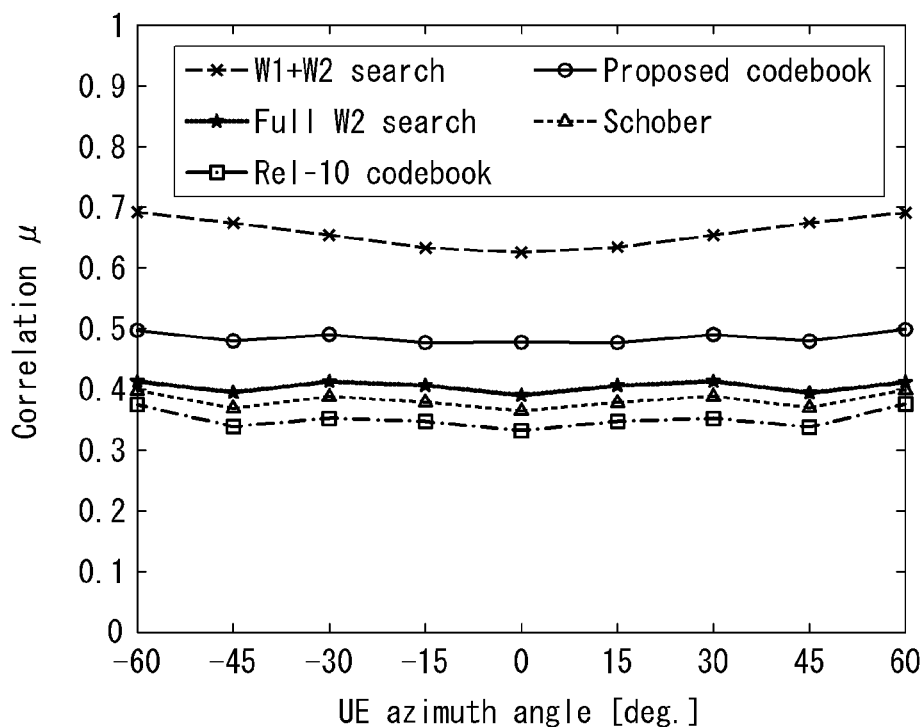

FIG. 25 shows graphs showing correlation μ performance according to several azimuth angles. Particularly, FIG. 25(a) corresponds to a correlation μ performance graph upon single rank transmission, and FIG. 25(b) corresponds to a correlation μ performance graph upon dual rank transmission.

Referring to FIG. 25(a), it may be seen that upon single rank transmission, the correlation of $W_1+W_2$ search using many feedback resources of 12 bits is the highest and the proposed codebook has a higher correlation than the LTE Release 10 8-Tx codebook.

Referring to FIG. 25(b), it may be seen that upon dual rank transmission, the proposed codebook holds a lead among codebooks using a 4-bit feedback resource and has higher performance than Full $W_2$ search using more feedback resources.

It may be seen that the codebook proposed in this specification has higher performance than the Full $W_2$ search having the same structure as $W_1$ of the LTE Release 10 8-Tx codebook, the Schober codebook, and the LTE Release 10 8-Tx codebook. It may be seen that although the proposed codebook has lower performance than the $W_1+W_2$ search having the best performance, the proposed codebook has sufficiently high performance when the number of bits used/overhead is taken into consideration.

Figure 26:
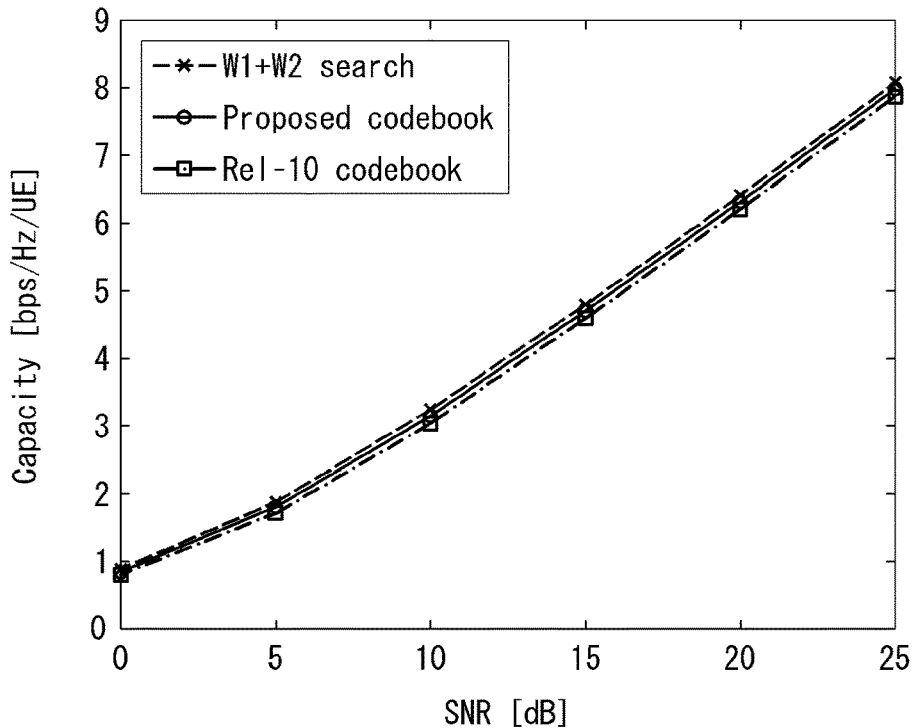
FIG. 26 shows a channel capacity according to a signal-to-noise ratio (SNR).
Figure 26:
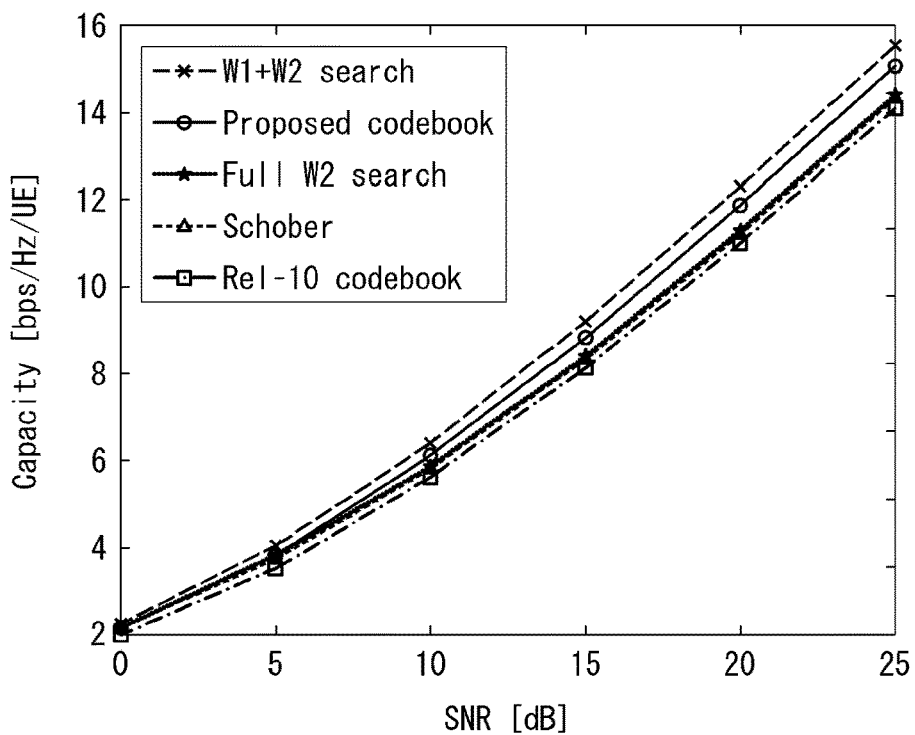

FIG. 26 shows a channel capacity according to a signal-to-noise ratio (SNR). Particularly, FIG. 26(a) shows a channel capacity upon single rank transmission, and FIG. 26(b) shows a channel capacity upon dual rank transmission.

Referring to FIG. 26, it may be seen that the channel capacity is increased as the SNR is increased and the performance gain of the proposed codebook is increased compared to the existing codebook as the SNR is increased.

Hereinafter, an operation method of the invention and a utilization scheme thereof are described. The operation method of the invention basically includes downward feedback in which a base station becomes a base and upward feedback in which a UE becomes a base.

In the case of downward feedback, a base station configures a parameter suitable for each UE using incident angle information of the UE, and forwards the configured parameter to the UE through a separate control channel. The UE that has received the corresponding parameter from the base station generates a codebook suitable for/based on the parameter.

In contrast, in the case of upward feedback, a UE may identify the statistical characteristic of a channel through a CSI-RS for each antenna element transmitted by a base station. The UE selects a parameter suitable for wireless communication through the CSI-RS and forwards the parameter to the base station through upward feedback. The base station generates a codebook using the parameter reported by the UE.

The codebook generated through the above-described method is used as a long-term codebook. A short-term codevector index is determined based on an instance change in the channel, and beamforming is performed.

In the existing codebook, a long-term codebook is limited to a narrow range using codevectors configuring the long-term codebook. This results in that as described above with reference to FIGS. 20 to 22, the randomness or variety of an actual channel environment is not incorporated into the existing codebook. Furthermore, it was found that a cross phase difference unnecessary for the Release 10 8-Tx codebook, that is, a current standard, is allocated based on a performance index having a correlation as a reference.

Accordingly, in the present invention, the range of a long-term codebook is variably configured and expanded by taking the characteristics of an actual channel into consideration. Furthermore, as the results of the examination of a correlation between beams upon multi-rank transmission, it was found that a beam configuration of a wide range might affect a reduction in the interference between layers and was adjusted through a beam group spacing parameter $\beta$. Furthermore, the use of an unnecessary cross phase difference was removed by differently allocating a cross phase difference based on the relation between beam indices. According to the proposed codebook of this specification, an adaptive operation through a parameter change is possible according to a channel environment by taking into consideration several transmission scenarios, such as UMa and 3D-urban micro (UMi), and the variety of various transmission frequency bands and channels, such as an LTE band or a millimeter wave band, and a codebook design of a form which can be flexibly configured in a base station or UE. Furthermore, a codebook configuration of a form in which the orthogonality and non-orthogonality of a beam between layers are properly mixed is possible and can be operated through control of a parameter. Accordingly, the use of the proposed codebook enables the execution of beamforming of high reliability by flexibly applying the codebook to various channel environments in a multi-rank situation.

The multiple-input multiple-output (MIMO) technology is a technology for improving a data transfer rate and increasing a channel capacity by increasing the number of Tx/Rx antennas, and is widely used as a radio industry standard so far. However, an increase in the number of Tx/Rx antennas causes an increase in CSI-RS overhead, which results in a reduction of a resource necessary for data transmission. Accordingly, the definition of codevectors and the design of a codebook are very important search issues as a method of forwarding channel information efficiently and a scheme for performing suitable beamforming based on forwarded channel information. A Kerdock codebook suitable for a non-correlation channel and a VQ codebook using vector quantization were researched as codebook design schemes for the MIMO system, but in a recent codebook design method, a structure based on a channel correlation using the DFT matrix is used. Furthermore, as the antenna array tends to change from a single polarization antenna to a cross polarization antenna, this is incorporated into the design of a codebook structure. As a scheme for the gain of a feedback bit, a single codebook structure is changed into a dual codebook structure configured with a long-term codebook and a short-term codebook. Furthermore, in order to obtain a faster transfer rate using more antennas, there is carried out research regarding a codebook using the Kronecker product suitable for a 2 dimension antenna array in which antenna elements are disposed vertically and horizontally.

In the standardization aspect, in the LTE Release 10 8-Tx codebook, a dual codebook structure is applied unlike in the LTE Release 8 4-Tx codebook. In this case, there are advantages in that the number of feedback bits is maintained and beamforming performance can be improved because each UE has low selection complexity. Furthermore, in LTE Release 13, a codebook that may be applied to a 2 dimension antenna array using the DFT matrix and Kronecker product was suggested. Furthermore, there is a performance improvement scheme by improving the PMI part of the LTE Release 10 8-Tx standard codebook. In the MIMO system, when the number of data layers that may be transmitted to a single user at the same time is named a rank, a codebook in the current standard supports multiple rank transmission. In the configuration of the LTE Release 10 8-Tx codebook, the resolution of a long-term codebook is set in a single rank and a dual rank set using 32 DFT beams, and 16 DFT beams are used for a triple rank and a quadruple rank. The long-term codebook uses contiguous 4 DFT beams for each rank. If contiguous 4 beams are used, a wide range from one reference index is not covered. The proposal of a systematic method of configuring a codebook, which supplements such a limit and has further improved performance by taking into consideration the statistical characteristic of an LTE standard channel model, is a very important issue.

This specification proposes a scheme for configuring a codebook, having improved performance, wherein multi-rank transmission is performed using multiple antennas. Particularly, this specification illustrates a detailed example in which variables necessary for the codebook design are generalized and defined for each transmission rank. A codebook proposed in this specification has a dual codebook structure and is designed using the DFT matrix. Each of Ranks 1, 2, 3, and 4 having a good possibility that they will be used upon actual transmission is described in detail, and a higher rank thereof may be configured/designed through the expansion of the proposed method. As in the LTE Release 10 8-Tx codebook, the contents of the invention are described based on a uniform linear array configured with 8 antenna elements having a cross polarization structure, and the performance evaluation results of the array are proposed. Although an array size is expanded, it may be expanded and applied to the proposed method of this specification.

Hereinafter, a design method of the present invention and a channel model for taking a detailed application example are described. The 3-dimensional spatial channel model (3D SCM) of TR 36.873 document announced in 3GPP was applied to the channel model. The 3D SCM is a channel model in which the locations of clusters and UE distributions are represented in a 3 dimension similar to the reality, and is suitable for representing the channel of a MIMO transmission environment because multiple path transmission is possible using the environment generated as described above. The channel model of the 3D SCM may be represented like FIG. 19, and $\Phi$ indicates an azimuth angle between a base station and a UE.

A downlink channel matrix of a k-th UE on which N_Rx antennas are mounted is represented as $H_k=[h_1^T\ h_2^T\ \ldots\ h_N^T]^T$. In this case, $h_n=[h_{n,1}\ h_{n,2}\ \ldots\ h_{n,M}]$ means a channel vector received from M Tx antennas through an n-th Rx antenna. Assuming that a transmission rank, that is, the number of transmitted independent data layers, is R, the beamforming matrix of the k-th UE is indicated as $V_k=[v_1^T\ v_2^T\ \ldots\ v_r^T]^T$. In this case, $v_r$ means the beamforming vector of a r-th transmission layer. In the MU-MIMO transmission environment in which K UEs are present, a signal received by a k-th UE using such a symbol may be represented like Equation 32.

$$y_k = H_k V_k x_k + \sum_{j \neq k}^{K} H_j V_j x_j + I_k + n_k \quad \text{[Equation 32]}$$

In this case, $x_k=[x_1\ x_2\ \ldots\ x_R]^T$ in the first term on the right side means a transmission data vector, a sum part in the second term means inter-user interference applied to the k-th UE, the third term $I_k$ means external cell interference, and the fourth term $n_k$ means Gaussian noise.

In order to evaluate performance of a codebook $W=\{W_1, W_2, \ldots, W_Q\}$ including Q codewords, that is, the candidates of a beamforming matrix $V_k$, an average correlation $\mu$ is defined like Equation 33.

$$\mu = E[\det(V_k^H \overline{H}_k^H \overline{H}_k V_k)] \quad \text{[Equation 33]}$$

In this case, $\overline{H}_k = H_k / \|H_k\|$ is a power normalization form of a k-th UE reception channel matrix, and $V_k$ means a codeword to maximize an average correlation for the channel. That is, a codevector may be selected to satisfy Equation 34.

$$V_k = W_{n_k}, n_k = \mathrm{argmax}_l \det(W_l^H \overline{H}_k^H \overline{H}_k W_l) \quad \text{[Equation 34]}$$

Prior to the description of the present invention, the existing codebook used as the subject of comparison when performance of the proposed method is evaluated is first described. The first is an 8-Tx codebook adopted as the standard in LTE Release 10, wherein the contiguous four of 32 DFT beams are included in a long-term codebook as codevectors as described above. $W_1+W_2$ search described as the second is a method of searching for and selecting all codevector combinations of codewords most suitable for an instant channel regardless of $W_1$, that is, a long-term codebook, and $W_2$, that is, a short-term codebook. This method is a method suitable for actual use when search complexity and the amount of feedback are taken into consideration, but is selected as the subject of comparison for performance of the proposed method because there is a meaning to show the upper limit of achievable performance.

1) LTE Release 10 8-Tx Codebook

An LTE Release 10 8-Tx codebook W has a dual codebook structure configured with the product ($W=W_1W_2$) of the long-term codebook $W_1$ and the short-term codebook $W_2$, and was designed using the 4×32 DFT matrix B. In this case, the DFT matrix is configured like $B=[b_0\ b_1\ b_2\ \ldots\ b_{31}]$, and each column vector satisfies Equation 35.

$$b_n = \frac{1}{2}\left[1\ e^{j2\frac{\pi}{32}n}\ e^{j2\frac{2\pi}{32}n}\ e^{j2\frac{3\pi}{32}n}\right]^T, \quad \text{[Equation 35]}$$

$$n = 0, 1, \ldots, 31$$

A single rank codeword w is defined like Equation 36.

$$w = \frac{1}{\sqrt{8}}\begin{bmatrix} b_m \\ \phi b_m \end{bmatrix}, w \in W \quad \text{[Equation 36]}$$

In this case, $b_m$ is determined/defined as one of vectors defined in Equation 35. From among elements configuring the codeword, m indicative of the beam selection of each layer and $\emptyset$ indicative of a cross phase difference are named codevector indices. $1/\sqrt{8}$ multiplied in front of the matrix is a value for the normalization of transmission power, and is configured with $1/\sqrt{R \times M}$. In this case, R is the number of ranks, and M is the number of Tx antennas. A reference index k means the index of the first column vector of the long-term codebook $W_1$, and was defined in the standard so that it has k=0, 2, 4, . . . , 30, that is, one of an even-numbered value of the indices of the column vector $b_m$ included in the DFT matrix B. Table 10 shows 16 codevector indices configuring an LTE Release 10 8-Tx single rank codebook according to the reference index k.

TABLE 10

| | m | ø |
|---|---|---|
| 0 | k | 1 |
| 1 | k | j |
| 2 | k | −1 |
| 3 | k | −j |
| 4 | k + 1 | 1 |
| 5 | k + 1 | j |
| 6 | k + 1 | −1 |
| 7 | k + 1 | −j |
| 8 | k + 2 | 1 |
| 9 | k + 2 | j |
| 10 | k + 2 | −1 |
| 11 | k + 2 | −j |
| 12 | k + 3 | 1 |
| 13 | k + 3 | j |
| 14 | k + 3 | −1 |
| 15 | k + 3 | −j |

A dual rank codeword w satisfies Equation 37.

$$w = \frac{1}{4}\begin{bmatrix} b_m & b_n \\ \phi b_m & -\phi b_n \end{bmatrix}, w \in W \quad \text{[Equation 37]}$$

In this case, each of $b_m$ and $b_n$ is determined/defined as one of vectors defined in Equation 35 (m, n=0, 1, ..., 31). From among elements configuring the codeword, the beam indices m and n of respective layers and ∅ indicative of a cross phase difference are named codevector indices. A coefficient value multiplied in front of the matrix is used for the normalization of transmission power, and a value is ¼ in the case of a dual rank value. Assuming that the reference index k is the index of a DFT matrix B, that is, the first column vector of $W_1$, Table 11 shows 16 codevector indices configuring an LTE Release 10 8-Tx dual rank codebook based on the reference index k. Reference index values are selected among k=0, 2, 4, ..., 30 as in the single rank.

TABLE 11

|    | m     | n     | ∅ |
|----|-------|-------|---|
| 0  | k     | k     | 1 |
| 1  | k + 1 | k + 1 | 1 |
| 2  | k + 2 | k + 2 | 1 |
| 3  | k + 3 | k + 3 | 1 |
| 4  | k     | k + 1 | 1 |
| 5  | k + 1 | k + 2 | 1 |
| 6  | k     | k + 3 | 1 |
| 7  | k + 1 | k + 3 | 1 |
| 8  | k     | k     | j |
| 9  | k + 1 | k + 1 | j |
| 10 | k + 2 | k + 2 | j |
| 11 | k + 3 | k + 3 | j |
| 12 | k     | k + 1 | j |
| 13 | k + 1 | k + 2 | j |
| 14 | k     | k + 3 | j |
| 15 | k + 1 | k + 3 | j |

A codeword w for triple rank transmission satisfies Equation 38.

$$w = \frac{1}{\sqrt{24}}\begin{bmatrix} b_m & b_n & b_r \\ \phi b_m & \phi b_n & -\phi b_r \end{bmatrix}, w \in W \quad \text{[Equation 38]}$$

In this case, each of $b_m$, $b_n$, and $b_r$ is determined/defined as one of vectors defined in Equation 35 (m, n, r=0, 1, ..., 31). From among elements configuring the codeword, the beam indices m, n, and r of respective layers and ∅ indicative of cross phase difference are named codevector indices. In the case of a triple rank, $1/\sqrt{24}$ is used as a coefficient value for the normalization of transmission power.

Table 12 show 16 codevector indices configuring an LTE Release 10 8-Tx triple rank codebook based on a reference index k. In the case of a triple rank, one of the reference indices k=0, 8, 16, 24 was defined to be used in the standard.

TABLE 12

|    | m      | n      | r      | ∅  |
|----|--------|--------|--------|----|
| 0  | k      | k      | k + 8  | 1  |
| 1  | k + 8  | k      | k + 8  | 1  |
| 2  | k      | k + 8  | k + 8  | -1 |
| 3  | k + 8  | k      | k      | -1 |
| 4  | k + 2  | k + 2  | k + 10 | 1  |

TABLE 12-continued

|    | m      | n      | r      | ∅  |
|----|--------|--------|--------|----|
| 5  | k + 10 | k + 2  | k + 10 | 1  |
| 6  | k + 2  | k + 10 | k + 10 | -1 |
| 7  | k + 10 | k + 2  | k + 2  | -1 |
| 8  | k + 4  | k + 4  | k + 12 | 1  |
| 9  | k + 12 | k + 4  | k + 12 | 1  |
| 10 | k + 4  | k + 12 | k + 12 | -1 |
| 11 | k + 12 | k + 4  | k + 4  | -1 |
| 12 | k + 6  | k + 6  | k + 14 | 1  |
| 13 | k + 14 | k + 6  | k + 14 | 1  |
| 14 | k + 6  | k + 14 | k + 14 | -1 |
| 15 | k + 14 | k + 6  | k + 6  | -1 |

A codeword w for quadruple rank transmission satisfies Equation 39.

$$w = \frac{1}{\sqrt{32}}\begin{bmatrix} b_m & b_n & b_r & b_s \\ \phi b_m & \phi b_n & -\phi b_r & -\phi b_s \end{bmatrix}, w \in W \quad \text{[Equation 39]}$$

In this case, each of $b_m$, $b_n$, $b_r$, and $b_s$ is determined/defined as one of vectors defined in Equation 35 (m, n, r, s=0, 1, ..., 31). From among elements configuring the codeword, the beam indices m, n, r, and s of respective layers and ∅ indicative of a cross phase difference are named codevector indices. In the case of a quadruple rank, a power normalization coefficient value is $1/\sqrt{32}$.

Table 13 shows 8 codevector indices configuring an LTE Release 10 8-Tx quadruple rank codebook based on a reference index k. One of k=0, 8, 16, 24 is selected as a reference index value as in the triple rank.

TABLE 13

|   | m     | n      | r     | s      | ∅ |
|---|-------|--------|-------|--------|---|
| 0 | k     | k + 8  | k     | k + 8  | 1 |
| 1 | k     | k + 8  | k     | k + 8  | j |
| 2 | k + 2 | k + 10 | k + 2 | k + 10 | 1 |
| 3 | k + 2 | k + 10 | k + 2 | k + 10 | j |
| 4 | k + 4 | k + 12 | k + 4 | k + 12 | 1 |
| 5 | k + 4 | k + 12 | k + 4 | k + 12 | j |
| 6 | k + 6 | k + 14 | k + 6 | k + 14 | 1 |
| 7 | k + 6 | k + 14 | k + 6 | k + 14 | j |

2) $W_1+W_2$ Search

In $W_1+W_2$ search, all of beam selection for each layer, that is, all possible combinations of $b_m$, $b_n$, $b_r$, and $b_s$, and four cross phase differences $\phi=\pm 1, \pm j$ are used as an expansion set of an LTE Release 10 8-Tx codebook. After the search is performed using all possible combinations, a codevector combination having the highest correlation with an instant channel is selected and used as a codeword. The search is performed based on the azimuth angle of each UE, and a statistical characteristic of a channel can be checked based on the results of the search.

Figure 27:
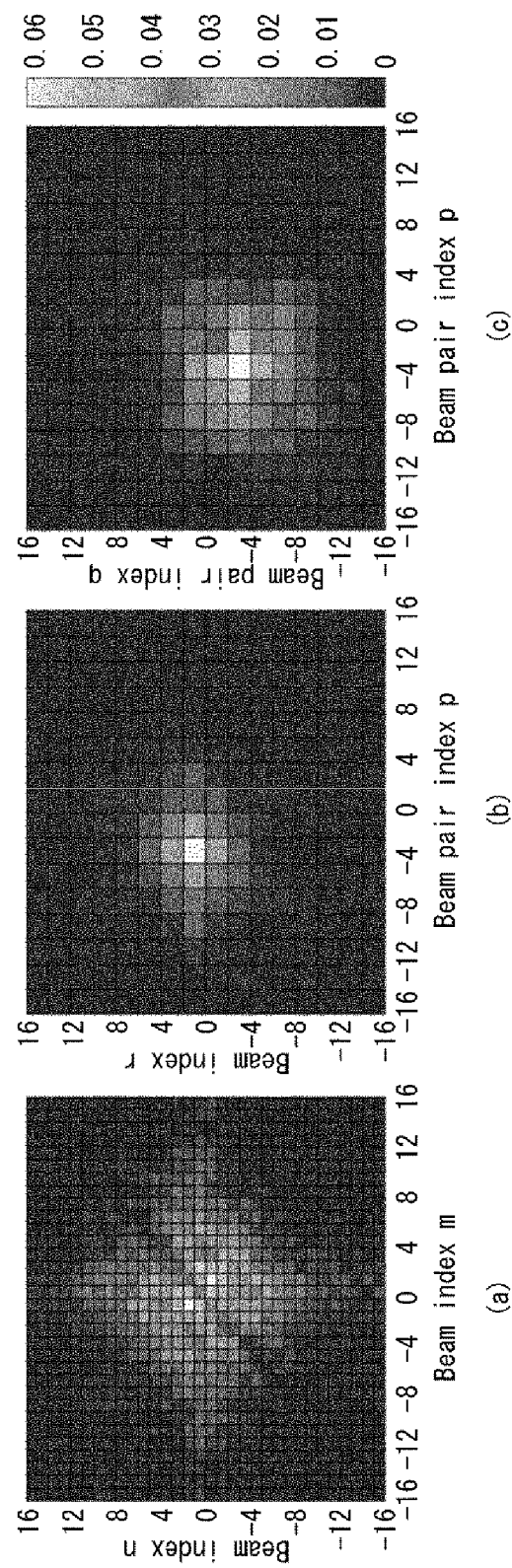
FIG. 27 illustrates color maps displaying the statistical characteristics of codevector selection checked through the execution of $W_1+W_2$ search.

FIG. 27 illustrates color maps displaying the statistical characteristics of codevector selection checked through the execution of $W_1+W_2$ search. More specifically, FIG. 27 shows the results of the display of selection frequencies if an azimuth angle is 0°. Particularly, FIG. 27(a) corresponds to a dual rank, FIG. 27(b) corresponds to a triple rank, and FIG. 27(c) corresponds to a quadruple rank.

$$w = \frac{1}{\sqrt{8}} \begin{bmatrix} b_m \\ \phi b_m \end{bmatrix}, m = 0, 1, \ldots, 31, \phi \in \{\pm 1, \pm j\} \quad \text{[Equation 40]}$$

A codeword of a single rank is defined like Equation 40. A combination having the highest channel correlation may be selected among 32 vectors $b_0, b_1, \ldots, b_{31}$ and 4 cross phase difference $\phi = \pm 1, \pm j$.

The codeword of a dual rank selected through search is defined like Equation 41.

$$w = \frac{1}{4} \begin{bmatrix} b_m & b_n \\ \phi b_m & -\phi b_n \end{bmatrix}, \quad \text{[Equation 41]}$$

$$m, n = 0, 1, \ldots, 31, \phi \in \{\pm 1, \pm j\}$$

In this case, 32 a combination having the highest correlation with an instant channel may be selected from among vectors $b_0, b_1, \ldots, b_{31}$ and 4 cross phase difference $\phi = \pm 1, \pm j$. A selection frequency of a codevector having the highest correlation was checked and shown in FIG. 27(a). In FIG. 27(a), an X axis is the codevector index of the first layer of a dual rank, and a Y axis is the codevector index of the second layer.

The triple rank codeword is defined like Equation 42.

$$w = \frac{1}{\sqrt{24}} \begin{bmatrix} b_m & b_n & b_r \\ \phi b_m & \phi b_n & -\phi b_r \end{bmatrix}, \quad \text{[Equation 42]}$$

$$m, n, r = 0, 2, \ldots, 30, \phi \in \{\pm 1, \pm j\}$$

In this case, a combination having the highest correlation with an instant channel may be selected from among 16 vectors $b_0, b_2, \ldots, b_{30}$ and 4 cross phase difference $\phi = \pm 1, \pm j$. In order to check the selection frequency of a codevector having the highest correlation, it is convenient to reduce the complexity of a triple rank called a 3 dimension. To this end, a rank reduction scheme was used. The rank reduction scheme is a method of grouping two layers into one beam group and checking beam selection. In the triple rank, the beam index m of the first layer and the beam index n of the second layer may be configured as one beam pair p. A beam pair proposed in the present invention may be configured with two beam vectors that satisfy an orthogonal property. Particularly, two vectors having an index difference of 8 are taken into consideration. That is, an orthogonal beam pair $z_p$ is defined as $z_p = [b_p \ b_{p+8}]$. In order to reduce search complexity, an index p was limited to an even-numbered value $p = 0, 2, \ldots, 30$. The codevector selection frequency of a triple rank is displayed like FIG. 27(b) on a 2 dimension through the rank reduction scheme. In this case, an X axis indicates an orthogonal beam pair index p, and a Y axis indicates the codevector index r of the third layer.

A quadruple rank codeword is defined like Equation 43.

$$w = \frac{1}{\sqrt{32}} \begin{bmatrix} b_m & b_n & b_r & b_s \\ \phi b_m & \phi b_n & -\phi b_r & -\phi b_s \end{bmatrix}, \quad \text{[Equation 43]}$$

$$m, n, r, s = 0, 2, \ldots, 30, \phi \in \{\pm 1, \pm j\}$$

In this case, a combination having the highest correlation with an instant channel may be selected from among 16 vectors $b_0, b_2, \ldots, b_{30}$ and 4 cross phase differences $\phi = \pm 1, \pm j$. In order to check the selection frequency of a codevector having the highest correlation, the rank reduction scheme was used as in the triple rank. In the case of the rank reduction scheme used in the quadruple rank, the beam index m of the first layer and the beam index n of the second layer are grouped into one orthogonal beam pair index p, and the beam index r of the third layer and the beam index s of the fourth layer are grouped into one orthogonal beam pair index q. As the results of checking the codevector selection frequency of the quadruple rank, the codevector selection frequency may be displayed on a 2 dimension like FIG. 27(c). In this case, an X axis indicates an orthogonal beam pair index p, and a Y axis indicates an orthogonal beam pair index q.

In the LTE Release 10 8-Tx codebook, the index of a codevector is limited within a long-term codebook $W_1$ and only beam vectors of a limited range may be used for transmission. In contrast, there is an advantage in that the search complexity (i.e., the number of feedback bits) of a short-term codebook is low. In the case of $W_1 + W_2$ search, searched codevectors are not limited to $W_1$, but there is a disadvantage in that complexity is very great. Accordingly, this specification proposes a codebook designed by combining the advantages of the two schemes.

As described above, FIG. 27 shows the statistical characteristics of dual, triple, and quadruple rank codeword selections obtained through $W_1 + W_2$ search. This drawing shows the selection frequencies of codevectors having the highest correlation with a channel that have been repeatedly generated randomly using SCM with respect to UEs located at the azimuth angle of 0°. In the case of a single rank, a selection frequency may be derived by monitoring only one axis component of the dual rank.

The present invention has an advantage in that a codeword configuration can be easily performed using the above-described rank reduction scheme.

$$z_p = [b_p b_{p+8}] \quad \text{[Equation 44]}$$

If the orthogonal beam pair $z_p$ of Equation 44 is applied to Equations 38 and 39, a codeword may be indicated in a form including only two column vectors as in Equation 45 with respect to a triple rank and a quadruple rank.

$$w = \frac{1}{\sqrt{24}} \begin{bmatrix} z_p & b_r \\ \phi z_p & -\phi b_r \end{bmatrix}, \quad \text{[Equation 45]}$$

$$w = \frac{1}{\sqrt{32}} \begin{bmatrix} z_p & z_q \\ \phi z_p & -\phi z_q \end{bmatrix}, w \in W$$

Furthermore, the present invention increases efficiency of codeword selection by excluding an unnecessary cross phase difference value from the selection. Particularly, when the index m of the first layer codevector and the index n of the second layer codevector in the dual rank are the same and when the index p of the first orthogonal beam pair and the index q of the second orthogonal beam pair in the quadruple rank are the same, a cross phase difference of a limited value is used. With respect to the codeword w of Equation 37, the correlation µ may be represented as µ(m, n, ϕ), that is, a function of m, n. With respect to the codeword w of Equation 45, the correlation µ may be represented as µ(p, q, ϕ), that is, a function of p, q. It may be seen that Equation 46 is established if the dual rank codeword satisfies m=n and the quadruple rank codeword satisfies p=q.

$$\mu(m,m,1)=\mu(m,m,-1)=\mu(m,m,j)=\mu(m,m,-j)$$

$$\mu(p,p,1)=\mu(p,p,1)=\mu(p,p,j)=\mu(p,p,-j) \quad \text{[Equation 46]}$$

That is, if m=n is satisfied in the dual rank and p=q is satisfied in the quadruple rank, it is sufficient to use only a cross phase difference value 1. Accordingly, efficiency of the proposed method is improved because the number of bits allocated to a cross phase difference is reduced.

Upon multi-rank transmission, inter-layer interference can be reduced if a beam having a low correlation is selected for each layer. In the Release 10 8Tx codebook, that is, a standard, it may be seen that a correlation between beams is very high because a difference between beam indices is small. Accordingly, transmission performance may be increased using a beam index having a proper spacing. As shown in FIGS. 28 to 31, the location of a codevector is parameterized and used on the color map. The present invention proposes a parameterized codebook, and maximizes performance of the proposed method through adaptive parameter selection depending on a channel environment.

(1) Proposed Single Rank Codebook

Figure 28:
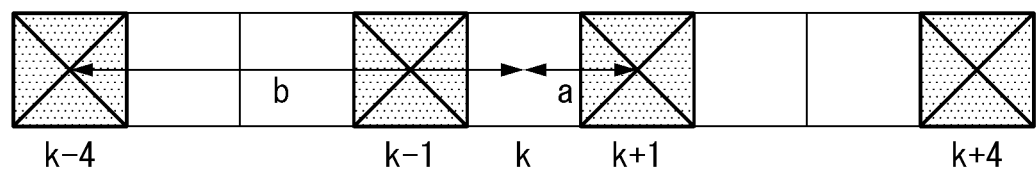
FIG. 28 is a diagram illustrating a single rank codebook according to an embodiment of the present invention.

FIG. 28 is a diagram illustrating a single rank codebook according to an embodiment of the present invention. Particularly, FIG. 28 illustrates a codebook of a parameterized codevector index a=1, b=4.

As shown in FIG. 28, codevectors defined as a reference index k and parameters a and b are selected. In the case of a cross phase difference, ϕ=±1, ±j is used as in the LTE standard. The parameter values a and b having a high average correlation are selected depending on a channel environment. The reference index k is a long-term codebook index determined based on the location of a UE. Unlike in the LTE standard in which four contiguous codevectors are selected from a reference index, in the proposed codebook, the spacing of a reference index and codevectors may be widely set flexibly. Accordingly, the limit of the existing codebook can be overcome. The codeword of the codebook of the proposed single rank is shown in Equation 47.

$$w = \frac{1}{\sqrt{8}} \begin{bmatrix} b_m \\ \phi b_m \end{bmatrix}, m = 0, 1, \ldots, 31, \phi \in \{\pm 1, \pm j\} \quad \text{[Equation 47]}$$

In this case, a value of the index m is m=k−b, k−a, k+a, k+b.

(2) Proposed Dual Rank Codebook

Figure 29:
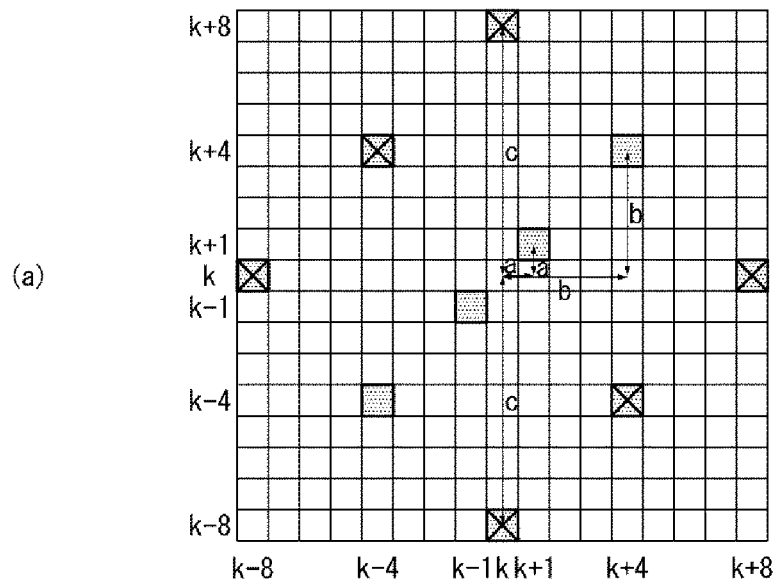
FIG. 29 is a diagram illustrating a dual rank codebook according to an embodiment of the present invention.
Figure 29:
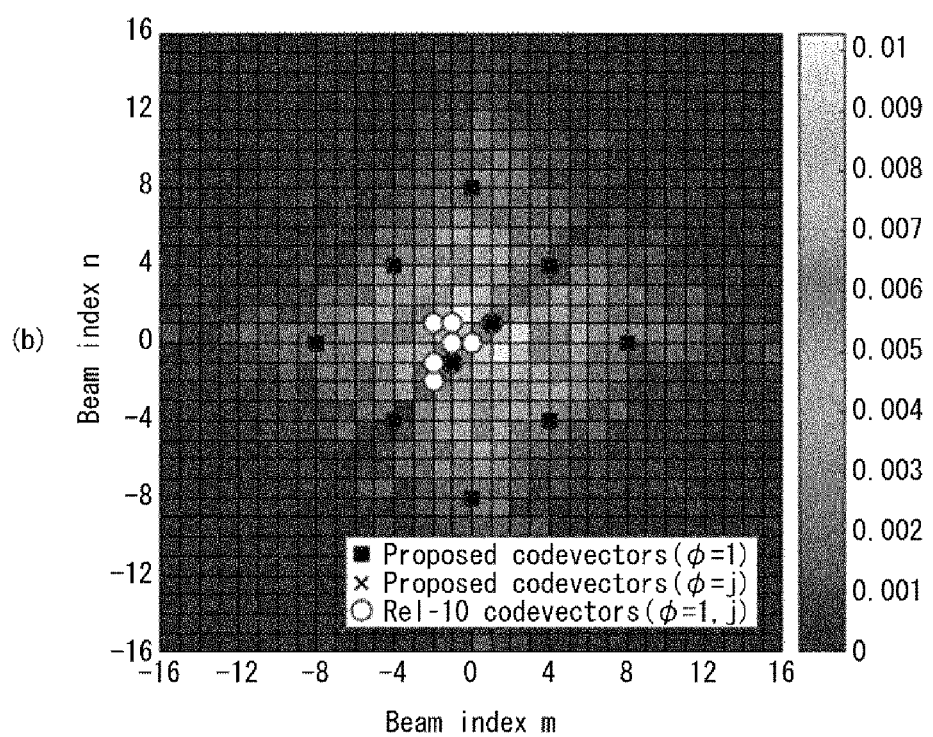

FIG. 29 is a diagram illustrating a dual rank codebook according to an embodiment of the present invention. Particularly, FIG. 29(a) shows a codebook if a parameterized codevector index a=1, b=4, c=8, and FIG. 29(b) shows codevector locations on a color map showing search selection frequencies.

The proposed dual rank codebook may be configured with a group A where m=n and a group B where m≠n. Only a cross phase difference ϕ=1 is used for the codewords of the group A. m=n=k−b, k−a, k+a, k+b is used as a codevector index. In this case, k is the reference index of a long-term codebook that varies based on the location of a UE. The group B includes codewords present on a m=n±c line. A cross phase difference ϕ=1, j is used for the codewords. Detailed locations of the codevectors are the same as those shown in FIG. 29(a). In the proposed codebook, resources can be efficiently allocated because a cross phase difference unnecessarily used in the standard is reduced in addition to a variable cover range. A dual rank codeword is shown in Equation 48.

$$w = \frac{1}{4} \begin{bmatrix} b_m & b_n \\ \phi b_m & -\phi b_n \end{bmatrix}, \phi = \begin{cases} 1, & \text{for } m = n \\ 1, j & \text{for } m \neq n \end{cases} \quad \text{[Equation 48]}$$

(3) Proposed Triple Rank Codebook

Figure 30:
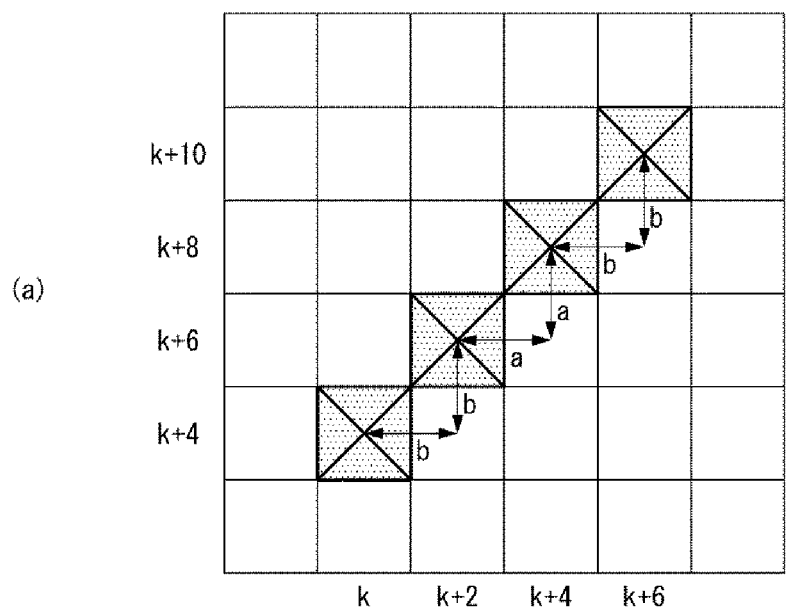
FIG. 30 is a diagram illustrating a triple rank codebook according to an embodiment of the present invention.
Figure 30:
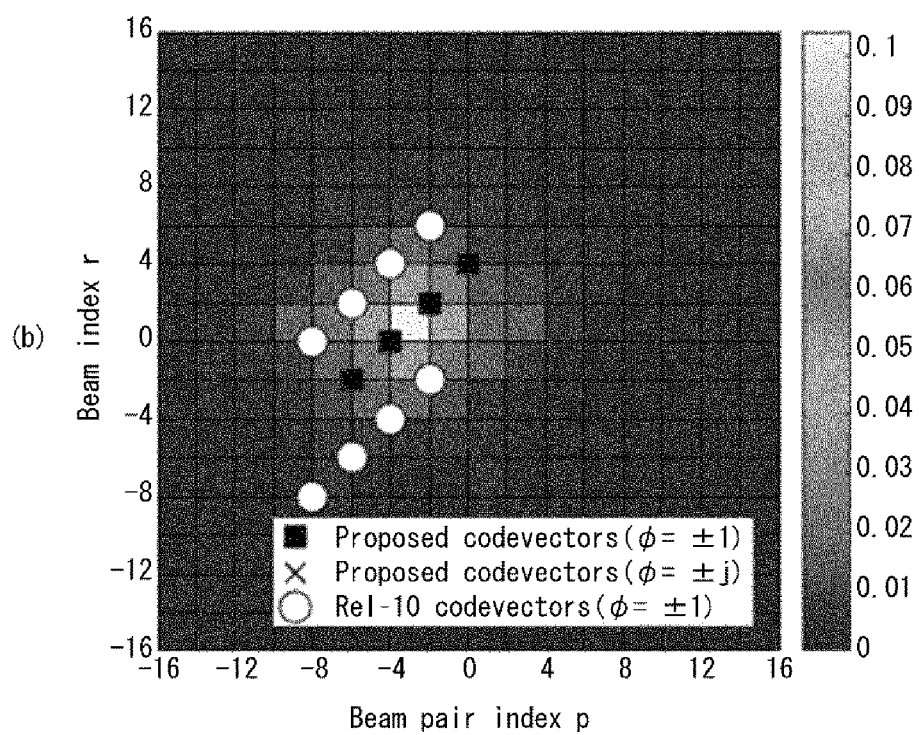

FIG. 30 is a diagram illustrating a triple rank codebook according to an embodiment of the present invention. Particularly, FIG. 30(a) illustrates a codebook if a parameterized codevector index a=2, b=2, and FIG. 30(b) shows codevector locations on a color map displaying search selection frequencies.

A triple rank is configured with 16 codewords shown in FIG. 30(a). Parameters adjustable based on a channel environment are a and b, and show a location spacing between codewords. An LTE standard codebook uses a cross phase difference ☐ϕ=±1 with respect to each of 4 locations in which the relation between an orthogonal beam pair index p and the codevector index r of the third layer satisfies p=r and 4 locations satisfying p+8=r. In contrast, in the case of the proposed codebook, various configurations having a wide width of codeword selection by making flexing the relation equation of p and r were verified. As the results of the verification, it was found that a performance gain occurs if both cross phase differences ϕ=±1, ±j are used at the 4 locations satisfying p+4=r.

A proposed triple rank codeword is shown in Equation 49.

$$w = \frac{1}{\sqrt{24}} \begin{bmatrix} z_p & b_r \\ \phi z_p & -\phi b_r \end{bmatrix}, \phi = \pm 1, \pm j \quad \text{[Equation 49]}$$

In this case, an orthogonal beam pair index is configured as p=k, k+b, k+b+a, k+2b+a. The third layer codevector index is configured as r=p+4.

(4) Proposed Quadruple Rank Codebook

Figure 31:
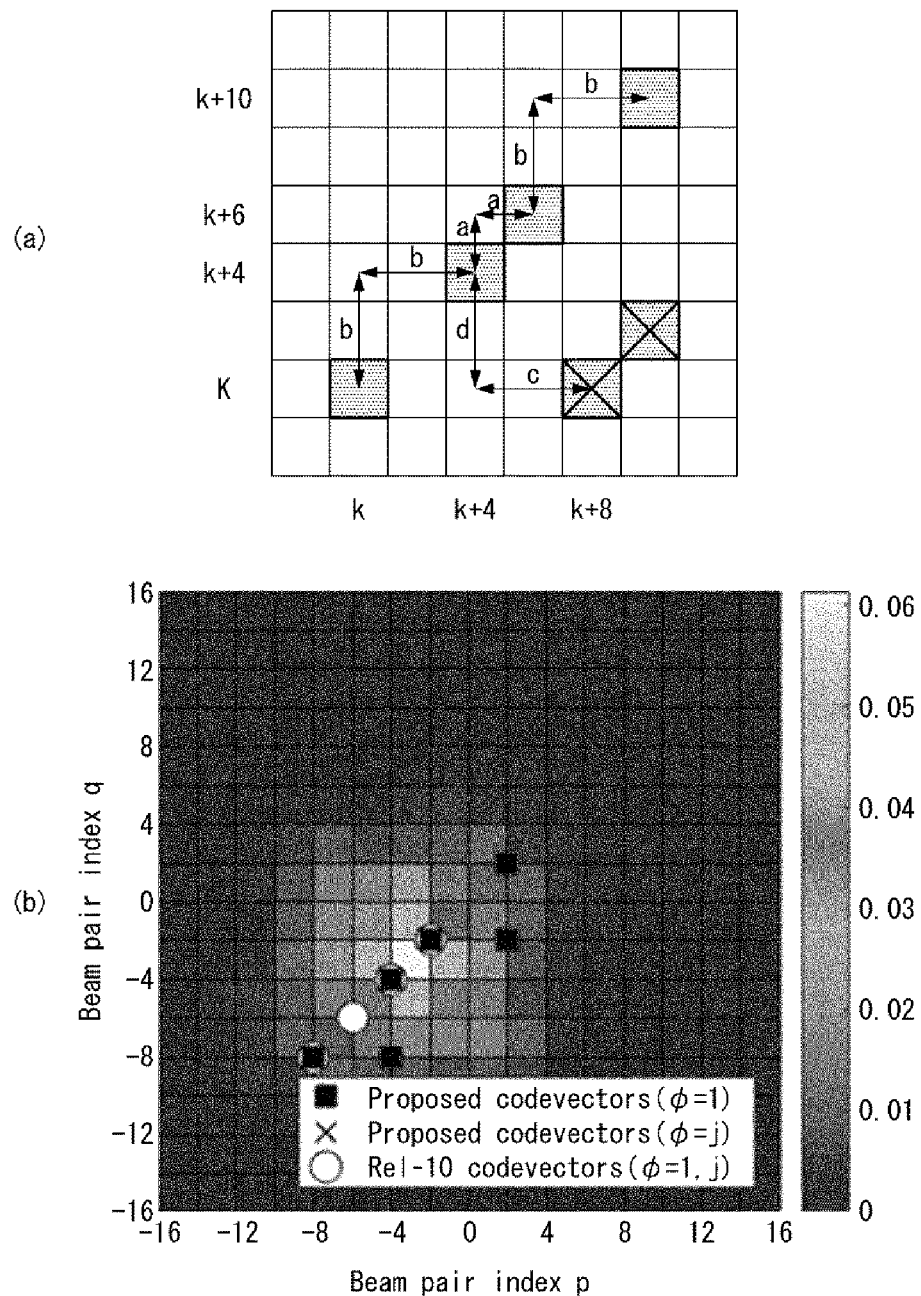
FIG. 31 is a diagram illustrating a quadruple rank codebook according to an embodiment of the present invention.

FIG. 31 is a diagram illustrating a quadruple rank codebook according to an embodiment of the present invention. Particularly, FIG. 31(a) illustrates a codebook if a parameterized codevector index a=2, b=4, c=4, d=4, and FIG. 31(b) shows codevector locations on a color map indicating search selection frequencies.

In the proposed quadruple rank codebook, a group of codevectors may be designated like the above-described dual rank codebook. That is, the codebook is configured with a group A in which an orthogonal beam pair index satisfies p=q and a group B satisfying p≠q. As shown in FIG. 31(b), only ☐ϕ=1 is applied to the group A codewords, and a location spacing between the codewords is set as parameters a and b. A location spacing between the codewords of the group B using a cross phase difference ϕ=1, j is set as parameters c and d.

In the case of the proposed codebook, efficiency of the codebook is increased by removing an unnecessary cross phase difference value present in the LTE standard codebook and disposing a more number of codewords in the group A that has a high selection frequency, but requires one cross phase difference value.

The codewords of the proposed quadruple rank may be defined like Equation 50.

$$w = \frac{1}{\sqrt{32}} \begin{bmatrix} z_p & z_q \\ \phi z_p & -\phi z_q \end{bmatrix}, \phi = \begin{cases} 1 & \text{for } p = q \\ 1, j & \text{for } p \neq q \end{cases} \quad \text{[Equation 50]}$$

In this case, the selection of a detailed p, q value is shown in FIG. 31.

The proposed rank 3-4 codebook configuration methods have been limited to only a linear antenna array (1D) and described, but may be expanded to a 2D antenna array using Equation 32. In this case, as described above, unlike in the existing codebook, Rank 3 is characterized in that DFT (1D and/or 2D) configuring each 3 layer are configured with different beams (in this case, configured/selected so that two or more beams are orthogonal, and only the orthogonal beams may be paired as a beam subgroup, that is, $z_p$) and a QPSK co-phase is applied without redundancy between codewords. If there is a limit to payload, a co-phase value(={1,j}) having a lower/smaller granularity may be used.

The Rank 4 codebook is characterized in that two beams paired into one beam subgroup ($z_p$ or $z_q$) are always orthogonal, and the group A satisfying p=q and the group B satisfying p≠q have co-phases of different granularities. For example, the granularity of a co-phase applied to the group A may be configured to be lower than the granularity of the co-phase applied to the group B. As described above, a higher performance gain can be obtained compared to a case where a uniform co-phase is applied because a codeword to which more bits can be allocated can be added to a co-phase within a given bit-width through the codebook design.

The principle may be expanded, and three orthogonal beams may be configured when a beam subgroup $z_p$ is configured in the case of Rank 5.

In the case of Rank 6, each of beam subgroups ($z_p$, $z_q$) may be configured with 3 orthogonal beams. Or as a different method, $z_p$ may be configured with four orthogonal beams. Or a beam subgroup ($z_p$, $z_q$) may be configured with a combination of the two methods.

In the case of Rank 7, when a beam subgroup ($z_p$, $z_q$) is configured, $z_p$ may be configured with 4 orthogonal beams, and $z_q$ may be configured with 3 orthogonal beams.

In the case of Rank 8, each of beam subgroups ($z_p$, $z_q$) may be configured with 4 orthogonal beams.

Ranks 5-8 are characterized in that beams within each of paired two beam subgroups ($z_p$ or $z_q$) are always orthogonal and the case A where p=q is satisfied and B where p≠q is satisfied have co-phases of different granularities. As in Ranks 5 and 7, if the number of beams between beam subgroups is different, the case where $z_p$ D $z_q$ may be assumed to be the same as the case where p=q.

The parameter configuration and operation of a proposed codebook are described as a specific example to which the present invention may be applied. Parameter for each rank are set as values having the highest average correlation depending on a channel environment, which are the same as those shown in FIGS. 28 to 31. The parameter described in this example has been determined/selected based on a channel generated using the UMa model of 3D SCM.

The proposed single rank codebook shows the best performance when a=1, b=4 is set under the UMa model of 3D SCM. Corresponding determined codevector indices are shown in Table 14. A reference index k to determine a long-term codebook is selected based on the location of a UE.

TABLE 14

|  | m | ø |
| --- | --- | --- |
| 0 | k + 1 | 1 |
| 1 | k + 1 | j |
| 2 | k + 1 | −1 |
| 3 | k + 1 | −j |
| 4 | k + 4 | 1 |
| 5 | k + 4 | j |
| 6 | k + 4 | −1 |
| 7 | k + 4 | −j |
| 8 | k − 1 | 1 |
| 9 | k − 1 | j |
| 10 | k − 1 | −1 |
| 11 | k − 1 | −j |
| 12 | k − 4 | 1 |
| 13 | k − 4 | j |
| 14 | k − 4 | −1 |
| 15 | k − 4 | −j |

In the case of a dual rank codebook, when parameter a=1, b=4, c=8 is configured, the best average correlation performance is achieved. Codewords using these values are determined as in Table 15.

TABLE 15

|  | m | n | ø |
| --- | --- | --- | --- |
| 0 | k + 1 | k + 1 | 1 |
| 1 | k − 1 | k − 1 | 1 |
| 2 | k + 4 | k + 4 | 1 |
| 3 | k − 4 | k − 4 | 1 |
| 4 | k | k + 8 | 1 |
| 5 | k | k − 8 | j |
| 6 | k | k + 8 | 1 |
| 7 | k | k − 8 | j |
| 8 | k + 8 | k | 1 |
| 9 | k + 8 | k | j |
| 10 | k − 8 | k | 1 |
| 11 | k − 8 | k | j |
| 12 | k + 4 | k − 4 | 1 |
| 13 | k + 4 | k − 4 | j |
| 14 | k − 4 | k + 4 | 1 |
| 15 | k − 4 | k + 4 | j |

In the case of a triple rank, it was found that an average correlation is the highest when a=2, b=2 is set. The codeword indices of a proposed triple rank codebook may be determined as in Table 16 by applying a parameter value.

TABLE 16

|  | m | n | r | ø |
| --- | --- | --- | --- | --- |
| 0 | k | k + 8 | k + 4 | 1 |
| 1 | k | k + 8 | k + 4 | j |
| 2 | k | k + 8 | k + 4 | −1 |
| 3 | k | k + 8 | k + 4 | −j |
| 4 | k + 2 | k + 10 | k + 6 | 1 |
| 5 | k + 2 | k + 10 | k + 6 | j |
| 6 | k + 2 | k + 10 | k + 6 | −1 |
| 7 | k + 2 | k + 10 | k + 6 | −j |
| 8 | k + 4 | k + 12 | k + 8 | 1 |
| 9 | k + 4 | k + 12 | k + 8 | j |
| 10 | k + 4 | k + 12 | k + 8 | −1 |
| 11 | k + 4 | k + 12 | k + 8 | −j |
| 12 | k + 6 | k + 14 | k + 10 | 1 |

TABLE 16-continued

| | m | n | r | ø |
|---|---|---|---|---|
| 13 | k + 6 | k + 14 | k + 10 | j |
| 14 | k + 6 | k + 14 | k + 10 | −1 |
| 15 | k + 6 | k + 14 | k + 10 | −j |

Parameter values for a quadruple rank codebook are a=2, b=4, c=0, and d=4, and codeword indices determined based on the parameter values are shown in Table 17.

TABLE 17

| | m | n | r | s | ø |
|---|---|---|---|---|---|
| 0 | k | k + 8 | k | k + 8 | 1 |
| 1 | k + 4 | k + 12 | k + 4 | k + 12 | 1 |
| 2 | k + 6 | k + 14 | k + 6 | k + 14 | 1 |
| 3 | k + 10 | k + 18 | k + 10 | k + 18 | 1 |
| 4 | k + 4 | k + 12 | k | k + 8 | 1 |
| 5 | k + 4 | k + 12 | k | k + 8 | j |
| 6 | k + 10 | k + 18 | k + 6 | k + 14 | 1 |
| 7 | k + 10 | k + 18 | k + 6 | k + 14 | j |

Figure 32:
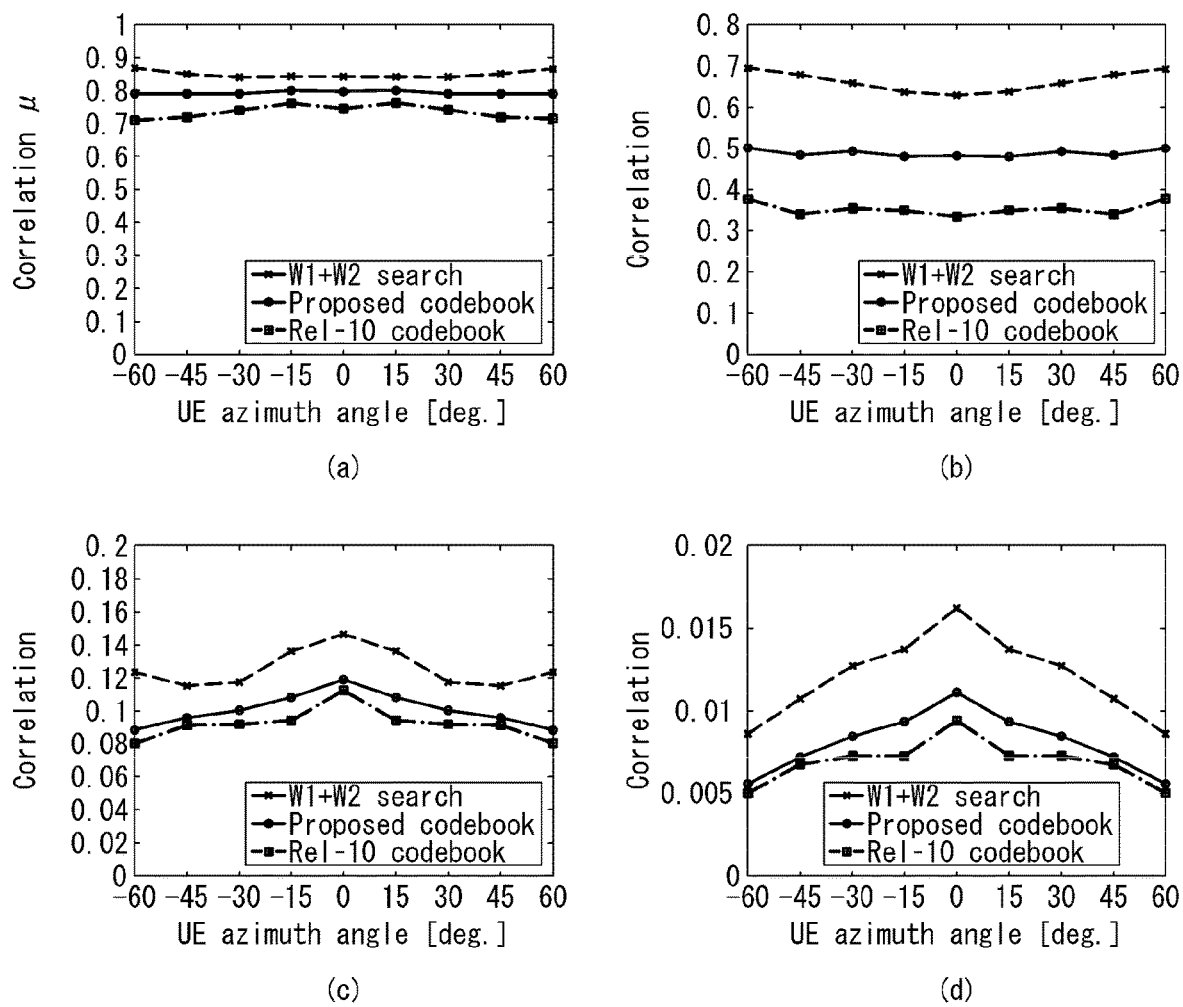
FIG. 32 is a graph showing average correlation performance of a proposed codebook based on a change in the azimuth.

FIG. 32 is a graph showing average correlation performance of a proposed codebook based on a change in the azimuth angle. Particularly, FIG. 32(a) is a graph in the case of single rank transmission, FIG. 32(b) is a graph in the case of dual rank transmission, FIG. 32(c) is a graph in the case of triple rank transmission, and FIG. 32(d) is a graph in the case of quadruple rank transmission.

Under the 3D SCM UM environment, the graphs were generated by changing the location of a UE at a 15° spacing from an azimuth angle of −60° to an azimuth angle of 60°. After 10000 channel matrices were generated for each azimuth angle, a reference index k most suitable for the azimuth angle was set, and thus a long-term codebook was determined. Performance evaluation was performed using a method of selecting a codeword suitable for an instant channel generated each time within the determined long-term codebook and calculating an average value by checking a correlation with a channel. The results of the corresponding performance evaluation are show in FIG. 32. An average correlation $\mu$ according to a change in the azimuth angle of a UE was calculated using Equation 33.

The number of feedback bits used in the proposed codebook is 4 bits other than the quadruple rank, and is 3 bits in the case of the quadruple rank. This is the same feedback size as the LTE Release 10 8-Tx codebook, that is, a standard codebook used as the subject of comparison.

Referring to FIG. 32(a), it may be seen that performance of about 10% is improved compared to the standard codebook if the proposed codebook is used in the case of a single rank. Referring to FIG. 32(b), it may be seen that performance of about 25% is improved compared to the standard codebook if the proposed codebook is used in the case of a dual rank. From FIG. 32(c) and FIG. 32(d), it may be seen that performance of about 8% and 18% is improved compared to the standard codebook in the case of the triple rank and the quadruple rank.

Hereinafter, an operation method of the invention and an utilization scheme thereof are described. The operation method of the invention basically includes downward feedback in which a base station is a reference and upward feedback in which a UE is a reference. In the case of downward feedback, a base station configures a proper parameter suitable for each UE based on incident angle information of the UE, and forwards the configured parameter to the UE through a separate control channel. The UE that has received the corresponding parameter from the base station generates a corresponding codebook. In contrast, in the upward feedback method, a UE checks the statistical characteristic of a channel based on a CSI-RS for each antenna element transmitted by a base station. The UE selects a parameter suitable for wireless communication through a CSI-RS and forwards the parameter to the base station through upward feedback. The base station generates a codebook using the parameter reported by the UE. The codebook generated through the above-described method is used as a long-term codebook, and a short-term codevector index is determined based on an instance change in the channel, and beamforming is performed.

The proposed codebook has been parameterized to enable adaptive operation according to a transmission environment change. For example, the proposed codebook may be changed into a UMi channel environment instead of a UMa environment used in a detailed example of the invention and performance evaluation thereof, and then used. The present invention enables an adaptive operation more flexibly compared to the existing standard codebook because a suitable parameter can be selected based on a change in the channel environment.

Figure 33:
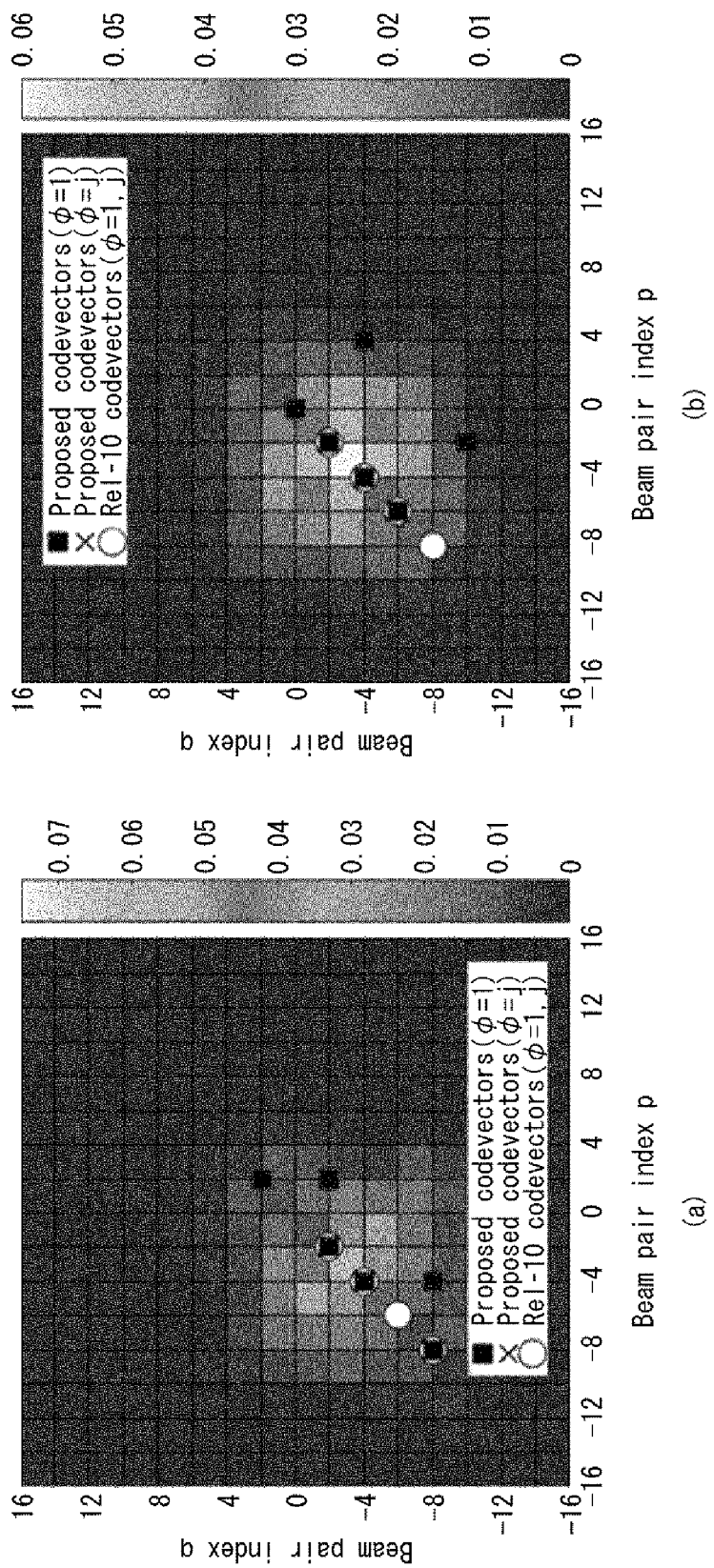
FIG. 33 illustrates a channel adaptive configuration of a quadruple rank codebook.

FIG. 33 illustrates a channel adaptive configuration of a quadruple rank codebook.

Particularly, FIG. 33(a) illustrates a UMa channel, and FIG. 33(b) illustrates a UMi channel.

Referring to FIG. 33, a parameter suitable for each channel may be selected with respect to a UMa environment and a UMi environment, and may be applied to a codebook. In the case of the UMi environment, a parameter may be changed and configured into a parameter a=2, b=2, c=2, d=6, and beamforming optimized for a changed environment may be performed.

In the present invention, the range of a long-term codebook is variably configured by taking the characteristics of an actual channel into consideration and expanded. Furthermore, as the results of the examination of a correlation between beams upon multi-rank transmission, it was found that a beam configuration of a wide range could affect a reduction in interference between layers and the spacing between beams used was adjusted. According to the proposed method, a codeword is replaced with a different codeword and a performance gain can be obtained because the use of an unnecessary cross phase difference is removed by differently allocating a cross phase difference based on the relation between beam indices.

The proposed codebook can be adaptively operated based on a change in the channel environment, such as UMa and UMi, and a change in various transmission frequency bands including an LTE band and a millimeter wave band. To this end, a codebook of a form in which a base station or a UE configures and applies a parameter change has been proposed as described above. Accordingly, the proposed codebook enables beamforming of high reliability through adaptation flexible to various channel environments. The codebook proposed in the present invention may also be expanded and applied to a changed array form, such as an increase in the number of antennas and a 2D antenna structure.

Figure 34:
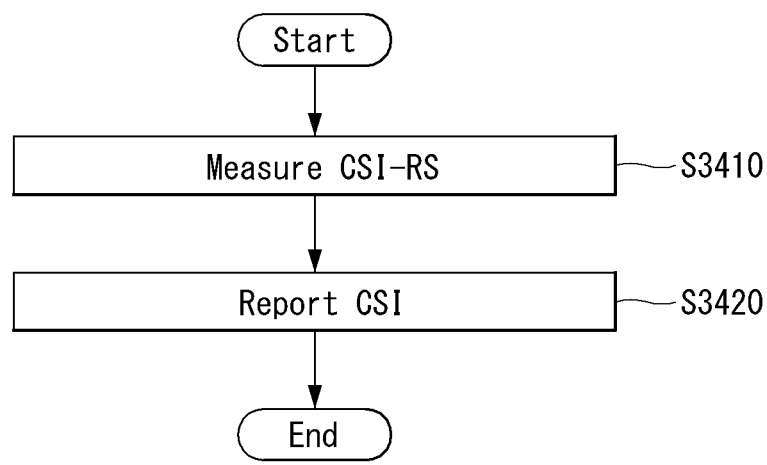
FIG. 34 is a flowchart illustrating a CSI reporting method of a UE according to an embodiment of the present invention.

FIG. 34 is a flowchart illustrating a CSI reporting method of a UE according to an embodiment of the present invention. All the embodiments/description described above in relation to this flowchart may be applied, and a redundant description is omitted.

First, a UE may measure a CSI-RS transmitted by a base station (S3410).

Next, the UE may report, to the base station, CSI generated based on the CSI-RS measurement (S3420). In this case, the CSI may include a PMI for indicating a precoding matrix and an RI for indicating a rank (or number of layers) from a codebook. In this case, the PMI may include a first PMI (W1) for a beam group selected by the UE and a second PMI (W2) including beam subgroup selection information for beams included in the beam group and co-phase information for each antenna port polarization for the selected beam subgroup. This may be represented that the first PMI indicates a precoding matrix set selected from the codebook and the second PMI indicates at least one precoding matrix selected by the UE within the precoding matrix set (i.e., the precoding matrix corresponds to a beam).

The co-phase information may be indicated with a different granularity if selected/grouped beam subgroups are identical and different within a beam group as the rank (or the number of layers) increases. In this case, the beam subgroup may be configured to include at least one beam selected by the UE within the beam group. The case where beam subgroups are the same or different may mean a case where beams included in beam subgroups are the same/ different. Furthermore, orthogonality may be satisfied between beams included in beam subgroups.

If beam subgroups are identical, co-phase information having a first granularity may be indicated. If beam subgroups are different, co-phase information having a second granularity may be indicated. In this case, the first granularity may be lower than the second granularity. That is, this may mean that co-phase information indicates a co-phase value selected among x co-phase candidates if beam subgroups are identical and indicates a co-phase value selected among y co-phase candidates greater than x. In this case, for example, x may be set to 1 or 2, and y may be set to 4. If beam subgroups are different, co-phase information may be reported based on QPSK.

The spacing between beams included in a beam group may be configured non-uniformly. The spacing may be determined based on a parameter configurable by a base station. Or the spacing may be pre-defined or may be indicated in a UE by higher layer signaling by a base station.

General Apparatus to which the Present Invention May be Applied

Figure 35:
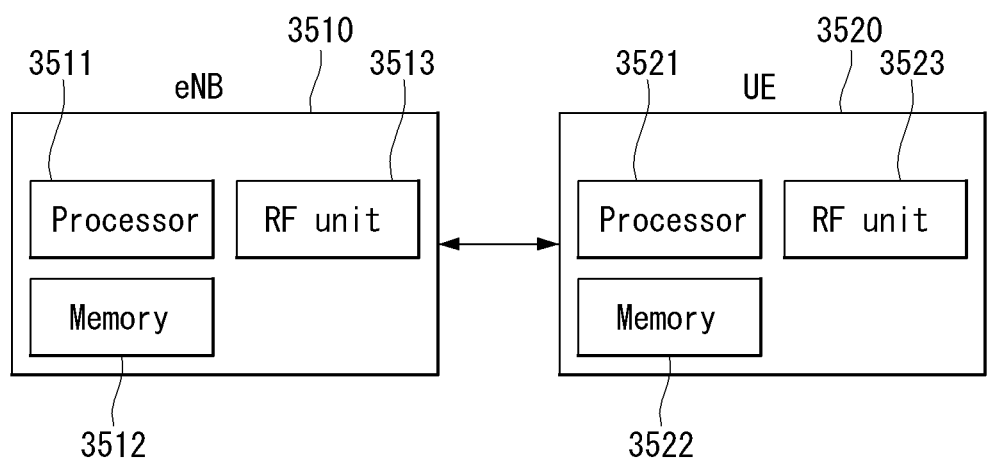
FIG. 35 illustrates a block diagram of a wireless communication device according to an embodiment of the present invention.

FIG. 35 illustrates a block diagram of a wireless communication device according to an embodiment of the present invention.

Referring to FIG. 35, a wireless communication system includes an eNB 3510 and a plurality of UEs 3520 disposed within the area of the eNB 3510.

The eNB 3510 includes a processor 3511, a memory 3512 and a radio frequency (RF) unit 3513. The processor 3511 implements the above-proposed function, process and/or method. The layers of a radio interface protocol may be implemented by the processor 3511. The memory 3512 is connected to the processor 3511, and stores various pieces of information for driving the processor 3511. The RF unit 3513 is connected to the processor 3511, and transmits and/or receives a radio signal.

The UE 3520 includes a processor 3521, a memory 3522 and an RF unit 3523. The processor 3521 implements the above-proposed function, process and/or method. The layers of a radio interface protocol may be implemented by the processor 3521. The memory 3522 is connected to the processor 3521, and stores various pieces of information for driving the processor 3521. The RF unit 3523 is connected to the processor 3521, and transmits and/or receives a radio signal.

The memory 3512, 3522 may be positioned inside or outside the processor 3511, 3521 and may be connected to the processor 3511, 3521 by various well-known means. Furthermore, the eNB 3510 and/or the UE 3520 may have a single antenna or multiple antennas.

In the above-described embodiments, the elements and characteristics of the present invention have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

In this specification, 'A and/or B' may be interpreted as meaning at least one of A and/or B.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the above-described functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

MODE FOR INVENTION

Various forms for implementing the invention have been described in the best form for implementing the invention.

INDUSTRIAL APPLICABILITY

Although the present invention has been illustrated as being chiefly applied to the 3GPP LTE/LTE-A/5G system, it may be applied to various wireless communication systems in addition to the 3GPP LTE/LTE-A/5G system.

The invention claimed is:

1. A method of reporting, by a user equipment (UE), channel state information (CSI) in a wireless communication system, the method comprising:
measuring a CSI-reference signal (RS) transmitted from a base station; and
reporting, to the base station, CSI generated based on the CSI-RS measurement,
wherein the CSI comprises aa precoding matrix indicator (PMI) for indicating a precoding matrix in a codebook and (ii) a rank indicator (RI) for indicating a rank,
wherein the PMI comprises (i) a first PMI informing a beam group selected from a plurality of beam groups and (ii) a second PMI informing (a) beams selected from the beam group and (b) co-phase information for each antenna port polarization for the selected beams,
wherein the beam group indicated by the first PMI comprises a plurality of beams with a non-uniform spacing between beams,
wherein based on the RI indicating a value of 2 or more, the beams are selected for each layer,
wherein the beams selected for each layer are divided into a first subgroup and a second subgroup, and
wherein granularities of the co-phase information are determined differently based on whether the first subgroup and the second subgroup are same or different.

2. The method claim 1,
wherein the co-phase information having a first granularity is indicated based on the first subgroup and the second subgroup being the same, and
wherein the co-phase information having a second granularity is indicated based on the first subgroup and the second subgroup being different.

3. The method of claim 2,
wherein the first granularity is lower than the second granularity.

4. The method of claim 3,
wherein based on the first subgroup and the second subgroup being the same, a number of co-phase values indicated by the co-phase information is equal to 1.

5. The method of claim 4,
wherein the plurality of beams within the beam group are orthogonal to each other.

6. The method of claim 4,
wherein, based on the first subgroup and the second subgroup being different, the co-phase information is reported based on quadrature phase-shift keying (QPSK).

7. The method of claim 3,
wherein based on the first subgroup and the second subgroup being different, a number of candidates of co-phase values indicated by the co-phase information is equal to 4.

8. The method of claim 7,
wherein based on the first subgroup and the second subgroup being different, candidates of co-phase values indicated by the co-phase information are $\{1, j, -1, -j\}$.

9. The method of claim 3,
wherein the first PMI indicates a precoding matrix set selected from the codebook, and
wherein the second PMI indicates at least one precoding matrix selected by the UE within the precoding matrix set.

10. The method of claim 1,
wherein the non-uniform spacing between beams is determined based on a parameter configurable by the base station.

11. The method of claim 1,
wherein the non-uniform spacing between beams is predefined or indicated via higher layer signaling by the base station.

12. The method of claim 1,
wherein beams included in each subgroup are orthogonal to each other.

13. The method of claim 12,
wherein based on a value of the RI being an even number, a number of beams of the first subgroup is equal to a number of beams of the second subgroup.

14. A user equipment (UE) configured to report channel state information (CSI) in a wireless communication system, the UE comprising:
a radio frequency (RF) unit configured to transmit and receive a radio signal; and
a processor connected to the RF unit,
wherein the processor is configured to:
measure a CSI-reference signal (RS) transmitted from a base station; and
report, to the base station, CSI generated based on the CSI-RS measurement,
wherein the CSI comprises (i) a precoding matrix indicator (PMI) for indicating a precoding matrix in a codebook and (ii) a rank indicator (RI) for indicating a rank,
wherein the PMI comprises (i) a first PMI informing a beam group selected from a plurality of beam groups and (ii) a second PMI informing (a) beams selected from the beam group and (b) co-phase information for each antenna port polarization for the selected beams,
wherein the beam group indicated by the first PMI comprise a plurality of beams with a non-uniform spacing between beams,
wherein based on the RI indicating a value of 2 or more, the beams are selected for each layer,
wherein the beams selected for each layer are divided into a first subgroup and a second subgroup, and
wherein granularities of the co-phase information are determined differently based on whether the first subgroup and the second subgroup are same or different.

15. The UE of claim 14,
wherein the co-phase information having a first granularity is indicated based on the first subgroup and the second subgroup being the same, and
wherein the co-phase information having a second granularity is indicated based on the first subgroup and the second subgroup being different.

16. The UE of claim 15,
wherein the first granularity is lower than the second granularity.

17. The UE of claim 16,
wherein based on the first subgroup and the second subgroup being different, a number of candidates of co-phase values indicated by the co-phase information is equal to 4.

* * * * *